(12) United States Patent
Cook et al.

(10) Patent No.: US 8,375,919 B2
(45) Date of Patent: Feb. 19, 2013

(54) MOTION TRANSLATION MECHANISM

(75) Inventors: Christopher L. Cook, Tok, AK (US); Scott Cook, Gladstone, OR (US)

(73) Assignee: Efficient-V, Inc., Gladstone, OR (US)

( * ) Notice: Subject to any disclaimer, the term of this patent is extended or adjusted under 35 U.S.C. 154(b) by 800 days.

(21) Appl. No.: 12/497,497

(22) Filed: Jul. 2, 2009

(65) Prior Publication Data

US 2009/0272259 A1   Nov. 5, 2009

Related U.S. Application Data

(63) Continuation-in-part of application No. PCT/US2008/000167, filed on Jan. 4, 2008, and a continuation-in-part of application No. PCT/US2009/038133, filed on Mar. 24, 2009.

(60) Provisional application No. 60/878,752, filed on Jan. 5, 2007, provisional application No. 61/070,621, filed on Mar. 24, 2008.

(51) Int. Cl.
*F16H 37/12* (2006.01)

(52) U.S. Cl. .............................. 123/197.4; 74/42; 74/52

(58) Field of Classification Search ............... 123/197.1, 123/197.4, 52.1, 54.1, 54.4, 193.4; 74/42, 74/52

See application file for complete search history.

(56) References Cited

U.S. PATENT DOCUMENTS

| | | | |
|---|---|---|---|
| 684,745 A | 10/1901 | Carey | |
| 1,056,746 A | 3/1913 | Pitts | |
| 2,199,625 A | 6/1938 | Fiala-Fernbrugg | |
| 2,166,975 A | 7/1939 | Sologaistoa | |
| 2,223,100 A | 11/1940 | Foster | |
| 2,309,047 A | 1/1943 | Culbertson | |
| 2,757,547 A | 8/1956 | Julin | |
| 3,290,950 A | 12/1966 | Carlson | |
| 3,791,227 A | 2/1974 | Cherry | |
| 3,866,805 A | 2/1975 | Hamilton, Jr. | |
| 3,913,408 A | 10/1975 | Moore | |
| 4,026,252 A | 5/1977 | Wrin | |
| 4,270,395 A | 6/1981 | Grundy | |
| 5,067,456 A | 11/1991 | Beachley et al. | |
| 5,158,046 A | 10/1992 | Rucker | |
| 5,170,757 A | 12/1992 | Gamache | |
| 5,189,994 A * | 3/1993 | Gindentuller ................ 123/54.2 |
| 5,375,566 A | 12/1994 | Brackett | |
| 5,394,839 A | 3/1995 | Haneda | |

(Continued)

FOREIGN PATENT DOCUMENTS

| IT | 1235199 | 6/1992 |
|---|---|---|
| WO | WO 03/098017 | 11/2003 |

(Continued)

OTHER PUBLICATIONS

International Search Report/Written Opinion, PCT/US2008/000167, Aug. 7, 2008, ISA/US, U.S. Patent and Trademark Office, Alexandria, Virginia, USA.

(Continued)

*Primary Examiner* — Noah Kamen
*Assistant Examiner* — Grant Moubry
(74) *Attorney, Agent, or Firm* — David A. Crowther

(57) ABSTRACT

This disclosure concerns machines that convert rotating motion to reciprocation, and vice-versa, and more particularly, but not exclusively, to reciprocating piston machines. Some embodiments include a crankshaft defining a crankshaft-drive and at least one radially extending piston-journal spaced from the crankshaft-drive, and a piston configured to pivotally engage the piston-journal. The piston defines a cylindrical head and an elongate body. Some embodiments further include a drive-member defining a central-axis-of-rotation and being rotatably engageable with the crankshaft-drive. Some embodiments also include a block defining one or more cylinders for receiving one or more pistons. The drive-member rotates when the piston reciprocates, and vice-versa.

33 Claims, 36 Drawing Sheets

U.S. PATENT DOCUMENTS

| | | | |
|---|---|---|---|
| 5,727,513 A * | 3/1998 | Fischer | 123/197.4 |
| 5,755,195 A | 5/1998 | Dawson | |
| 5,782,213 A | 7/1998 | Pedersen | |
| 5,943,987 A | 8/1999 | Fischer | |
| 6,024,067 A | 2/2000 | Takachi et al. | |
| 6,032,622 A | 3/2000 | Schmied | |
| 6,209,495 B1 | 4/2001 | Warren | |
| 6,223,704 B1 | 5/2001 | Chatelain | |
| 6,510,831 B2 * | 1/2003 | Wiseman | 123/197.4 |
| 6,598,567 B2 | 7/2003 | Schmied | |
| 6,631,671 B1 | 10/2003 | Vool | |
| 6,895,921 B1 * | 5/2005 | Girard | 123/197.4 |
| 7,121,235 B2 | 10/2006 | Schmied | |
| 7,124,718 B2 | 10/2006 | Artola | |
| 7,150,259 B2 | 12/2006 | Schmied | |
| 7,185,557 B2 * | 3/2007 | Venettozzi | 74/602 |
| 7,213,563 B2 | 5/2007 | Yaguchi et al. | |
| 7,640,910 B2 * | 1/2010 | Lemke et al. | 123/197.4 |
| 2001/0035149 A1 | 11/2001 | Wiseman | |
| 2001/0047775 A1 | 12/2001 | Schmied | |
| 2002/0124816 A1 | 9/2002 | Schmied | |
| 2004/0045522 A1 | 3/2004 | Raffaele | |
| 2004/0255879 A1 | 12/2004 | Zaytsev | |
| 2006/0053964 A1 | 3/2006 | Venettozzi | |
| 2006/0207249 A1 | 9/2006 | Yaguchi et al. | |
| 2006/0233653 A1 | 10/2006 | Trapalis | |
| 2007/0215093 A1 | 9/2007 | Lemke et al. | |
| 2007/0240673 A1 | 10/2007 | Schmied | |

FOREIGN PATENT DOCUMENTS

| | | |
|---|---|---|
| WO | WO 2005/012706 | 2/2005 |
| WO | WO 2006/044944 | 10/2005 |

OTHER PUBLICATIONS

International Search Report/Written Opinion, PCT/US2009/038133, Jul. 17, 2009, ISA/US, U.S. Patent and Trademark Office, Alexandria, Virginia, USA.

International Search Report and Written Opinion for PCT/US2008/000167, filed Jan. 4, 2008 (mailed Aug. 7, 2008).

* cited by examiner

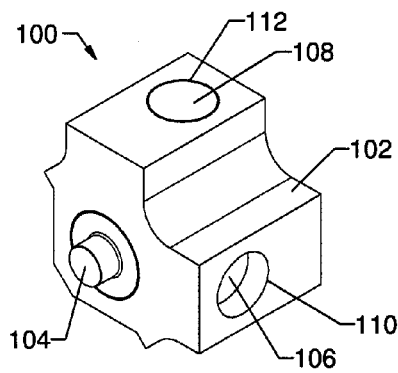
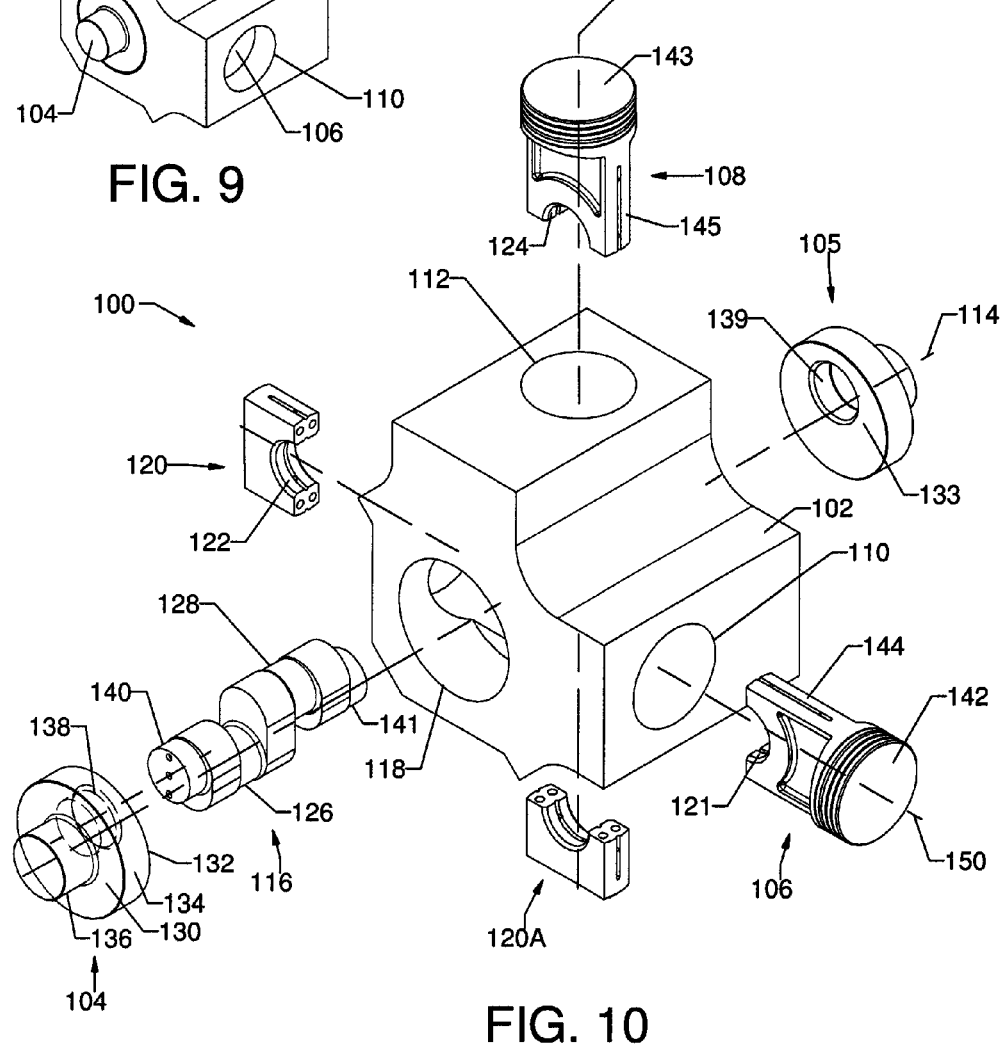

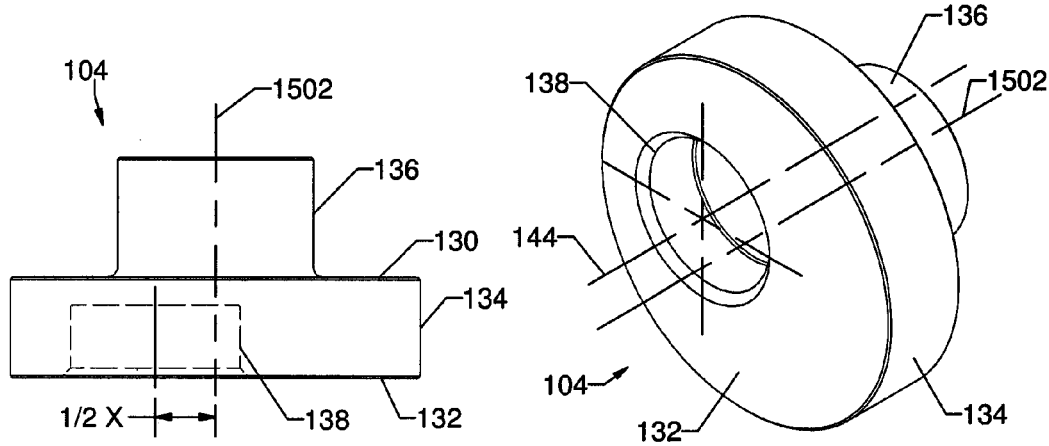
FIG. 20A
FIG. 20
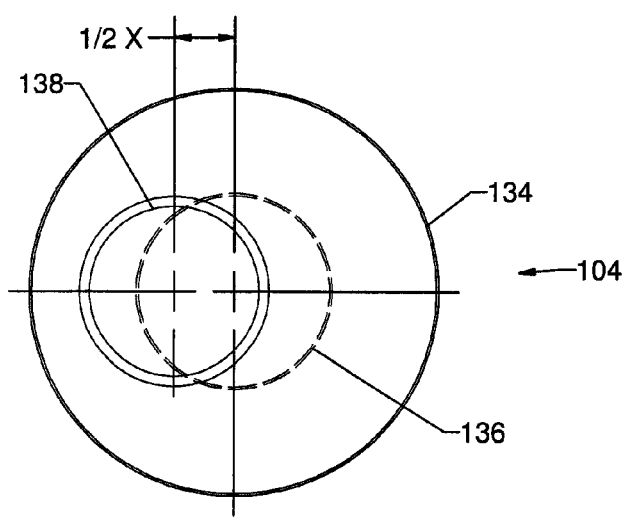
FIG. 20B

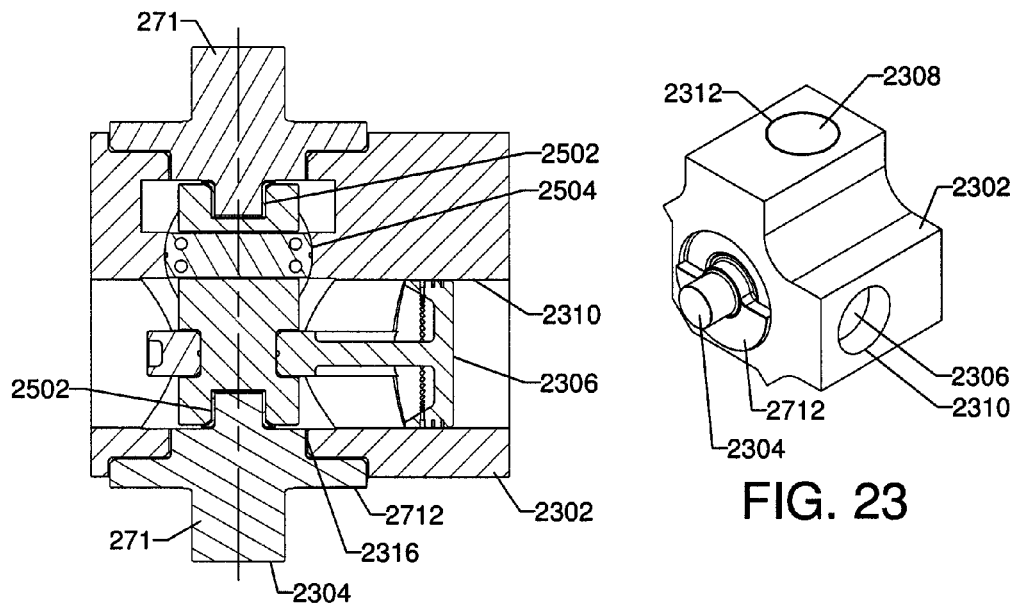
FIG. 23B
FIG. 23
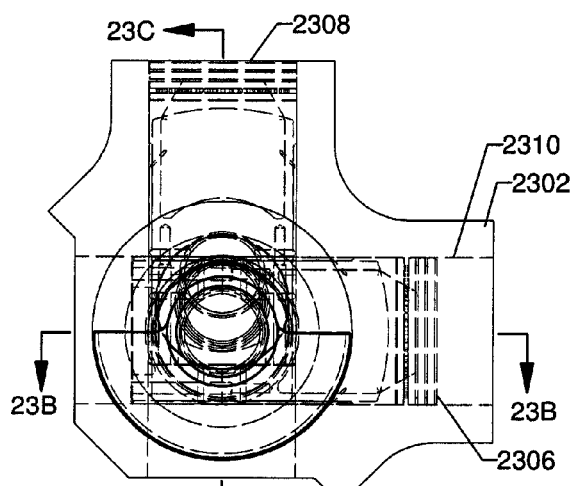
FIG. 23A

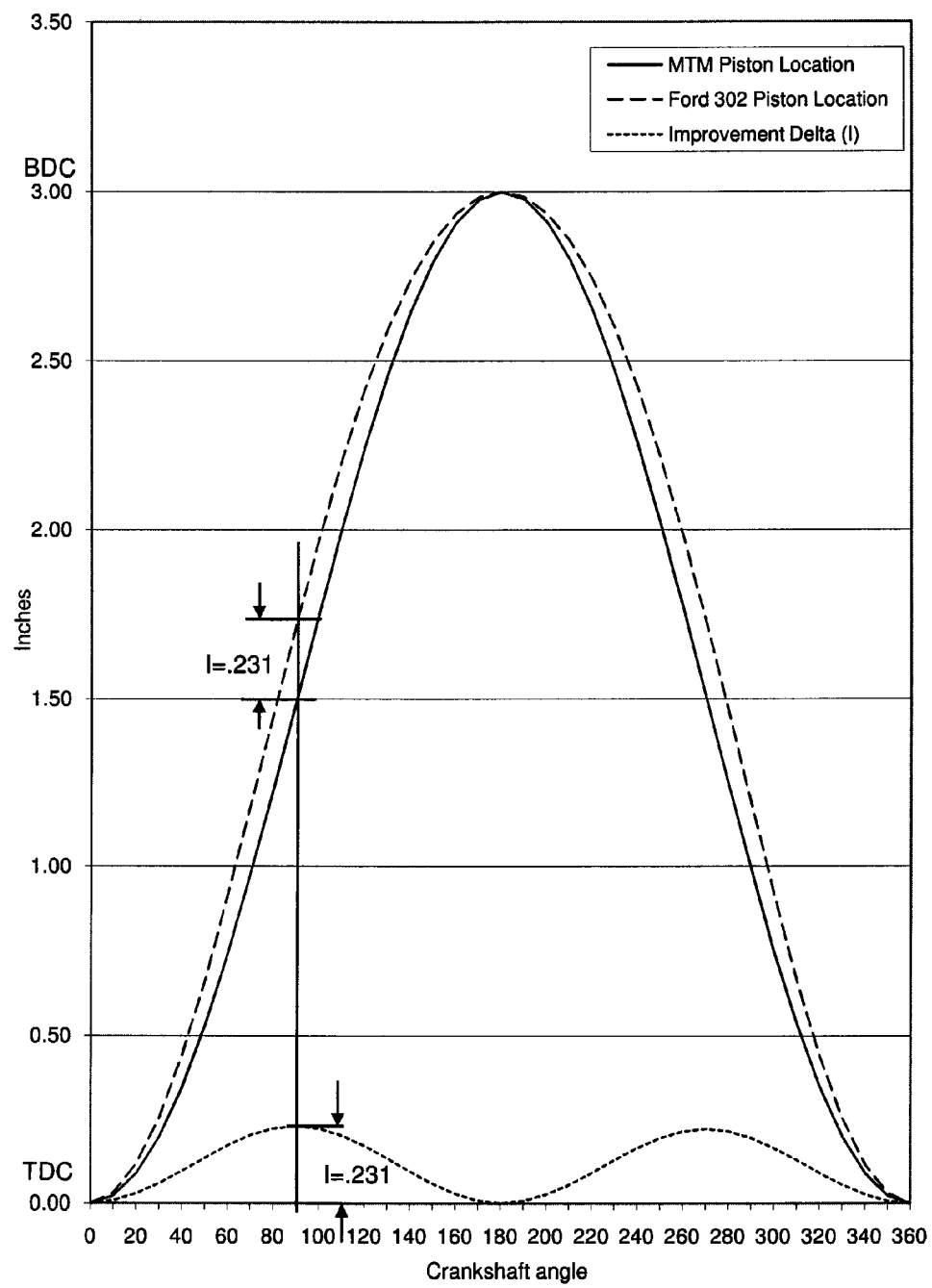

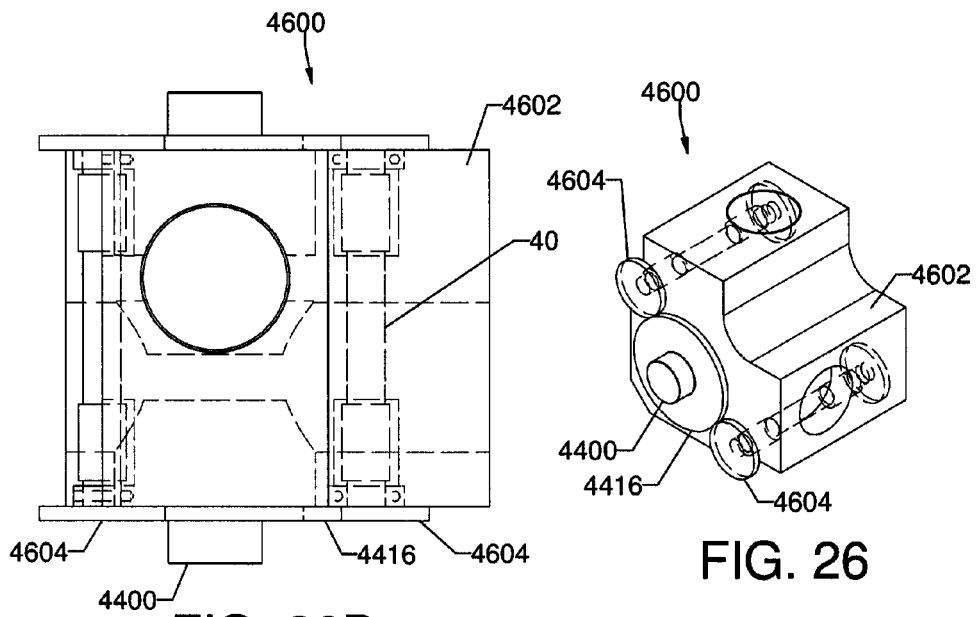
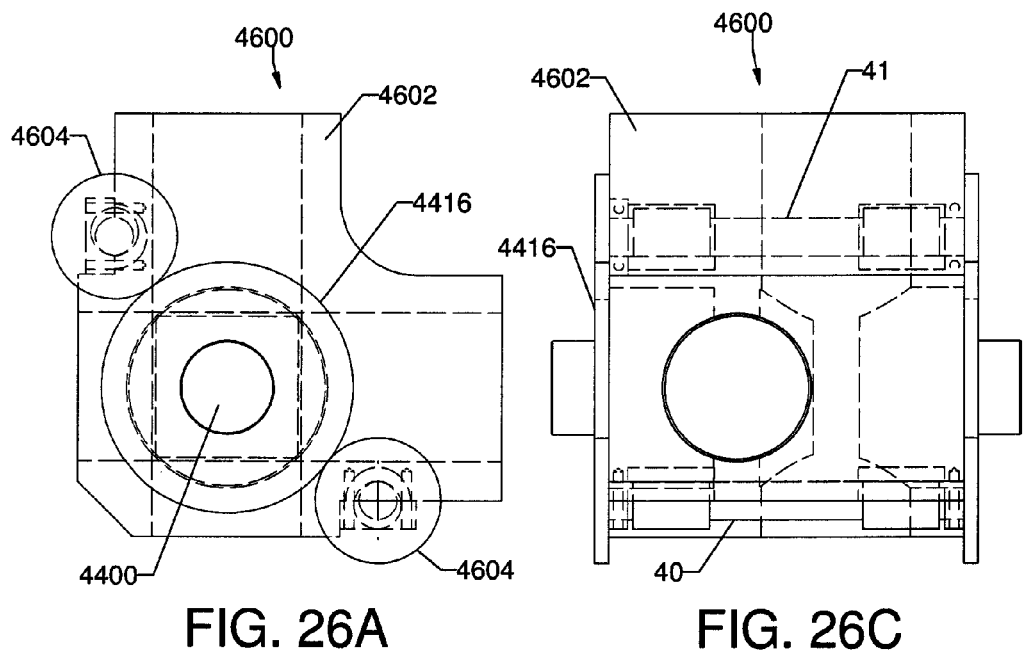

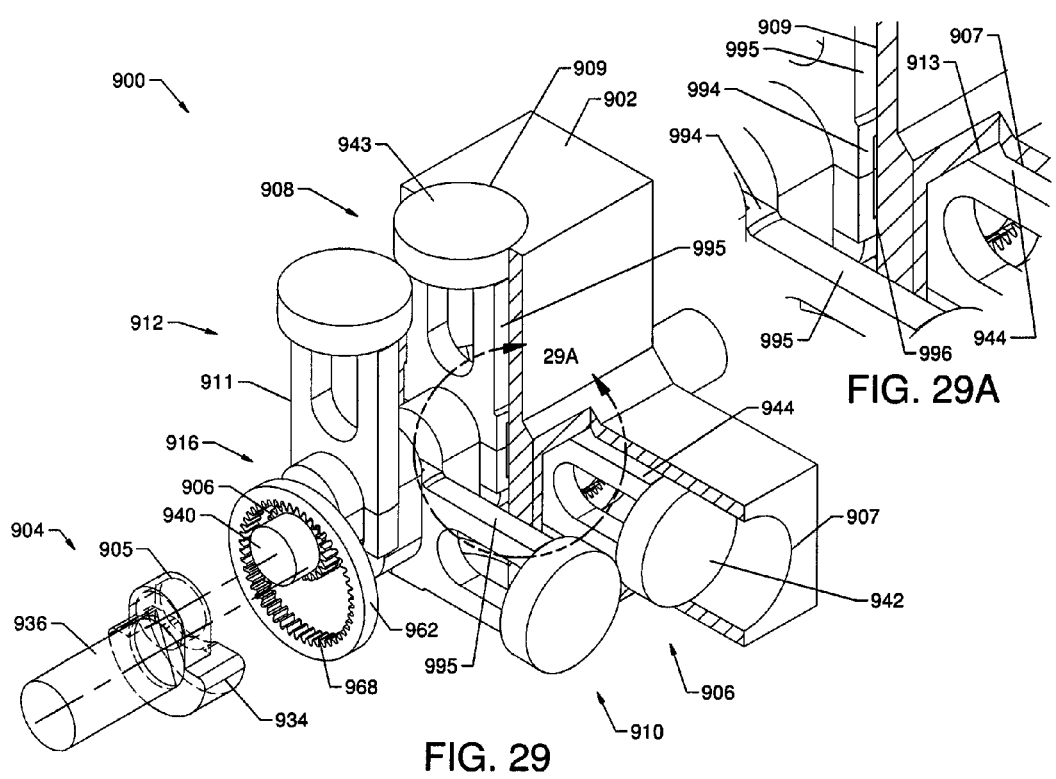

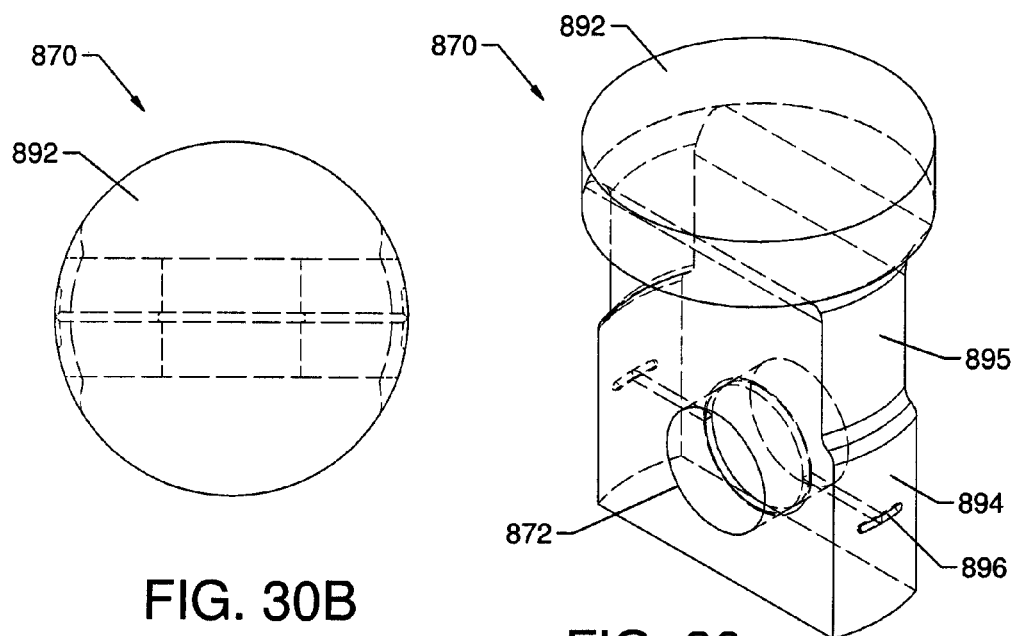
FIG. 30B
FIG. 30
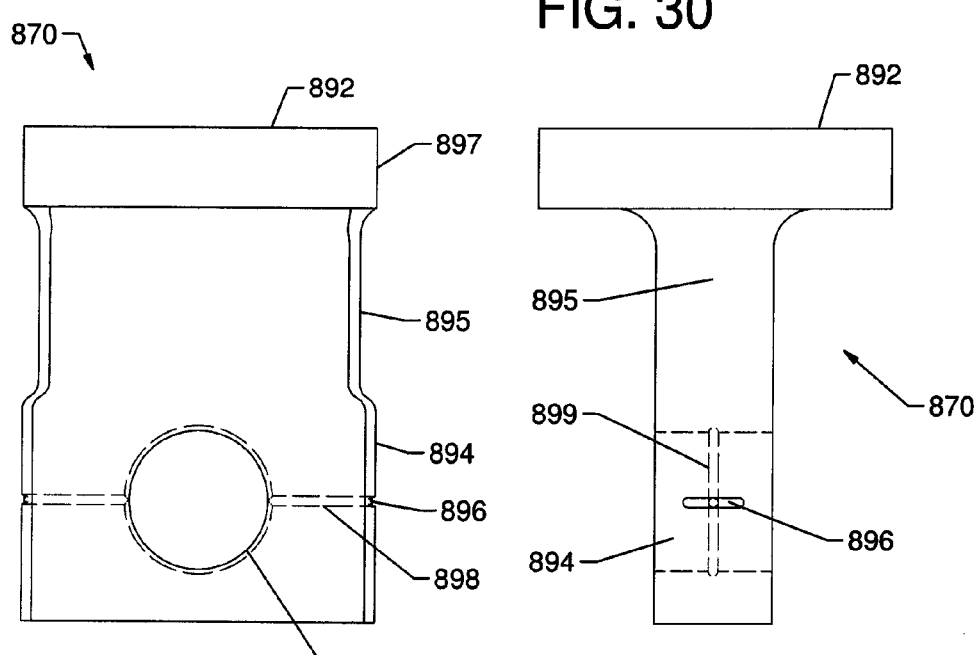
FIG. 30A
FIG. 30C

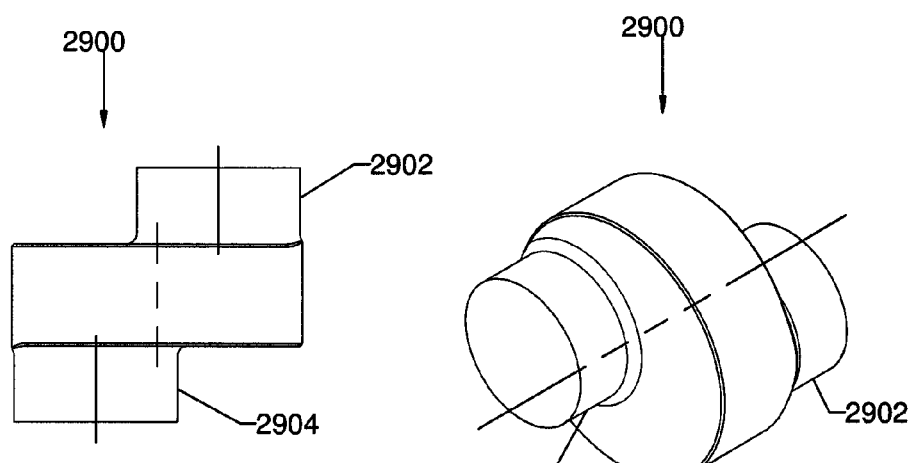
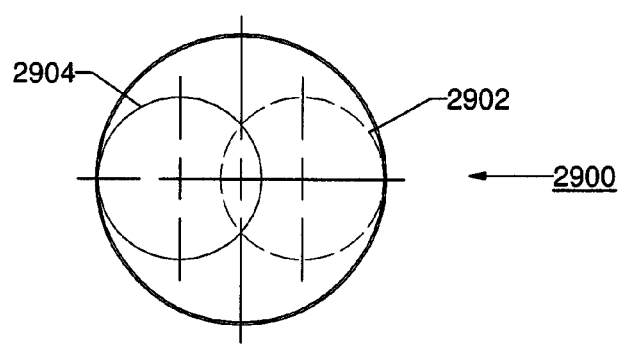
FIG. 33A        FIG. 33
FIG. 33B

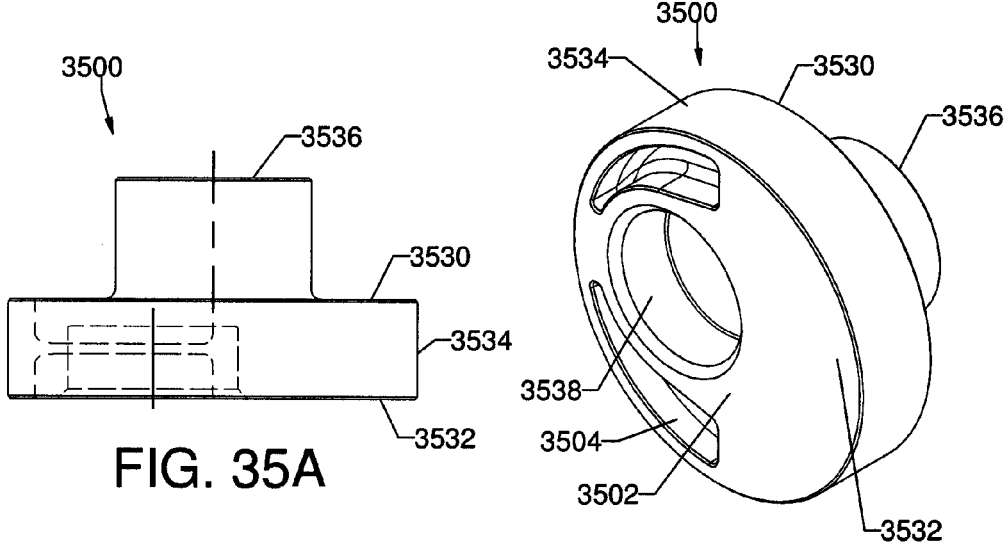
FIG. 35A
FIG. 35
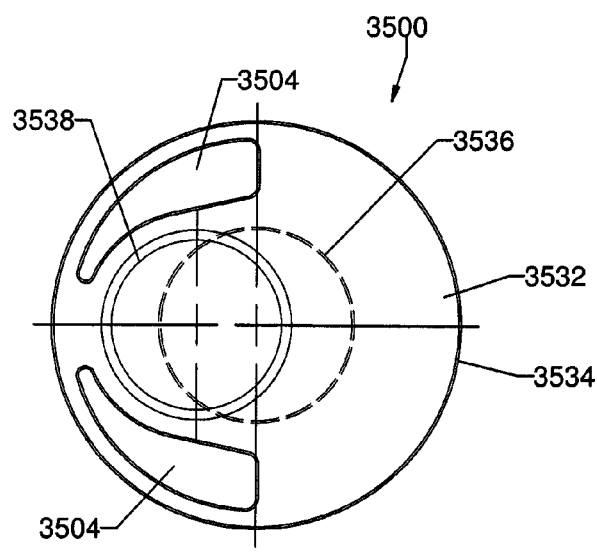
FIG. 35B

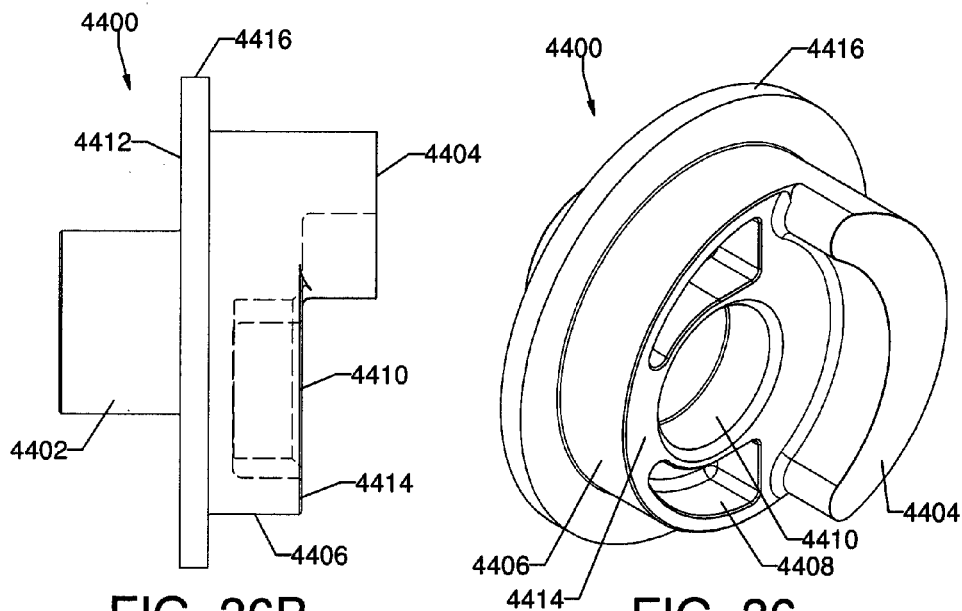
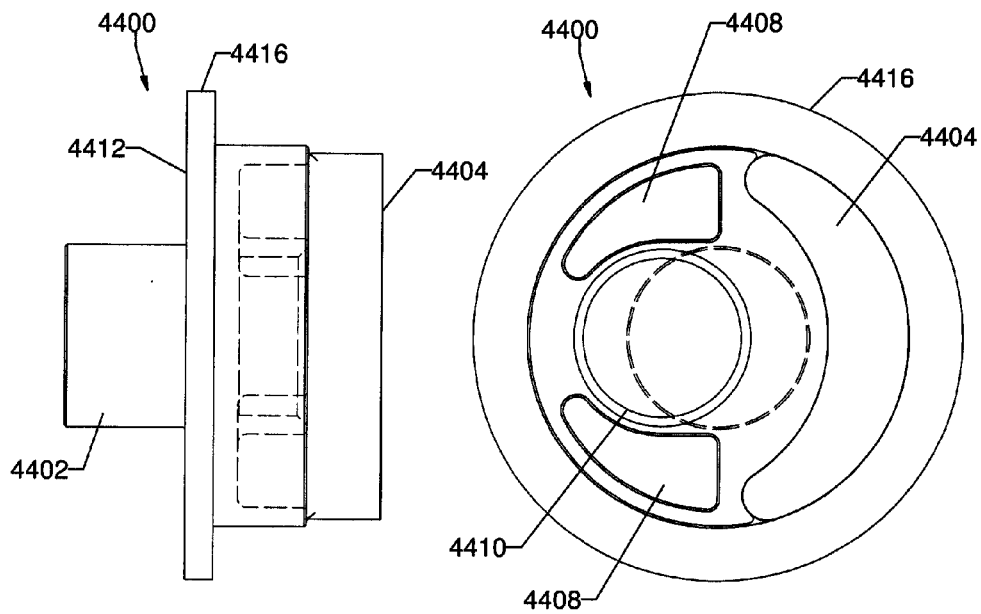

MOTION TRANSLATION MECHANISM

CROSS REFERENCE TO RELATED APPLICATIONS

This application claims priority benefit of and is a continuation-in-part of copending international patent application PCT/US2008/000167, filed on Jan. 4, 2008, and designating the U.S., which international patent application claims priority to U.S. Provisional Patent Application No. 60/878,752, filed on Jan. 5, 2007, and of copending international patent application PCT/US2009/038133, filed on Mar. 24, 2009, and designating the U.S., which international patent application claims priority to U.S. Provisional Patent Application No. 61/070,621, filed on Mar. 24, 2008. These applications are incorporated herein by reference.

FIELD

This application concerns machines that convert rotating motion to reciprocating motion, and vice-versa, and more particularly, but not exclusively, to reciprocating piston machines.

BACKGROUND

Reciprocating piston machines have been used to convert reciprocating motion to rotating motion, and vice-versa, and most rely on a slider-crank configuration. A conventional slider-crank mechanism includes a crank-arm that rotates about a proximal end and a distal end of the crank-arm pivotally engages (e.g., using a pin-type connection) a connecting rod at the proximal end of the connecting rod. The connecting rod pivotally engages a reciprocable slider (e.g., piston) at the distal end of the connecting rod. Consequently, as the crank-arm rotates, the slider reciprocates.

Conventional slider-crank configurations impart lateral forces to the slider that vary according to angular position of the crank and length of the connecting rod relative to the crank. For example, longer connecting rods impart correspondingly lower lateral forces compared to shorter connecting rods. Consequently, longer connecting rods usually impart lower wear rates to slider and pivoting connections. Longer connecting rods also usually result in a correspondingly lower ratio of stroke-length to overall slider-crank length, which provides a measure of the size and weight of the slider-crank mechanism relative to its useful output. To improve this measure, those of ordinary skill reduce the connecting rod length, increase the strength of pivoting connections and sliders, and either accept higher wear rates or try to reduce friction between wear surfaces (e.g., by lubricating the surfaces).

Some have attempted using planetary crankshafts and planetary gear trains for converting motion from reciprocation to rotation, and vice-versa. These prior attempts suffer from, among many issues, complex geometries that are difficult to manufacture and difficult to assemble, and high inertial forces during operation that result in low reliability and low efficiency.

SUMMARY

Described below are various embodiments of a new architecture for motion translation mechanisms, components thereof and related assemblies.

Embodiments of crankshaft and bearing apparatus are disclosed. Some embodiments comprise a crankshaft defining at least one crankshaft drive having a crankshaft drive axis-of-rotation and at least one piston-journal defining a longitudinal axis radially spaced from the at least one crankshaft drive axis-of-rotation. These embodiments also comprise a corresponding at least one piston engaging the at least one piston-journal, and a drive member defining a central axis-of-rotation. The drive member defines a crankshaft drive receiving region for receiving the corresponding crankshaft drive. The apparatus also comprises an internal ring gear, and the crankshaft comprises a pinion matingly engageable with the ring gear such that the longitudinal axis of each at least one piston-journal reciprocates along a respective substantially linear hypocycloidal path as the crankshaft orbits about the central-axis-of-rotation.

A ratio between a circular pitch diameter of the ring gear and a circular pitch diameter of the pinion can be about two. The ring gear can be stationary. The piston can be reciprocable along a stroke length measuring about the same length as the circular pitch diameter of the ring gear.

The at least one piston can comprise at least a first piston and a second piston. In such embodiments, the at least one piston-journal comprises at least a first piston-journal pivotably engageable with the first piston, and a second piston-journal pivotably engageable with the second piston. Each of the piston-journals define a respective longitudinal axis being radially spaced from the crankshaft drive axis-of-rotation. The first piston-journal and the second-piston-journal can be angularly separated from each other by a first angle relative to the crankshaft drive axis-of-rotation.

In some embodiments, the at least one piston comprises at least a first piston, a second piston, a third piston and a fourth piston. The at least one piston-journal can comprise at least a first piston-journal pivotably engageable with the first piston and defining a corresponding longitudinal axis, a second piston-journal pivotably engageable with the second piston and defining a corresponding longitudinal axis, a third piston-journal pivotably engageable with the third piston and defining a corresponding longitudinal axis, and a fourth piston-journal pivotably engageable with the fourth piston and defining a corresponding longitudinal axis.

The longitudinal axis of the first piston-journal and the longitudinal axis of the second piston-journal can reciprocate in respective first and second planes as the crankshaft orbits about the central-axis-of-rotation. The first plane and the second plane can be angularly separated by a second angle measuring one-half of the first angle.

The disclosed crankshaft and bearing apparatus can comprise a block defining a first piston cylinder having a corresponding first cylinder axis. The first piston cylinder can be configured to slidably receive at least a portion of the first piston. The block can also define a second piston cylinder having a corresponding second cylinder axis. The second piston cylinder can be configured to slidably receive at least a portion of the second piston. An angle between the first cylinder axis and the second cylinder axis can correspond to the first angle.

In some embodiments, the first angle measures between about 0-degrees and about 180-degrees. For example, the first angle can measure between about 60-degrees and about 150-degrees, such as, for example, between about 75-degrees and about 135-degrees. In some embodiments, the first angle measures between about 85-degrees and about 100-degrees. In some embodiments, the second angle measures between about 40-degrees and about 85-degrees, such as, for example, about 45-degrees.

In some embodiments, the second angle measures between about 0-degrees and about 180-degrees, such as, for example, between about 20-degrees and about 150-degrees. In some embodiments, the second angle measures between about 40-degrees and about 80-degrees, such as, for example, about 45-degrees.

The at least one piston can comprise a single piston, and a corresponding block can define a single piston cylinder. The piston cylinder can have a corresponding cylinder axis and be configured to slidably receive the single piston. In some embodiments of crankshaft and bearing apparatus, the internal ring gear is a first internal ring gear and the pinion is a first pinion. Such embodiments can also comprise a second internal ring gear. The crankshaft can comprise a second pinion matingly engageable with the second ring gear.

One or more of the pistons can comprise an elongate body having a length extending from a proximal region to a distal region. The body can define a bearing surface extending over more than about 25%, such as more than about 33%, and in some instances more than about 50%, of the length of the elongate body for slidably engaging a portion of a block, crankcase or cylinder wall.

The drive member can comprise an armature. At least one of the pistons can reciprocate along a stroke length measuring four times the distance extending between the longitudinal axis of the at least one piston-journal and the at least one crankshaft drive axis-of-rotation.

Other embodiments of crankshaft and bearing apparatus are disclosed. For example, such apparatus can comprise a block having defined therein a longitudinal crankcase, a drive-member receiving region that defines a central-axis-of-rotation, and at least first and second cylinders. The first and second cylinders define respective cylinder axes being disposed at a first angle of other than about 90-degrees and other than about 180-degrees, such as, for example, between about 20-degrees and about 150-degrees. In some embodiments, this first angle measures between about 40-degrees and about 80-degrees, such as, for example, about 45-degrees. At least first and second pistons can be slidably disposed within the respective first and second cylinders and can have respective first and second crankshaft-bearing regions. Such apparatus can also comprise a crankshaft defining a crankshaft-drive and at least first and second piston-journals. The first and second crankshaft-bearing regions can pivotally engage the respective first and second piston-journals. Such apparatus can also comprise a drive-member rotatably engageable with the crankshaft-drive. The first and second pistons can reciprocate within the respective first and second cylinders as the crankshaft orbits the central-axis-of-rotation.

In some embodiments, such crankshaft and bearing apparatus further comprise a ring gear, and the crankshaft comprises a pinion matingly engaging the ring gear.

In some embodiments, disclosed crankshaft and bearing apparatus further comprise a housing fixedly attached to the block and defining an aperture through which a portion of the drive-member extends.

Still other crankshaft and bearing apparatus are disclosed, and can include a crankshaft, at least a first piston and a drive-member. The crankshaft can define at least one crankshaft-drive having a crankshaft-drive axis-of-rotation, and at least one radially extending piston-journal spaced from the at least one crankshaft-drive. The crankshaft can define a piston-journal longitudinal axis spaced from the crankshaft-drive axis-of-rotation.

The first piston can have a crankshaft-bearing-region at a proximal end, a piston head at a distal end and an elongate body connecting the crankshaft-bearing-region and the piston head. The crankshaft-bearing-region is pivotally engageable with the at least one piston-journal of the crankshaft. In some embodiments, the piston head can have a substantially cylindrical shape and define a piston head diameter. The body has a width substantially equal to the head diameter along at least about 25% of a length of the body between the piston head and the crankshaft-bearing-region. In some embodiments, the width is substantially equal to the head diameter along at least about 33%, and in some embodiments at least about 50%, of a length of the body. The body also has a thickness less than the width. The piston can be thusly configured to be slidably received in a piston-cylinder.

The drive-member defines a central-axis-of-rotation and can be rotatably engageable with the crankshaft-drive. When the drive-member is engaged with the crankshaft-drive, a moment applied to the drive-member can urge the crankshaft-drive axis-of-rotation along a circular orbit about the central-axis-of-rotation, thereby urging the piston-journal to reciprocate along a substantially linear stroke with respect to a fixed frame-of-reference.

In some embodiments, the elongate body is fixedly attached to the piston head. The width of the elongate body can be substantially uniform over the length of the body between the piston head and the crankshaft-bearing-region. In other embodiments, the width of the elongate body can be less than the piston head and/or spaced from a corresponding wall of a crankcase or cylinder, e.g., to reduce friction. When the drive-member is engaged with the crankshaft-drive, a moment applied to the drive-member can urge a region of the crankshaft along a hypocycloidal path.

Some embodiments also include a block. The block can have a first recess that defines a drive-member receiving region sized to pivotally receive the drive-member. The block also can have a second recess sized to slidably receive the piston and define a piston-cylinder. The second recess has an outer portion sized to receive the piston head and piston width, and in some embodiments, a narrowed inner portion sized to slidably receive the proximal end of the piston.

In some embodiments, the linear stroke of the longitudinal axis of the at least one piston-journal is approximately four times as large as a radius defined by the circular orbit of the longitudinal axis of the crankshaft-drive about the central-axis-of-rotation. A distance between the crankshaft-drive axis-of-rotation and the piston-journal longitudinal axis can be substantially equal to a radius of the circular orbit of the longitudinal axis of the crankshaft-drive about the central-axis-of-rotation.

Some disclosed embodiments also include a second piston defining a crankshaft-bearing-region at a proximal end, a head at a distal end and an elongate body connecting the crankshaft-bearing-region and the head. The head of the second piston can have a substantially cylindrical shape defining a piston head diameter. The body of the second piston can have a substantially uniform width, in some instances being substantially equal to the head diameter, and a thickness substantially less than the head diameter. The second piston can be configured to be slidably received in a piston-cylinder. In such embodiments, the at least one piston-journal is a first piston-journal that further includes a radially extending second piston-journal being longitudinally spaced apart from the first piston-journal. The second piston-journal can define a longitudinal axis and the crankshaft-bearing-region of the second piston can be pivotally engageable with the second piston-journal. Further, the respective longitudinal axes of the first and second piston-journals are typically parallel and can be angularly offset from each other relative to the crankshaft-drive axis-of-rotation. The angular offset between the respective longitudinal axes of the first and the second piston-journals can range from about zero-degrees to about 180-degrees, such as between about 60-degrees and about 15-degrees.

The respective longitudinal axes of the first and second piston-journals can be co-planar with the crankshaft-drive axis-of-rotation. The first piston and the second piston can be configured to reciprocate out of phase relative to each other.

In some embodiments, a distance between the respective longitudinal axes of the first piston-journal and the second piston-journal is substantially equal to a diameter of the circular orbit of the longitudinal axis of the crankshaft-drive about the central-axis-of-rotation. In some of these embodiments, the linear stroke of the respective longitudinal axes of the first and second piston-journals is approximately twice the diameter of the orbit.

Some embodiments that include two or more pistons also include a block having a first recess that defines a drive-member receiving region sized to rotatably receive the drive-member. The block can also have a second recess sized to slidingly receive the first piston and defining a first piston-cylinder extending in a first cylinder direction and a third recess sized to slidingly receive the second piston and defining a second piston-cylinder extending in a second cylinder direction. An angle between the first cylinder direction and the second cylinder direction can range from about zero-degrees to about 180-degrees. Some embodiments include a balance shaft rotatably engaged with the drive-member. In some embodiments, a moment applied to the drive-member urges the first and second pistons to reciprocate within the first and second piston-cylinders, respectively.

Some crankshafts include an intermediate member configured to cause two or more pistons to reciprocate out of phase with each other. Some crankshaft-drives include one of a pinion gear and a journal bearing surface. Some drive-members pivotally engage the journal bearing surface of the crankshaft-drive.

Reciprocating-piston apparatus are disclosed that include a block, at least first and second pistons, a crankshaft, and a drive-member. Such blocks have defined therein a longitudinal crankcase, a drive-member receiving region that defines a central-axis-of-rotation, and at least first and second cylinders. The first and second cylinders define respective cylinder axes disposed at an angle measuring between about 0-degrees and about 180-degrees relative to each other and are longitudinally offset along the central-axis-of-rotation. The first and second cylinders each have a substantially cylindrical top-portion defining a diameter and a narrowed central-portion with a first dimension perpendicular to the central-axis-of-rotation and substantially the same as the diameter, and a second dimension along the central-axis-of-rotation substantially less than the diameter.

The crankshaft defines a crankshaft-drive and at least first and second piston-journals and is disposed in the longitudinal crank-bore.

The at least first and second pistons are slidably disposed within the respective first and second cylinders and have respective first and second crankshaft-bearing regions. The first and second crankshaft-bearing regions pivotally engage the respective first and second piston-journals.

The drive-member rotatably engages the crankshaft-drive and is pivotally disposed relative to the drive-member receiving region of the block. In some instances, the drive-member is pivotally disposed at least partially within the drive-member receiving region of the block.

In some instances, reciprocating piston apparatus also include a balance shaft rotatably engaged with the drive-member. Some embodiments include a housing fixedly attached to the block and defining an aperture through which a portion of the drive-member extends. The drive-member can be pivotally disposed at least partially within the housing. The housing can further include a bearing that pivotally engages the portion of the drive-member extending through the aperture to provide support thereto.

Some blocks are substantially one-piece. Some one-piece blocks include a cylinder sleeve disposed in one or more of the cylinders to promote wear resistance. Other blocks have removable piston cylinders, or other removable features.

A moment applied to the drive-member can urge the crankshaft-drive to orbit the central-axis-of-rotation, thereby urging the first and second pistons to reciprocate along respective substantially linear strokes in the respective first and second cylinder-bores.

Urging the first and second pistons to reciprocate in the respective first and second cylinder-bores can urge the crankshaft-drive to orbit the central-axis-of-rotation, thereby urging rotation of the drive-member. In some of these embodiments, the respective pistons and cylinder-bores are configured to promote combustion of a fuel and air mixture for releasing chemical energy of the fuel and forming products of combustion capable of performing work on at least one of the pistons.

Some embodiments of the crankshaft-drive include one of a pinion gear and a journal. In some of these embodiments, the drive-member receiving region of the block includes an internal gear configured to receive the crankshaft-drive pinion gear. In some instances, the drive-member includes a region defining a bore configured to receive the crankshaft-drive journal.

Disclosed pistons can include one or more oil pathways configured to deliver oil to one or more bearing regions, at least partially in response to reciprocation of the pistons within the cylinders.

Drive-members for shaft and bearing apparatus can include a driveshaft, a crankshaft-drive receiving area and a prismatic sector defining a body. The prismatic sector defining a body has first and second ends, a sidewall that extends between the ends, and a central-axis-of-rotation perpendicular to each end and substantially parallel to the sidewall. The driveshaft defines a first longitudinal axis that substantially aligns with the central-axis-of-rotation. The crankshaft-drive receiving region is configured to receive a crankshaft-drive and defines a longitudinal-axis-of-symmetry parallel to and spaced from the central-axis-of-rotation.

In some embodiments, the prismatic sector spans less than approximately 180-degrees about the central-axis-of-rotation. In other embodiments, the prismatic sector spans more than about 180-degrees about the central-axis-of-rotation. For example, the prismatic sector can span about 360-degrees, thereby forming a substantially cylindrical body.

In some embodiments, the body also defines one or more recessed regions disposed symmetrically about a plane that includes the central-axis-of-rotation. Some drive-members include a longitudinally extending member contiguous with the body that is configured to provide balance to a rotating crankshaft and bearing assembly. The crankshaft-drive receiving region can include a journal or an internal gear configured to receive a pinion gear. The sidewall can include a journal. The driveshaft can include a journal, a pinion, a pulley, a sprocket, spline, keyway, or drive flange.

In some embodiments, rotation of the body about the central-axis-of-rotation causes the longitudinal-axis-of-symmetry of the crankshaft-drive receiving region to orbit the central-axis-of-rotation. The sidewall can be configured to pivotally engage a block and the crankshaft-drive receiving region can be configured to receive a crankshaft-drive.

Planetary crankshafts are disclosed that include a first end and a second end, at least a first crankshaft-drive and at least first and second radially extending piston journals. The at least first crankshaft-drive is configured to rotatably engage a first drive-member. The at least first crankshaft-drive defines a first longitudinal axis and is disposed on the first end. The at least first and second radially extending piston journals are each configured to pivotally engage a corresponding crankshaft-bearing-region of respective first and second pistons. The first piston journal defines a second longitudinal axis and the second piston journal defines a third longitudinal axis. The first, second, and third longitudinal axes are substantially parallel to and spaced from each other, and can be substantially coplanar. The respective piston journals can be angularly separated by an angle measuring from about 0-degrees to about 180-degrees (e.g., about 60-degrees to about 150-degrees).

Some embodiments of the planetary crankshaft also include a second crankshaft-drive configured to rotatably engage a second drive-member. The second crankshaft-drive defines a fourth longitudinal axis substantially coincident with the first longitudinal axis and is disposed on the second end.

Pistons for reciprocating-piston apparatus can include a substantially cylindrically shaped head configured to be reciprocally received in a piston-cylinder and an elongate body. The elongate body can be configured to pivotally engage a crankshaft journal and to be reciprocally received in a piston cylinder. The body can extend from the head. In some embodiments, the body is sized to be spaced from a corresponding crankcase wall or cylinder wall. In other embodiments, more than about 25%, such as more than about 33%, and in some instances, more than about 50%, of the body can have a substantially uniform width that is substantially the same as the head diameter. The body also can have a thickness substantially less than the piston diameter.

In some embodiments of pistons, the body has a substantially uniform width over a majority of the body that is substantially the same as the head diameter. In other embodiments, the body has a width being narrower than the head diameter.

Elongate bodies that are configured to pivotally engage a crankshaft journal can include a bearing configured to engage the crankshaft journal. Elongate bodies that include a bearing can also include a separable bearing cap defining a concave region and an end distal from the head configured to engage the separable bearing cap. The distal end defines a concave region, wherein the concave region of the bearing cap and the concave region of the end are together configured to substantially enclose the crankshaft journal when the end engages the bearing cap to substantially form the bearing configured to engage the crankshaft journal.

In some embodiments, the elongate body and the piston head define at least one oil pathway configured to distribute oil among the crankshaft journal and the piston cylinder. Bearing caps can define at least one oil pathway configured to distribute oil among the crankshaft journal and the piston cylinder. Pistons can also include one or more oil pathways configured to distribute oil to the piston head to promote cooling of the piston head during use.

Blocks for reciprocating-piston apparatus are disclosed that include a body of unitary construction, a longitudinal crankcase, a drive-member receiving region and at least first and second cylinders. The drive-member receiving region can be in communication with the crankcase and can define a central-axis-of-rotation. The at least first and second cylinders are in communication with the crankcase and have respective longitudinal axes disposed at an angle measuring between about 0-degrees and about 180-degrees relative to each other and longitudinally offset along the central-axis-of-rotation. The unitary body can define the crankcase, the drive-member receiving region, and the first and second cylinders. The first and second cylinders each include a substantially cylindrical top-portion that defines a diameter and a narrow central-portion having a first width perpendicular to the central-axis-of-rotation. The first width can be substantially the same as the diameter along the central-portion's length, or just part of the length (e.g., about 25% of the length, about 33% of the length, or more than about 50% of the length). A second width along the central-axis-of-rotation is substantially less than the diameter.

In some embodiments, the longitudinal axes of the first and second cylinders are longitudinally spaced along the crankcase by less than or equal to the diameter of the top-portion.

In some embodiments, the reciprocating-piston apparatus comprises an internal combustion engine for converting chemical energy of a fuel, in part, to mechanical work. In some embodiments, the reciprocating-piston apparatus comprises a positive displacement pump for pumping a fluid.

A crankshaft and bearing apparatus can include a crankshaft, at least a first piston, a drive member and an internal ring gear. The crankshaft defines at least one crankshaft drive having a crankshaft drive axis-of-rotation and at least one piston-journal radially spaced from the at least one crankshaft drive. The piston journal defines a piston-journal longitudinal axis spaced from the crankshaft drive axis-of-rotation. The drive member defines a central axis-of-rotation and a crankshaft drive receiving region for engaging the crankshaft drive. The piston engages the piston journal. The crankshaft drive has a corresponding pinion for engaging the ring gear. As the pinion rotates about the interior of the ring gear, the crankshaft drive axis-of-rotation orbits the central axis of rotation and urges the piston to linearly reciprocate.

In some embodiments, the ring gear is stationary. In some embodiments, the spacing between the crankshaft drive axis-of-rotation and the piston-journal longitudinal axis is about one-quarter the stroke of the piston.

Some embodiments include a block defining at least one cylinder bore for slidably receiving the at least one piston. The at least one piston can define an elongate surface that cooperates with a wall of the cylinder bore to guide the piston as it reciprocates. In some instances, the elongate surface provides a bearing surface. In some embodiments, the block houses the ring gear. In some instances, the ring gear is fixedly attached to the block.

In some embodiments, the at least one piston includes at least two pistons. In such embodiments, the crank includes at least two piston journals, each having a longitudinal axis. A first piston-journal longitudinal axis is radially spaced from the crankshaft drive axis-of-rotation. A second piston-journal longitudinal axis is radially spaced from the crankshaft drive axis-of-rotation and angularly offset from the longitudinal axis of the first piston journal by a first angle. In some instances, the pinion has a radius substantially equal to the radial spacing between the crankshaft drive axis-of-rotation and one or both of the piston journal longitudinal axes.

The at least one cylinder bore can include at least two cylinder bores for receiving the at least two pistons. The two cylinder bores are angularly offset from each other by a second angle, about one-half of the first angle. In some embodiments, the first angle ranges up to about 180-degrees, and the second angle ranges up to about 90-degrees. In some embodiments, the first angle is between about 90-degrees and about 180-degrees, and the second angle is between about 45-degrees and about 90-degrees. In some embodiments, the first angle is about 144-degrees and the second angle is about 72-degrees.

In some embodiments, the at least one piston includes at least four pistons. In some instances, the at least one piston includes at least six pistons. The at least one piston can include at least eight, at least ten or at least twelve pistons.

Exemplary combinations of features are set forth herein. Features from one exemplary combination can be combined and/or interchanged with features described in the context of other exemplary combinations. The foregoing and other features and combinations of features will become more apparent from the following detailed description, which proceeds with reference to the accompanying drawings.

BRIEF DESCRIPTION OF THE DRAWINGS

FIG. 9 illustrates a perspective view of a third embodiment of an assembled machine configured to convert motion from rotation to reciprocation, and vice-versa.

FIG. 10 illustrates an exploded, perspective view of the embodiment shown in FIG. 9.

FIG. 20 illustrates a perspective view of a drive-member configured according to the embodiment of FIG. 9.

FIG. 20A illustrates a top plan view of the drive-member of FIG. 20 showing hidden features in relief.

FIG. 20B illustrates a front elevation view of the drive-member of FIG. 20 showing hidden features in relief.

FIG. 23 illustrates a perspective view of an alternative embodiment for converting motion from rotation to reciprocation, and vice-versa.

FIG. 23A illustrates a front elevation view of the alternative embodiment of FIG. 23, showing internal features in relief.

FIG. 23B illustrates a cross-sectional view taken along line 23B-23B of FIG. 23A.

FIG. 24 illustrates a plot showing piston bore location relative to crankshaft angular displacement for an embodiment similar that of FIG. 10 compared to piston bore location relative to crankshaft angular displacement for a Ford 302 cubic inch engine.

FIG. 26 illustrates a perspective view of an embodiment similar to that of FIG. 10 incorporating a balance shaft and weighted drive-member. Selected internal features are shown in relief.

FIG. 26B illustrates a plan view of the embodiment of FIG. 26 from above, showing selected internal features in relief.

FIG. 26A illustrates a front elevation view of the embodiment of FIG. 26.

FIG. 26C illustrates a side elevation view of the embodiment of FIG. 26.

FIG. 29 illustrates an exploded, partial cross-sectional view of a four-cylinder embodiment of a machine for converting motion from rotation to reciprocation, and vice-versa. Selected features are shown in relief.

FIG. 29A illustrates a detailed view of the region encompassed by the circle 29A of FIG. 29.

FIG. 30 illustrates a perspective view of another piston embodiment.

FIG. 30A illustrates a plan view of the piston of FIG. 30.

FIG. 30B illustrates a front elevation view of the piston of FIG. 30.

FIG. 30C illustrates a side elevation view of the piston of FIG. 30.

FIG. 33 illustrates a perspective view of the intermediate shaft that places pairs of pistons out of phase in the embodiment illustrated in FIG. 32.

FIG. 33A illustrates a top plan view of the intermediate shaft of FIG. 33.

FIG. 33B illustrates an end elevation view of the intermediate shaft of FIG. 33, with hidden features shown in relief.

FIG. 35 illustrates a perspective view of another alternative embodiment for a drive-member.

FIG. 35A illustrates a plan view of the drive-member of FIG. 35 from above showing hidden features in relief.

FIG. 35B illustrates a front elevation view of the drive-member of FIG. 35 showing hidden features in relief.

FIG. 36 illustrates a perspective view of yet another alternative embodiment for a drive-member.

FIG. 36A illustrates another side elevation view of the drive-member of FIG. 36, showing hidden features in relief.

FIG. 36B illustrates a side elevation of the drive-member of FIG. 36, showing hidden features in relief.

FIG. 36C illustrates a front elevation of the drive-member of FIG. 36, showing hidden features in relief.

DETAILED DESCRIPTION

The following description concerns machines and methods for converting motion from rotation to reciprocation, and vice-versa. The following describes several exemplary useful embodiments, such as, for example, reciprocating piston engines, compressors and pumps. In many instances, mechanical work can be performed on a reciprocable piston that drives a rotatable shaft, or on a rotatable shaft that drives a reciprocable piston.

The following makes reference to the accompanying drawings which form a part hereof, wherein like numerals designate like parts throughout. The drawings illustrate specific embodiments, but other embodiments may be formed and structural or logical changes may be made without departing from the intended scope of this disclosure. Directions and references (e.g., up, down, top, bottom, left, right, above, below, rearward, forward, etc.) may be used to facilitate discussion of the drawings but are not intended to be limiting. For example, throughout the description below, conversion of motion from rotation to reciprocation should be understood as capable of being reversed, i.e., conversion of motion from reciprocation to rotation, unless expressly stated otherwise below. Similarly, conversion of motion from reciprocation to rotation should also be understood as being capable of being reversed. Accordingly, the following detailed description shall not be construed in a limiting sense and the scope of property rights sought shall be defined by the appended claims and their equivalents.

Hypocycloid Motion

A hypocycloid refers to any of a family of curves that results from following a single point on a circumference of a first circle as the first circle rolls around the interior of a second circle of larger diameter. If the diameter of the first circle is half that of the second circle, resulting hypocycloids are straight lines that span the second circle. This geometric relationship forms the basis of motion of machines described herein.

Figure 1:
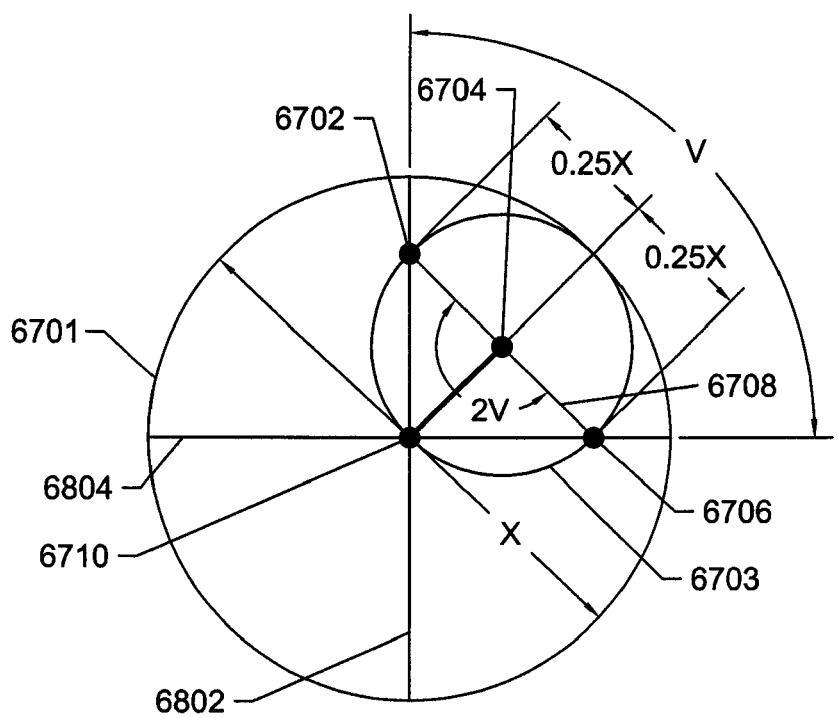
FIG. 1 illustrates geometric and spatial relationships concerning hypocycloid motion.

For example, with reference to FIG. 1, two points 6702 and 6706 located on a circumference of a circle 6703 (and in the case of FIG. 1, at opposing ends of a chord defining a diameter) are each spaced from the center 6704 of the circle by a distance of 0.25X. The angle 2V, e.g., 180-degrees in the example shown in FIG. 1, angularly separates the points 6702 and 6706 relative to the center 6704 of the circle 6703. The circle 6703 has a diameter of length 0.5X. The outer circle defines a diameter of length X.

As more fully discussed with regard to the sequence of positions shown in FIGS. 3(A)-3(I), as the circle 6703 rolls around the interior of the circle 6701, the center 6710 of the outer circle 6701 remains positioned on the circumference of the inner circle 6703. The points 6702 and 6706 also translate along the axes 6802 and 6804, respectively. The axes 6902 and 6804 intersect at the center 6710 of the outer circle.

The angular separation V of the axes 6802 and 6804 relative to the center 6710 is one-half of the angular separation 2V between the points 6702 and 6706. For the example shown in FIG. 1, the angle V measures about 90-degrees. The axes 6802 and 6804 have lengths X and define the stroke length, X, of the reciprocation of the points 6702 and 6706 along the axes.

With reference to FIGS. 3(A)-(I), generation of a pair of linear hypocycloids is illustrated as a first circle 6703 rolls about the interior of a second, larger circle 6701 with a diameter twice that of the first circle. The smaller circle 6703 rotates counter-clockwise about its center 6704 as it orbits about the central axis of rotation 6710, which coincides with the center of the larger circle. The smaller circle 6703 has a diameter 6708 equal to the radius of the larger circle 6701. As the smaller circle 6703 orbits the central axis of rotation 6710, points on the circumference of the smaller circle 6703, such as points 6702 and 6706, trace linear hypocycloids, such as the hypocycloids 6804 and 6802. If the points 6702 and 6706 are separated by 180-degrees on the smaller circle (as for example in FIG. 1), the resulting hypocycloids will be disposed at 90-degrees relative to each other. If the ratio of the large circle's diameter to that of the small circle is not equal to 2-to-1, then the resulting hypocycloids will not be linear. As more fully described below, if the angular separation 2V between the points 6702 and 6706 is less than about 180-degrees (as in FIG. 2), the angle V can measure less than about 90-degrees.

As described above concerning the geometric relationships shown in FIG. 1, varying the diameter X of the outer circle 6701 varies the length of the stroke through which the points 6702 and 6706 travel. As more fully described below, these points can correspond to axes of respective crank-pins (or piston-journals) of a crankshaft, such as, for example, the crankshaft 116 shown in FIG. 10.

Figure 2:
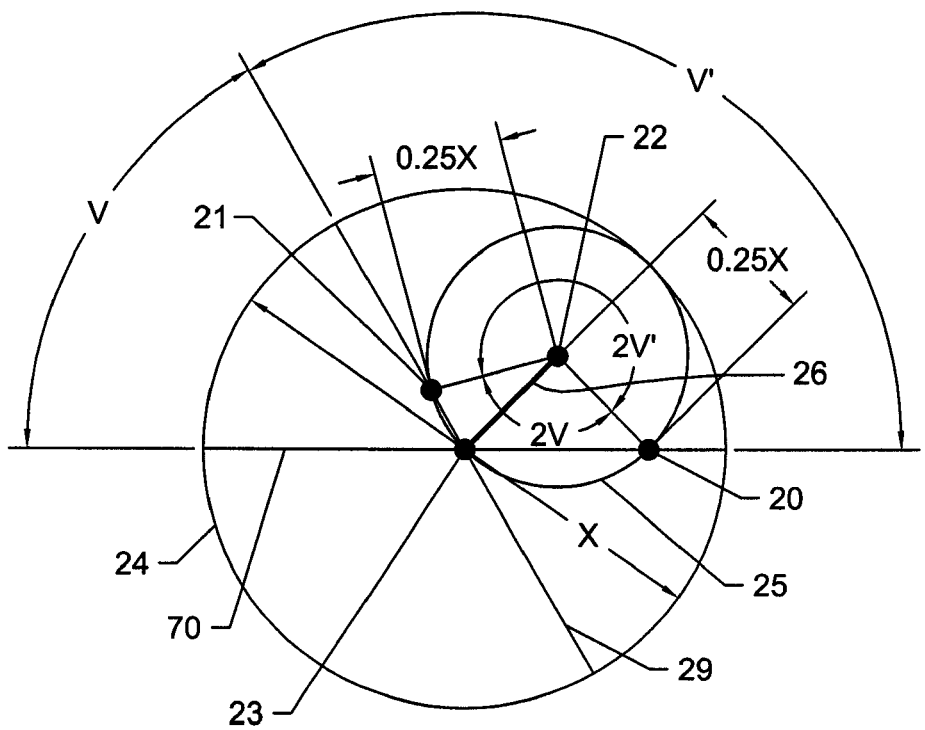
FIG. 2 illustrates additional geometric and spatial relationships concerning hypocycloid motion.
Figure 3:
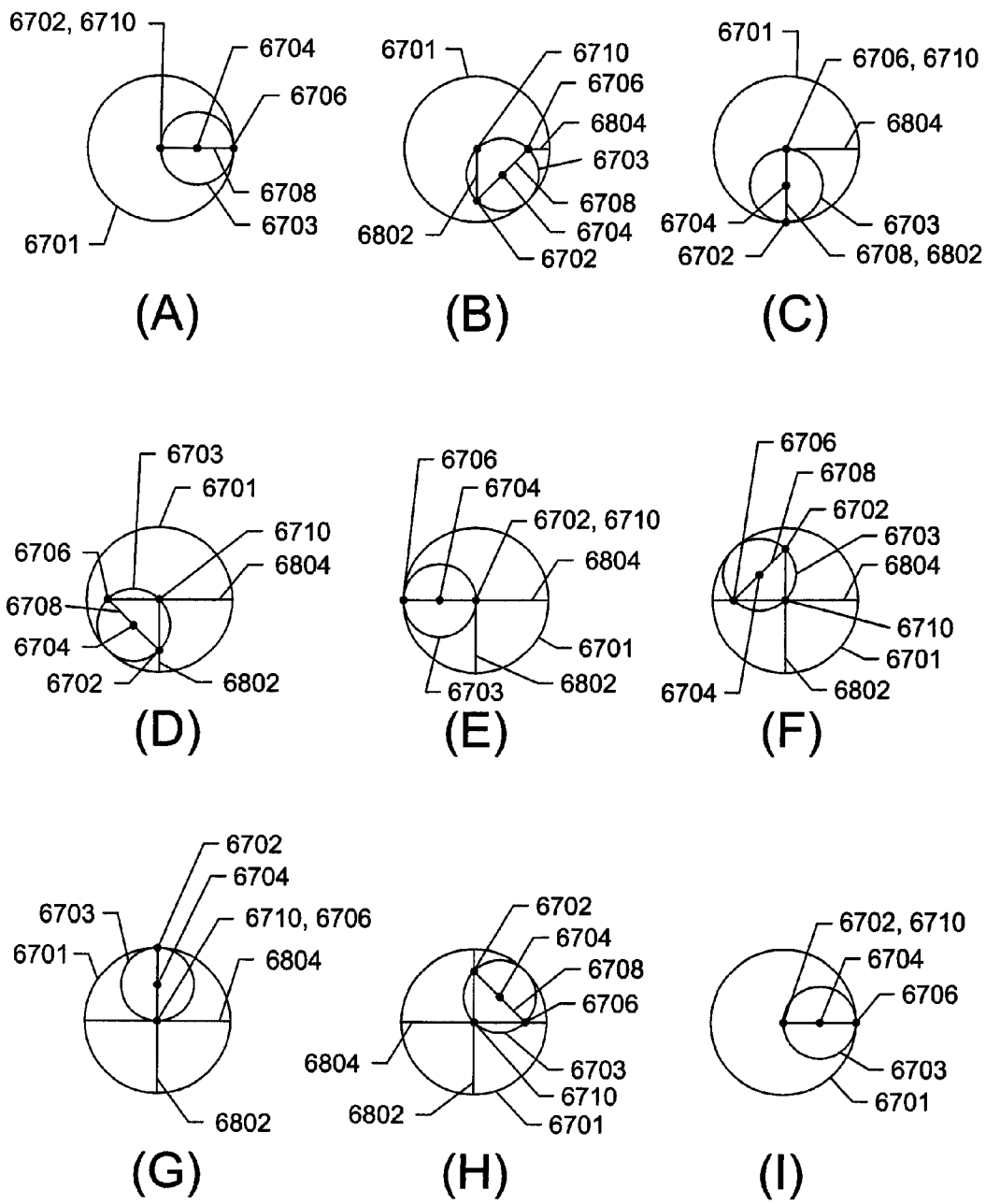
FIG. 3 a schematic timing diagram illustrating various positions of a pair of circles, in sequence, undergoing hypocycloid motion.
Figure 4:
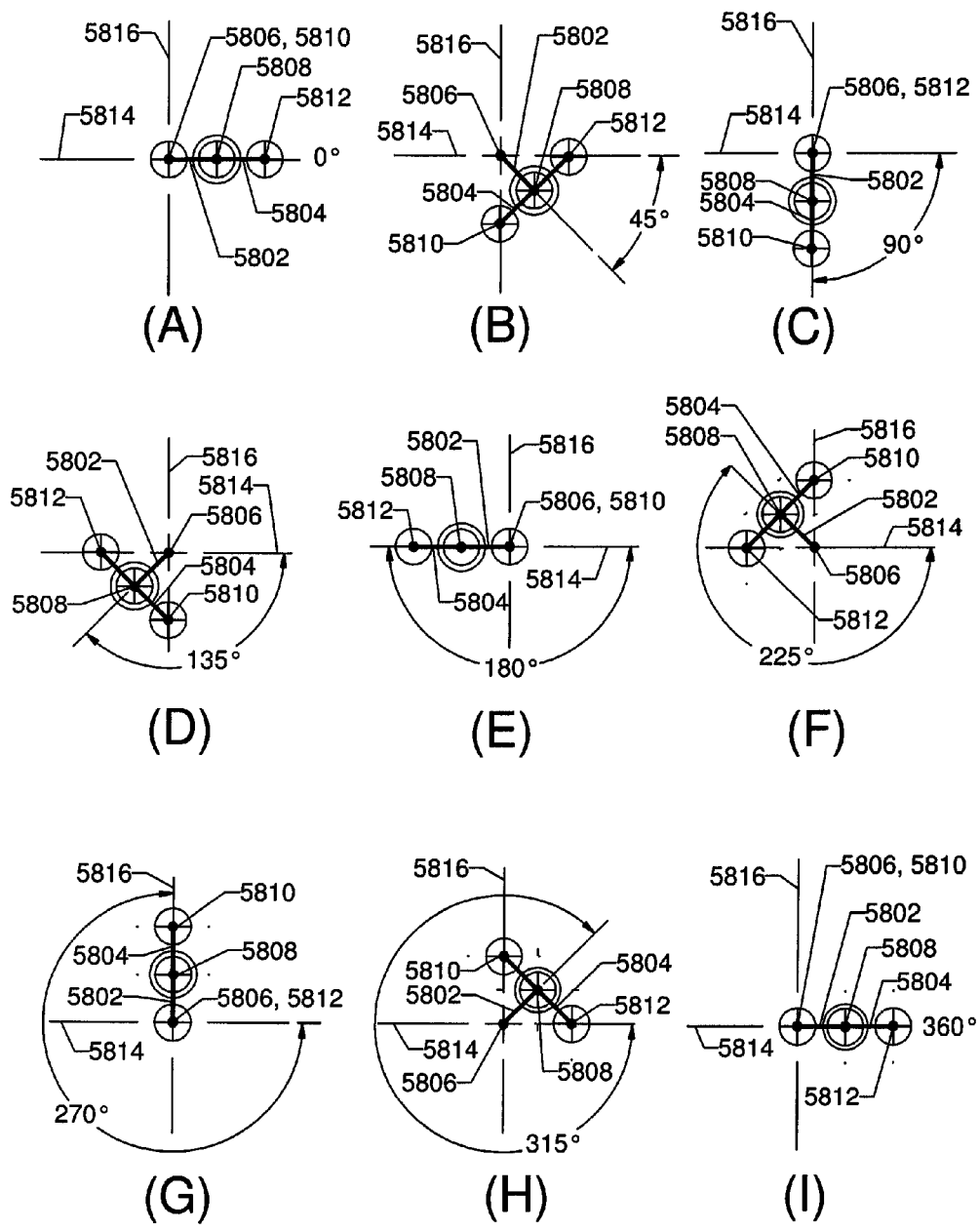
FIG. 4 illustrates a linkage representation of an embodiment similar to that shown in FIG. 9 at various sequential positions.
Figure 5:
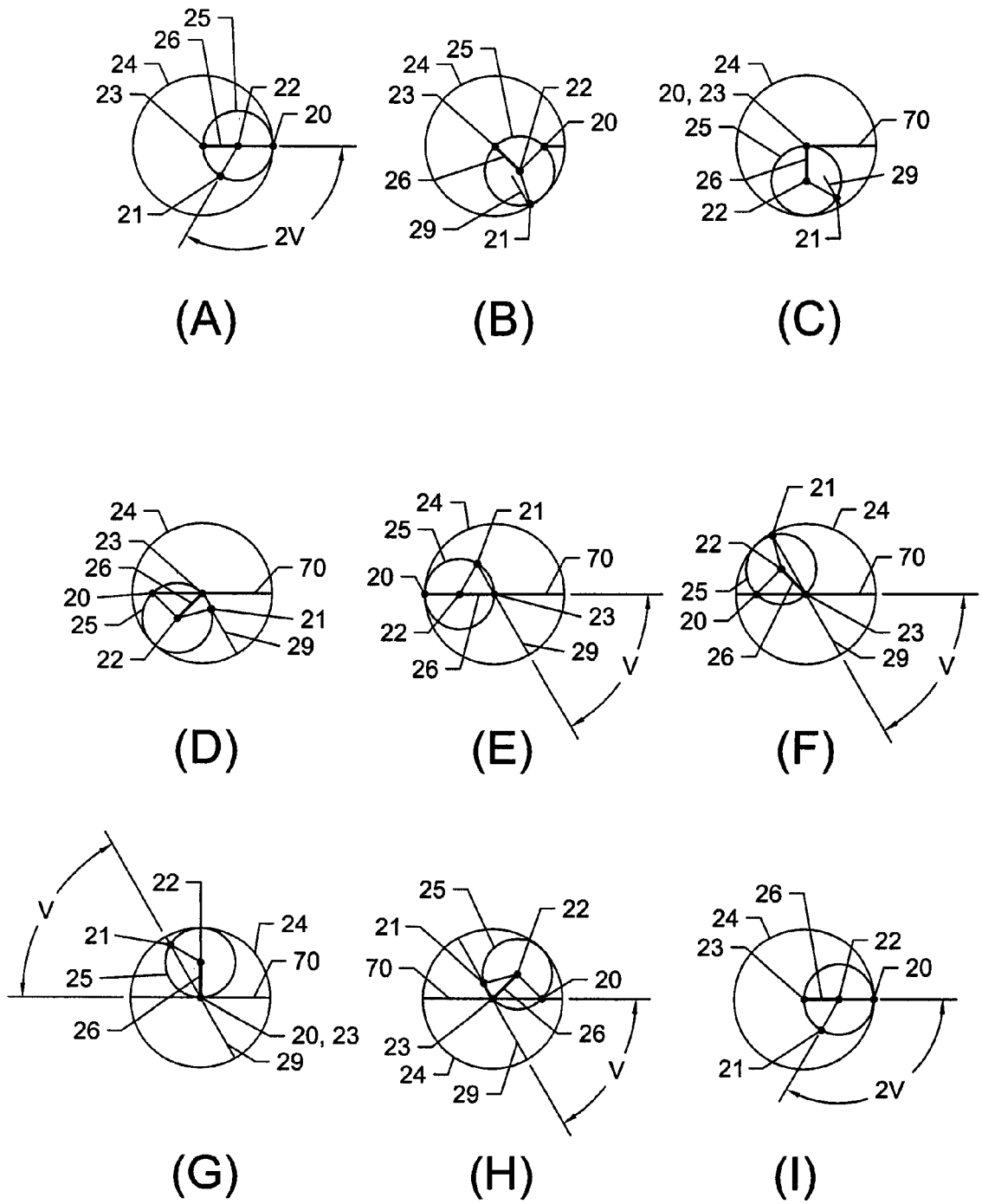
FIG. 5 is a schematic timing diagram illustrating various positions of another pair of circles in sequence during hypocycloid motion.
Figure 6:
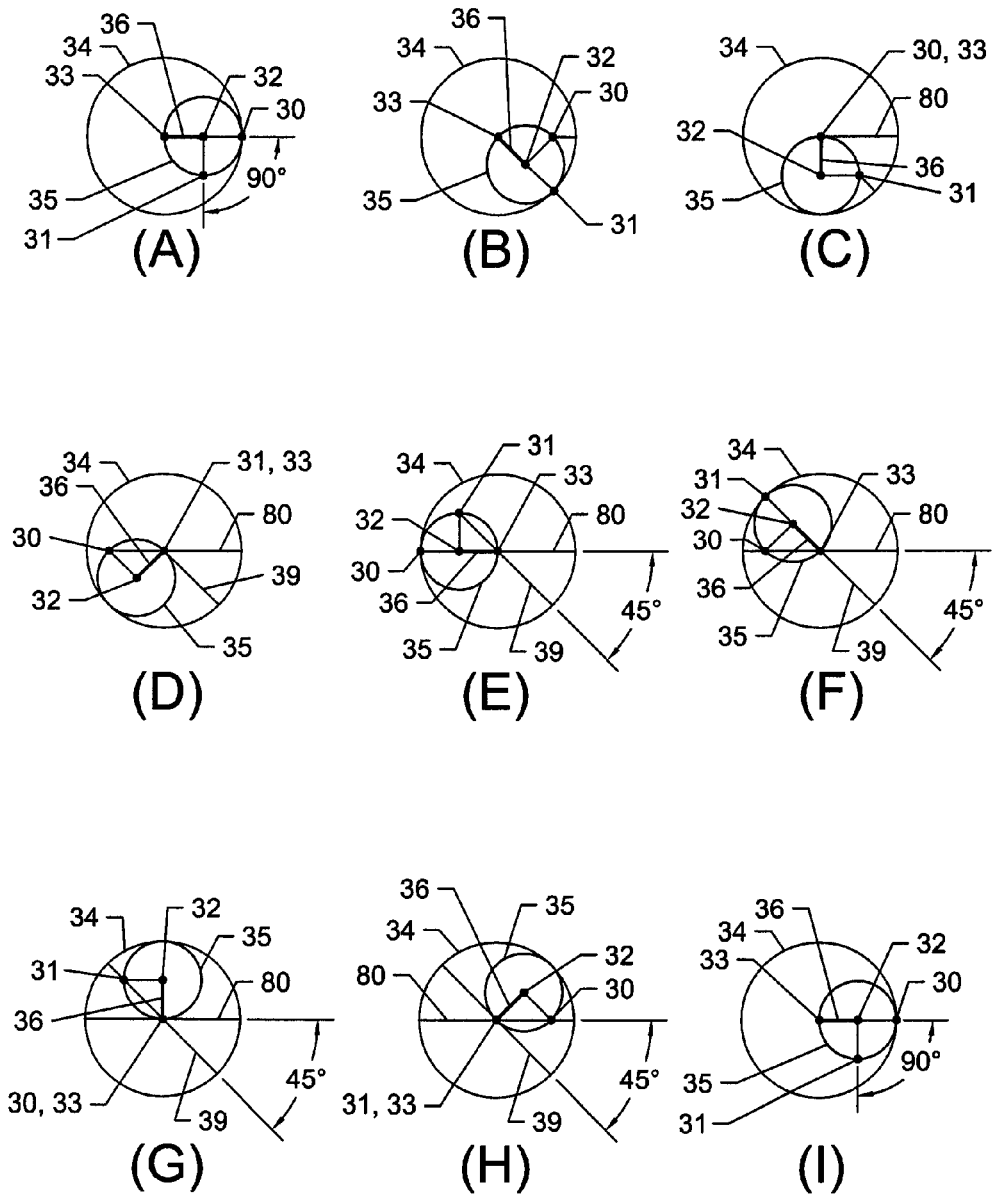
FIG. 6 is a schematic timing diagram illustrating various positions of a third pair of circles in sequence during hypocycloid motion.

FIG. 2 shows a pair of circles 24, 25 similar to the circles 6701, 6703 shown in FIG. 1. Points 20, 21 located on the circumference of the inner circle 24 are angularly separated by an angle 2V relative to the center 22 of the circle 25, such as, for example, by about 120-degrees (or 2V' being about 240-degrees). The diameter of the outer circle 24 has a length X and the diameter of the inner circle 25 has a length half as long, i.e., 0.5X. The points 20, 21 are spaced from the center 22 of the inner circle 25 by 0.25X.

As more fully described below with respect to FIGS. 5(A)-5(I), rolling the inner circle 25 around the inner circumference of the outer circle 24 reciprocates the points 20 and 21 along the axes 70 and 29, respectively. The axes 29, 70 intersect at the center 23 of the outer circle 24 and form an angle V corresponding to the angle 2V (or in some embodiments, the angle 2V').

First Exemplary Applied Geometry Operational Overview

In FIG. 1, the angular separation V between the two points 6702 and 6706 located at opposing ends of the diameter of, and on the circumference of, the inner circle 6703 relative to the center 6704 of the inner circle measures 180-degrees. As applied to reciprocating piston machines using a hypocycloid geometry (also referred to herein as "MTM architecture") the selected two points 6702 and 6706 on the inner circle 6703 correspond to respective longitudinally extending crank-pin axes (e.g., the axes 502 and 506 shown in FIG. 19B), and the center 6704 of the inner circle 6703 corresponds to the crankshaft-drive axis (e.g., the axis 504 shown in FIG. 19B).

As described above, the angle V shown in FIG. 1 represents the angular separation of the axes 6802 and 6804 traced by the points 6702 and 6706 located on the circumference of the inner circle 6703 as the inner circle rolls within the outer circle 6701. As applied to an MTM architecture, the axes 6802 and 6804 correspond to longitudinal axes of respective piston-cylinder bores (e.g., the longitudinal axes 150, 152 of the respective cylinder bores 110, 112 shown in FIG. 10). As applied to an MTM architecture and shown, for example in FIG. 10, the center 6710 of the outer circle 6701 corresponds to the central axis of rotation 114, about which the crankshaft 116 orbits and the drive member 104 turns.

Figure 7:
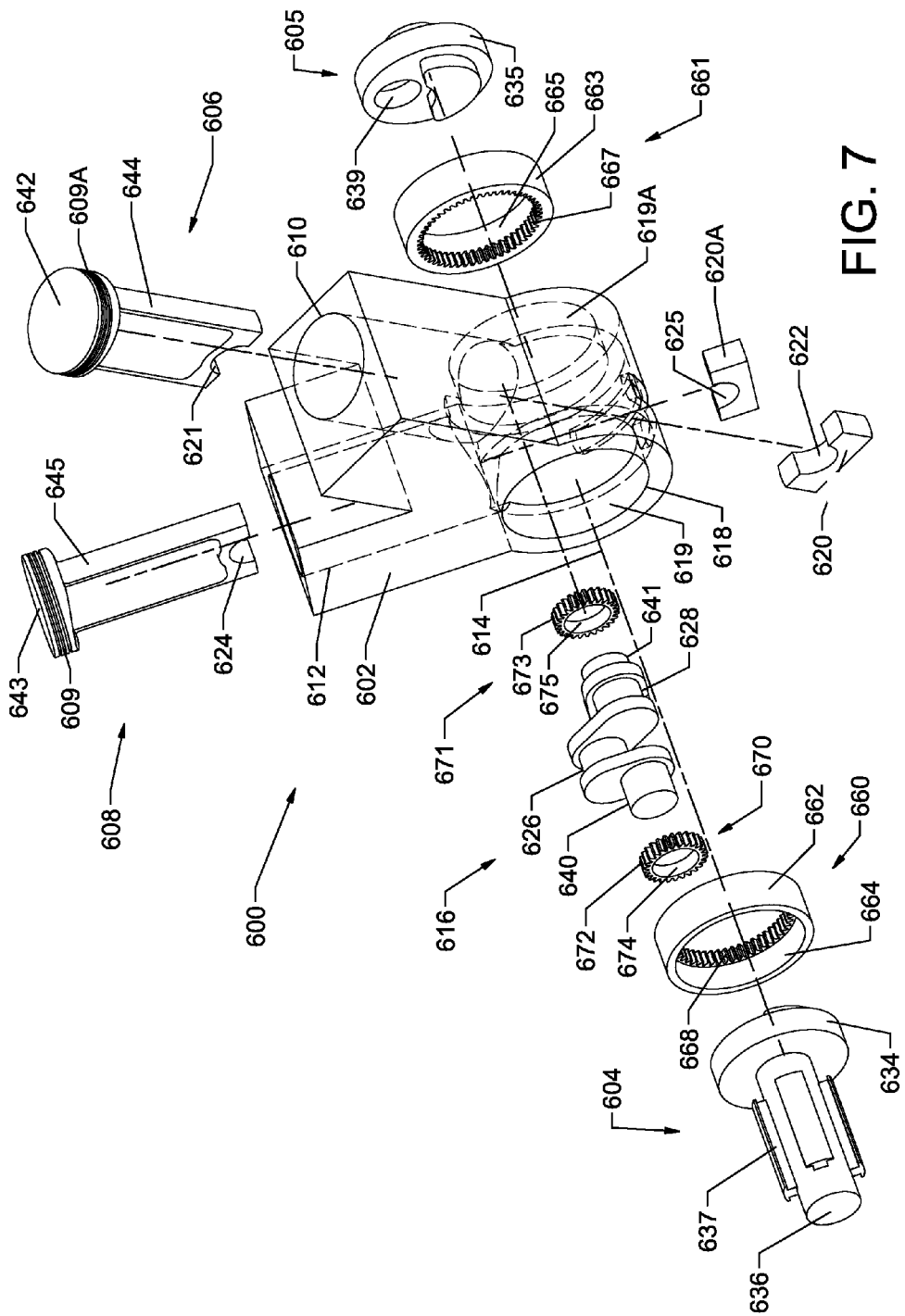
FIG. 7 is an exploded view of one embodiment of a machine configured to convert motion from rotation to reciprocation, and vice-versa.

As shown in FIG. 1, the circle 6703 has a diameter of length 0.5X and the circle 6701 has a diameter of length X. As applied to some embodiments of an MTM architecture, as, for example, shown in FIG. 7, the diameter 0.5X of the inner circle 6703 is about equal to a circular pitch diameter of a crankshaft drive pinion gear 670, 671. With further reference to FIGS. 1 and 7, the diameter X of the outer circle 6701 corresponds to a circular pitch diameter of the ring gear(s) 660 and 661.

The hypocycloid motion and MTM architecture just described can result from, or be schematically represented by, a pair of pinned (e.g., pivotally connected) linkages, as shown by FIGS. 4(A)-(I). The first linkage 5802 pivotally couples at its proximal end 5806 to a fixed reference frame, forming a central axis of rotation. The first linkage 5802 is also pinned at its distal end 5808 to, and bisecting, the second linkage 5804. The second linkage 5804 is twice as long as the first linkage 5802. As the first linkage 5802 rotates clockwise about the central axis of rotation, the second linkage 5804 rotates counter-clockwise.

FIGS. 4(A)-(I) illustrate a series of relative positions of the pair of linkages 5802 and 5804 through one complete revolution of the first linkage 5802 about the central axis of rotation. As shown, the opposing ends 5810 and 5812 of the second linkage 5804 describe linearly reciprocating strokes along axes 5814 and 5816, which are disposed at 90-degrees relative to each other. Accordingly, a linkage mechanism for converting motion from rotation to reciprocation, and vice-versa, can use a slidable piston pivotally coupled to the opposing ends 5810 and 5812 of the second linkage 5804, as described in more detail below.

FIG. 58 FIG. 4(A) illustrates the relative positions of the linkages 5802 and 5804 with the first linkage 5802 at zero-degrees of rotation (e.g., a starting position). At this position, the second linkage 5804 is aligned with the first axis 5814 and the first end 5812 is at its Top Dead Center (TDC) location. The second end 5810 is aligned with the central axis of rotation.

FIG. 4(B) illustrates relative positions of the linkages 5802 and 5804 with the first linkage 5802 rotated clockwise by 45-degrees. The second linkage 5804 has rotated 45-degrees counter-clockwise relative to its starting position. The first end 5812 has translated along the first axis 5814 toward the central axis of rotation 114. The second end 5810 has translated along the axis 5816 toward its Bottom Dead Center (BDC) position.

FIG. 4(C) illustrates relative positions of the linkages 5802 and 5804 with the first linkage 5802 rotated clockwise by 90-degrees. The second linkage 5804 has rotated counter-clockwise by 90-degrees relative to its starting position, placing the first and second linkages 5802 and 5804, respectively, in alignment. At this position, the end 5812 coaxially aligns with the central axis of rotation. The second end 5810 is at BDC along the second axis 5816.

FIG. 4(D) illustrates relative positions of the linkages 5802 and 5804 with the first linkage 5802 rotated clockwise by 135-degrees. The second linkage 5804 has rotated 135-degrees counter-clockwise relative to its starting position. The first end 5812 has translated along the first axis 5814 past the central axis of rotation 114. The second end 5810 has translated along the axis 5816 from BDC toward TDC.

FIG. 4(E) illustrates relative positions of the linkages 5802 and 5804 with the first linkage 5802 rotated clockwise by 180-degrees. The second linkage 5804 has rotated counter-clockwise by 180-degrees relative to its starting position, placing the first and second linkages 5802 and 5804, respectively, in alignment. At this position, the end 5812 is at BDC and the second end 5810 aligns with the central axis of rotation.

FIG. 4(F) illustrates relative positions of the linkages 5802 and 5804 with the first linkage 5802 rotated clockwise by 225-degrees. The second linkage 5804 has rotated 225-degrees counter-clockwise relative to its starting position. The first end 5812 has translated along the first axis 5814 from its BDC location toward the central axis of rotation 114. The second end 5810 has translated along the axis 5816 past the central axis of rotation and toward its TDC position.

FIG. 4(G) illustrates relative positions of the linkages 5802 and 5804 with the first linkage 5802 rotated clockwise by 270-degrees. The second linkage 5804 has rotated counter-clockwise by 270-degrees relative to its starting position, placing the first and second linkages 5802 and 5804, respectively, in alignment. At this position, the end 5812 coaxially aligns with the central axis of rotation. The second end 5810 is at TDC along the second axis 5816.

FIG. 4(H) illustrates relative positions of the linkages 5802 and 5804 with the first linkage 5802 rotated clockwise by 315-degrees. The second linkage 5804 has rotated 315-degrees counter-clockwise relative to its starting position. The first end 5812 has translated along the first axis 5814 past the central axis of rotation 114. The second end 5810 has translated along the axis 5816 from TDC toward BDC.

FIG. 4(H) corresponds to the position of the respective geometric relationships shown in FIG. 1. For example, the diameter of the inner circle 6703 is 0.5X, or equal to the radius of circle 6701, and corresponds to a revolved diameter of the piston crankpin axes 5810 and 5812 shown in FIG. 4(H) (e.g., for crankshafts having piston crankpin axes separated by 180-degrees). The revolved diameter of the piston crankpin axes defines one-half of a piston stroke for a corresponding piston.

As described above concerning MTM architecture, the center 6704 of the inner circle 6703 shown in FIG. 1 corresponds to the central axis 5808 about which a planetary crankshaft (e.g., the linkage 5804) revolves. The axis 5808 is coaxially located relative to the crankshaft-drive (e.g., the crankshaft-drive 140 and 141 shown in FIGS. 19-19C) and a corresponding crankshaft-drive receiving region of a drive member (e.g., the crankshaft-drive receiving region 138 and 139 shown in FIGS. 10 and 11). With further reference to FIG. 4H, the illustrated linkage 5802 between the central axis of rotation 5806 and the axis of revolution 5808 corresponds to a drive member (e.g., the drive member 104 shown in FIG. 10).

FIG. 4(I) illustrates relative positions of the linkages 5802 and 5804 with the first linkage 5802 rotated clockwise by 360-degrees. The second linkage 5804 has rotated counter-clockwise by 360-degrees relative to its starting position, placing the first and second linkages 5802 and 5804 in their respective starting positions.

Applied Kinematics

The second linkage 5804 of FIGS. 4(A)-(I) forms a class 2 lever, with loads transmitted at its midpoint to and/or from the first linkage 5802, and with opposing ends 5812 and 5810 pivotally and slidably constrained. With respect to FIGS. 4(A)-(I) the first linkage 5802 can be functionally described as a crank-arm that rotates about a central axis of rotation, and that transmits class 3 lever loads to the second linkage 5804 and class 2 lever loads from the second linkage 5804.

Thus, FIGS. 4(A)-(I) illustrate that reciprocation of the opposing ends 5812 and 5810 along the axes 5814 and 5816, respectively, drives rotation about a central axis of rotation, or conversely, that rotation about the central axis of rotation drives reciprocation.

Applied Geometry Operational Overview for Additional Examples

FIG. 2 illustrates an exemplary hypocycloid geometry having an angular separation 2V measuring less than 180-degrees, such as for example, about 120-degrees, between two points 20, 21 (relative to a center 22 of the inner circle 25). The inner circle 25, like the inner circle 6703 in FIG. 1, has a radius of 0.25X and a corresponding diameter of 0.5X. The outer circle 24, like the outer circle 6701 in FIG. 1, has a diameter X being twice that of the inner circle 25.

With reference to FIGS. 2 and 5(A)-5(I), by revolving the circle 25 within the circle 24, the points 20 and 21 trace axes 70 and 29, respectively. Each of these axes 29 and 70 bisect the outer circle 24, and intersect at the outer circle's center 23. The angular separation V of the axes 29 and 70 relative to the center 23 measures one-half of the angular separation 2V between the points 20 and 21, e.g., about 60-degrees for the example shown in FIG. 1. As noted above, the angle 2V' can be used to characterize the angular separation between the points 20, 21. The axes would then be said to be oriented at an angle V' (measuring one-half of the angle 2V').

Varying the angle 2V separating the points 20, 21 varies the angle V separating the axes 29 and 70. Although many pairs of angles 2V and V are possible, some exemplary pairs of angles 2V and V are 90-degrees and 45-degrees, 144-degrees and 72-degrees, and 240-degrees and 120-degrees. Please refer to FIGS. 6(A)-6(I), 7 and 8A-8D and the corresponding description below for further exemplary pairs of angles 2V and V.

According to the geometric relationships shown in FIG. 2, varying the diameter X of the outer circle 24 varies the length of the stroke through which the points 20, 21 travel. As with the points 6702 and 6706 described above with reference to FIGS. 1 and 3(A)-3(I), the points 20, 21 can correspond to longitudinally extending axes of respective crank-pins (or piston-journals) of a crankshaft, such as, for example, the crankshaft 616 shown in FIG. 7.

As noted above and described more fully below with regard to FIGS. 27 and 28, either of the points 20, 21 individually reciprocate along a respective axis 29, 70. Such a single-point example of hypocycloid motion can represent a single-cylinder MTM architecture.

With reference to FIGS. 5(A)-(I) and 6(A)-(I) schematic timing diagrams are shown for various sequential positions of respective pairs of circles undergoing hypocycloid motion. The sequence shown in FIGS. 5(A)-5(I) corresponds with the geometry described above and shown in FIG. 2. The points 20, 21 on the inner circle 25 are separated by an angle 2V measuring less than 180-degrees and greater than about 90-degrees (e.g., about 120-degrees) relative to the center 23.

As shown by the progression of positions in FIGS. 5(A)-5(I), the points 20, 21 reciprocate along corresponding axes 29, 70. The axes 29, 70 are angularly offset from each other by an angle V measuring one-half of the angle 2V measured between the points 20, 21 relative to the center 23 of the circle 25. For example, in an embodiment with points on the inner circle 25 being offset by an angle 2V measuring about 144- degrees, the corresponding axes of reciprocation 29, 70 are offset by angle V measuring one-half of about 144-degrees (e.g., about 72-degrees).

Figure 8A:
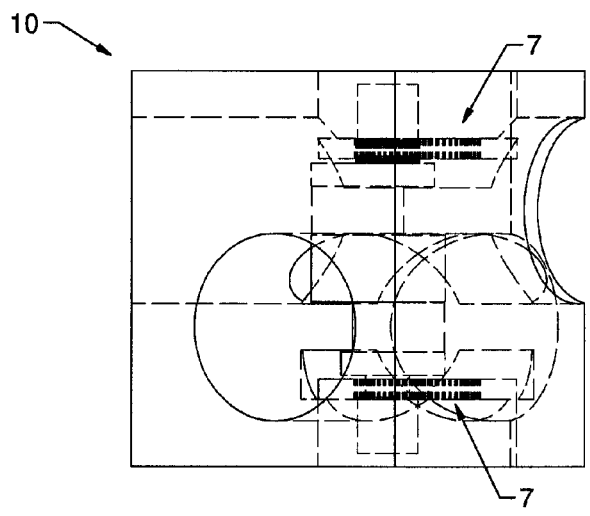
FIG. 8A illustrates a side elevation of an alternative embodiment of a machine configured to convert motion from rotation to reciprocation, and vice-versa.
Figure 8C:
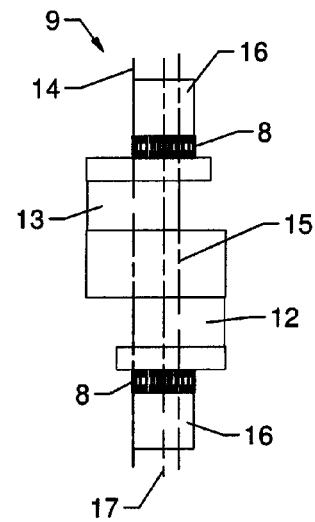
FIG. 8C illustrates a plan view of the crankshaft of the embodiment of FIGS. 8A and 8B having piston journals angularly offset by other than 180-degrees.
Figure 8B:
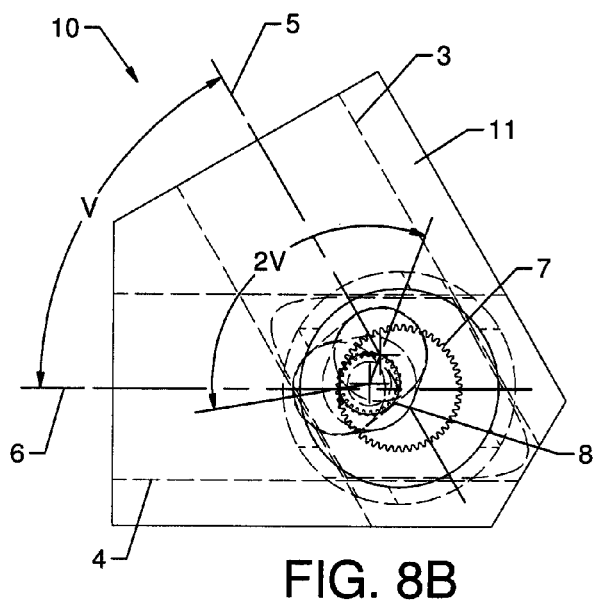
FIG. 8B illustrates a front elevation of the embodiment shown in FIG. 8A.
Figure 8D:
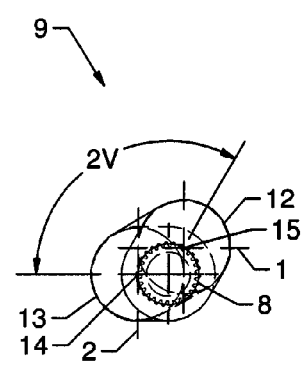
FIG. 8D illustrates an end elevation of the crankshaft shown in FIG. 8C.

The geometric relationships described with regard to FIGS. 2 and 5(A)-5(I) can be applied to an MTM architecture, as shown in, for example, FIGS. 8B and 8D. With reference to FIGS. 8B and 8D, a crankshaft 9 can have longitudinal axes 14, 15 of respective piston journals 12, 13 offset by an angle 2V measuring about 144-degrees. The respective axes 5, 6 of the piston cylinders 3, 4 (shown in FIG. 8B) are angularly offset by an angle V measuring one-half of the angle 2V (e.g., about 72-degrees).

With reference again to FIGS. 2 and 5(A)-5(I), the points 20, 21 can be separated (and, with reference to, for example, FIG. 8D, the corresponding longitudinal axes 14, 15 of piston journals 12, 13 can be offset), generally, by an angle measuring from zero to 360-degrees. The corresponding axes of reciprocation (e.g., the axes 5, 6 shown in FIG. 8B) can be offset by one-half the angle between the points 20, 21 (and the axes 5, 6), or from zero- to 180-degrees. Some blocks have cylinders angularly offset by as much as 180-degrees, as in a "boxer" configuration. Other embodiments have cylinders that are longitudinally offset along the central axis-of-rotation without being angularly offset (as with an "inline" configuration). In some instances, a pair of corresponding pistons are angularly offset by about 180-degrees, but not longitudinally offset along the central axis-of-rotation. In these embodiments (not illustrated), a piston head, such as the piston head 142 (see FIG. 10), can be positioned at opposing ends of a single elongate piston body.

FIGS. 6(A)-6(I) illustrate a progression of hypocycloid positions similar to that shown in FIGS. 5(A)-5(I), except that the points 30, 31 are angularly offset by about 90-degrees relative to the center 32 of the inner circle 35. Features in FIGS. 6(A)-6(I) are numbered similarly to features shown in FIGS. 5(A)-5(I), except that the reference numerals in FIGS. 6(A)-6(I) are incremented by ten. For example, the points 30, 31 in FIGS. 6(A)-6(I) are similar to the points 20, 21. The resulting reciprocation of the points 30, 31 occurs along lines 80, 39, which are offset by one-half of the offset between the points 30, 31 (e.g., about 45-degrees).

Overview of Reciprocating Piston Machines and a First Exemplary Embodiment

FIG. 7 illustrates an exploded view of one exemplary embodiment of a reciprocating piston machine incorporating MTM architecture. As shown, the piston-cylinders 610 and 612 of the cylinder block 602 are angularly displaced relative to the central axis of the crankcase 618 by an angle V measuring approximately 45-degrees. The planetary crankshaft 616 comprises crankpins 626, 628 being angularly offset relative to the crankshaft drives 640, 641 by an angle 2V measuring approximately 90-degrees.

The pistons 606 and 608 respectively comprise piston heads 642 and 643, piston-ring receiving regions 609 and 609A, and elongate bodies 644 and 645 being narrower than a major diameter of the respective piston-ring receiving region. The proximal end of each elongate body 644, 645 defines a respective recessed region 621, 624. Each end-cap 620, 620A (also referred to herein as a "bearing cap") defines a respective recessed region 622, 625 and is configured to engage a proximal end of a corresponding elongate body 644, 645 for pivotably capturing the crankpins 628 and 626 of the crankshaft 616 between opposing recessed regions 621, 622 and 624, 625. Each piston 606, 608 is slidably disposed in a corresponding piston-cylinder bore 610, 612.

Ring-gear receiving regions 619 and 619A defined by the crankcase 618 can receive respective internal ring gears 660 and 661. Pinions 670 and 671 defining corresponding pinion bores 674, 675 can be coaxially affixed (as by, for example, press fitting, welding) to respective crankshaft-drives 640 and 641 located at opposing ends of the crankshaft 616.

Each of the illustrated ring gears 660, 661 define respective drive-member receiving regions 664, 665 for receiving a corresponding drive-member 604, 605 in a concentric relationship with the respective drive-member sidewall 634, 635. Each ring gear 660, 661 also comprises an internal ring gear cog region 667, 668 for matingly engaging corresponding cogs 672, 673 of a respective pinion 670, 671.

The internal ring gear cogs 667 and 668, and crankshaft-drive pinion cogs 673 and 672, can be left and right handed helical pitch cogs. Such cog configurations can provide axial spacing of the crankshaft. Alternatively double helix (herringbone) pinion and internal ring gear cogs at one of the respective crankshaft ends, e.g. cogs 668 and 672 can provide axial spacing of the crankshaft. Helical gears also provide more silent operation.

Each drive-member 604, 605 defines a crankshaft-drive receiving region 639 (visible in FIG. 7 only on the drive-member 605) for receiving a corresponding crankshaft-drive 640, 641. Each drive-member 604, 605 also defines a corresponding driveshaft 636 (visible in FIG. 7 only on the drive-member 604). The drive shaft can be received in a bearing housing (not shown) positioned coaxially relative to the crankcase 618 and the central axis of rotation about which the planetary crankshaft 616 orbits. The driveshaft 636 can, in some embodiments, comprise an electrical armature 637. Such an electrical armature can be driven by the drive-member 604 or alternatively be used to drive the drive-member 604 through rotation, which in turn can drive the pistons 606, 608 through reciprocation (as for use as a positive displacement pump, such as a compressor used in vapor-cycle refrigeration).

As described above with reference to the sequence of positions shown in FIGS. 6(A)-6(I), the inner circle 35 "rolls" within the outer circle 34 such that the center 32 of the inner circle 35 orbits the center 33 of the outer circle 34 in a clockwise direction. The center 33 of the outer circle 34 is analogous to a central axis of rotation about which the crankshaft 616 shown in FIG. 7 orbits and about which the drive member 604 turns. Again with reference to FIGS. 6(A)-6(I) and FIG. 7, the center 32 of the small circle 35 is analogous to a crankshaft axis-of-revolution (not shown) about which the crankshaft 616 revolves as it orbits the central-axis-of-rotation 614. The radially extending line 36 in FIGS. 6(A)-6(I) is analogous to the radius of the orbit of the crankshaft axis-of-rotation about the central axis-of-rotation.

By way of example, the piston-cylinders 610 and 612 are substantially cylindrical in shape and in the illustrated example are not narrowed to correspond to the shape of the elongate bodies 644, 645 of the pistons. Also by way of example, the illustrated cylinders 610, 612 do not transect the crankcase, as in other disclosed exemplary embodiments. These are among many features that can reduce friction.

The illustrated elongate bodies 644 and 645 are narrowed in at least one dimension with respect to the diameter of the piston heads 642 and 643. In such embodiments, respective "swept areas" of sliding contact between each respective piston 606, 608 and piston-cylinder 610, 612 is thus reduced compared to a piston having an elongate body in sliding contact with a portion of the piston cylinder.

It is believed that with embodiments using a ring-gear and pinion arrangement substantially eliminate piston to piston-cylinder eccentric forces what could be present in other embodiments omitting a ring-gear/pinion arrangement, as described below. This embodiment illustrates but one example of a narrow-angle, compact, piston machine having low slider-mechanism friction-losses and high-efficiency in translating reciprocation to rotation, and vice-versa.

Although not illustrated, some embodiments of the type shown in FIG. 7 can employ removable piston-cylinders.

Second Exemplary Embodiment

Additional features of pistons, crankshafts, drive-members and blocks are described with reference to FIGS. 1-6, 8A-8D, and 38.

FIGS. 8A and 8B illustrate an alternative embodiment of a motion translation mechanism 10 incorporating MTM architecture. In this alternative embodiment, the planetary crankshaft 9 (shown in FIGS. 8C and 8D) includes one or more pinions 8 for rotatably engaging a ring gear 7, as described above. The longitudinal axes 14, 15 of the piston journals 12, 13 radially spaced from the crankshaft-drive axis-of-rotation 17 and angularly offset from each other by an angle 2V.

Although the illustrated crankshaft 9 includes pinions 8 positioned adjacent the crankshaft drive 16, the pinions 8 can be located at various other locations along the crankshaft 9. The crankshaft drive 16 can be configured as described herein.

In some embodiments, the radius of the pinion 8 (e.g., a circular pitch radius) is substantially equal to the radial spacing from the crankshaft-drive axis-of-rotation 17 and the longitudinal axis 14, 15 of one or both piston journals 13, 12. The ring gear 7 can be stationary relative to the block 10. In some instances the ring gear 7 is allowed to rotate relative to the block 10, such as to drive power take off devices. In some embodiments, the ring gear 7 comprises at least a portion of a drive-member, such as a portion of a drive-member receiving region. The stationary ring gears 7 of FIGS. 8A and 8B are fixedly attached to the block 11 in a region adjacent the drive-member receiving region and independent of the drive-member (not shown). In other embodiments, the ring gear 7 can be disposed wholly or partially within a corresponding drive-member receiving region, and can be independent of, or integrated with, the respective drive-member.

The block 11 defines a pair of piston cylinders, or cylinder bores, 3, 4 similar to those described above. Each cylinder bore defines a longitudinal axis 5, 6 along which corresponding pistons (not shown) reciprocate. The cylinders 3, 4 in the block 10 are longitudinally spaced along the central axis-of-rotation and angularly offset from each other by an angle, V. In other words, cylinders 3, 4 in the block 10 should be angularly offset by about one-half the angle between the longitudinal axes 14, 15 of the corresponding crankshaft piston journals 12, 13.

In some embodiments (not illustrated), the crankshaft has one piston journal, and the block defines one corresponding piston cylinder. In embodiments of this type, the pinion and ring gear engagement and drive-member provides lateral support to the crankshaft.

Figure 38:
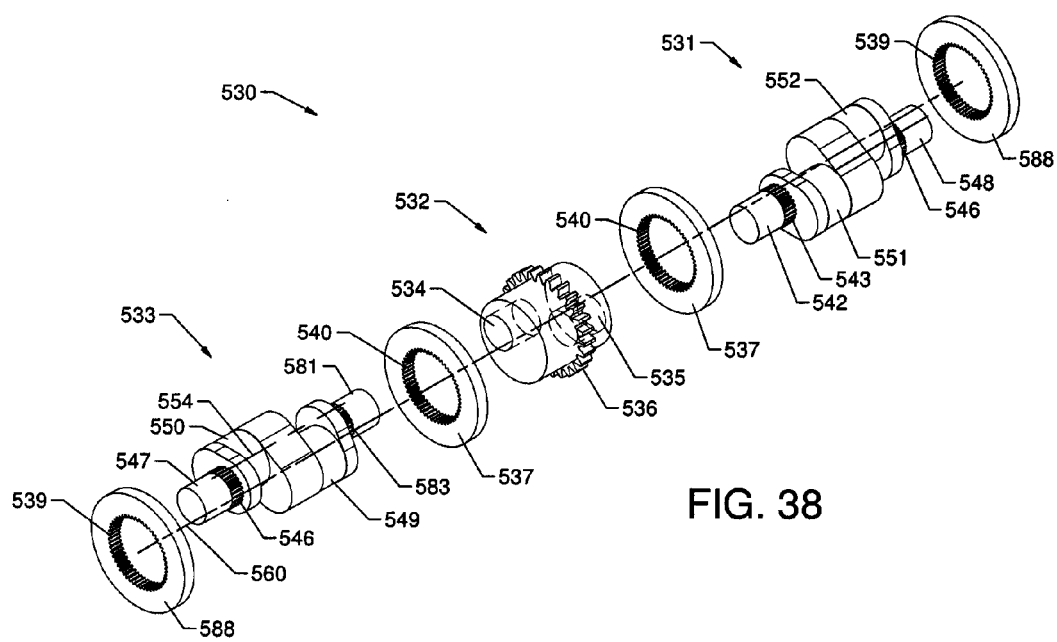
FIG. 38 is a perspective exploded view illustrating a multi-part crankshaft having piston journals angularly offset by other than 180-degrees and being configured to reciprocate pairs of pistons out of phase with each other.

In other embodiments, the crankshaft defines more than two piston journals, each with a corresponding piston. Blocks can define a corresponding cylinder for each of the pistons. As with the multi-cylinder embodiments described above, crankshafts that have piston journals angularly offset by other than 180-degrees can be coupled using an intermediate shaft to provide out-of-phase piston reciprocation. The crankshaft 530 illustrated in FIG. 38 is one such embodiment.

The crankshaft 530 has a first crankshaft portion 531 and a second crankshaft portion 533 coupled to each other by the intermediate shaft 532. The respective first crankshaft drives 581, 542 engage corresponding openings 534, 535 in the intermediate shaft 532, and the respective second crankshaft drives 547, 548 are configured to engage corresponding drive-members (not shown) in a manner such as those described above.

The first and second crankshaft portions 531, 533 each have features similar to crankshafts described in detail above. The first crankshaft portion 531 defines a pair of piston journals 551, 552. The second crankshaft portion 533 similarly defines a pair of piston journals 549, 550. Each piston journal defines a longitudinal axis 554, although only the longitudinal axis 554 of the piston journal 550 is illustrated. In the embodiment of FIG. 38, the piston journals 549, 550 of the second crankshaft portion 533 are angularly offset by an angle ranging up to 180-degrees. The piston journals 551, 552 of the first crankshaft portion 531 are angularly offset by a similar angle. The piston journals, and hence the corresponding pistons (not shown), reciprocate along longitudinal axes offset by about one-half the angle between the piston journals 549, 550 and 551, 552, similar to other hypocycloid based mechanisms. As in multi-cylinder embodiments using an intermediate shaft as described above, the pairs of piston journals 549, 550 and 551, 552 reciprocate out of phase.

Each portion 531, 533 includes a pair of pinions 583, 546 for coupling the crankshaft 530 to the block (not shown). Corresponding ring gears 537, 588 with internal cogs 540, 539 are configured to engage the pinions 583, 546. In some embodiments, the ring gears 537, 588 are fixedly attached to the block, and in others, the ring gears 537, 588 are allowed to rotate relative to the block.

Some embodiments of intermediate shafts define a pinion, such as the pinion 536 for engaging secondary devices, with balance shafts and synchronization shafts being examples.

Third Exemplary Embodiment of a Reciprocating Piston Machine

The following describes another embodiment of a crankshaft and bearing apparatus configured to convert motion from rotation to reciprocation, and vice-versa. The embodiment incorporates aspects of the hypocycloid-based motion just described.

Figure 11:
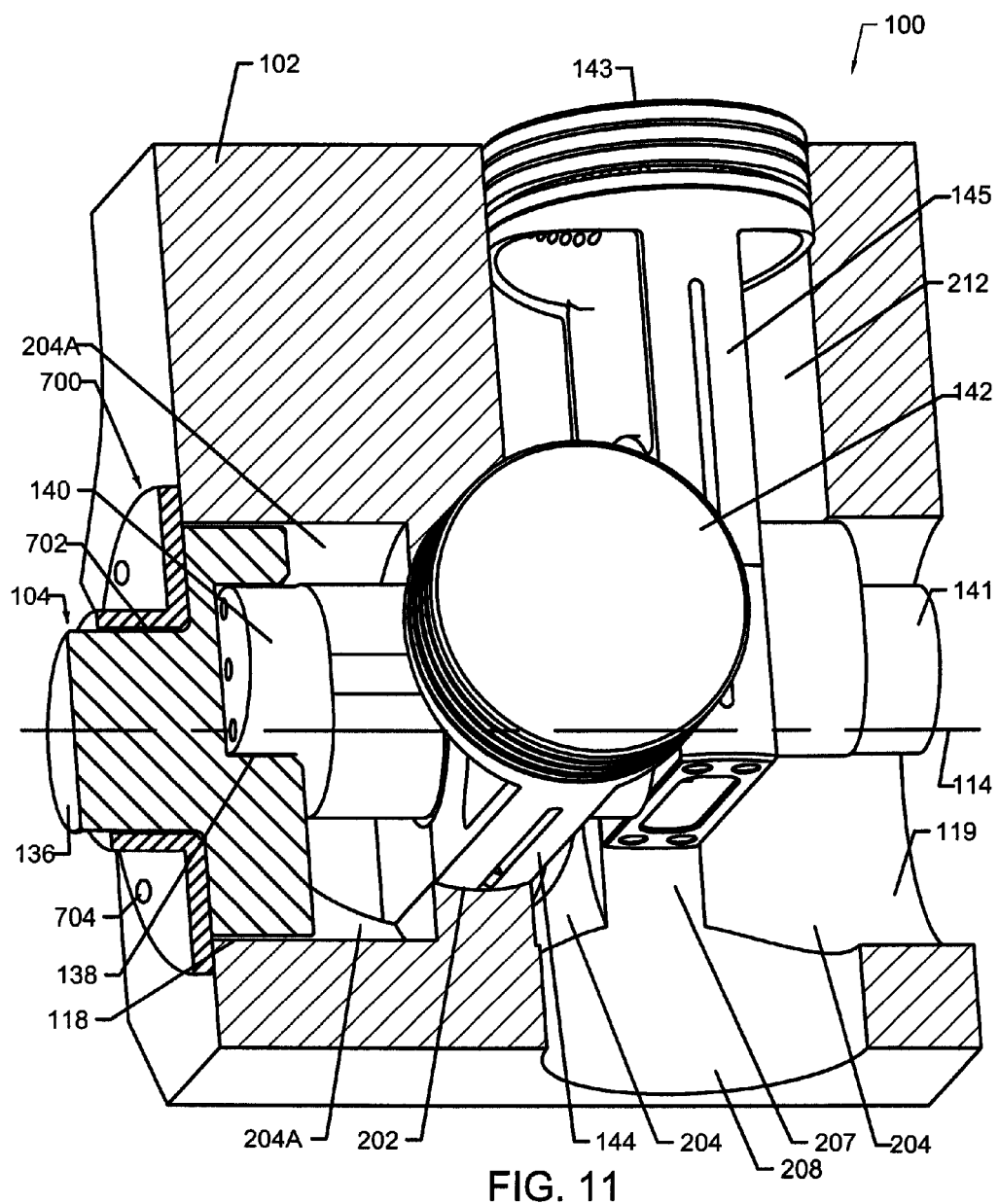
FIG. 11 illustrates a partial cross-sectional, perspective view of the embodiment shown in FIG. 9.
Figure 12:
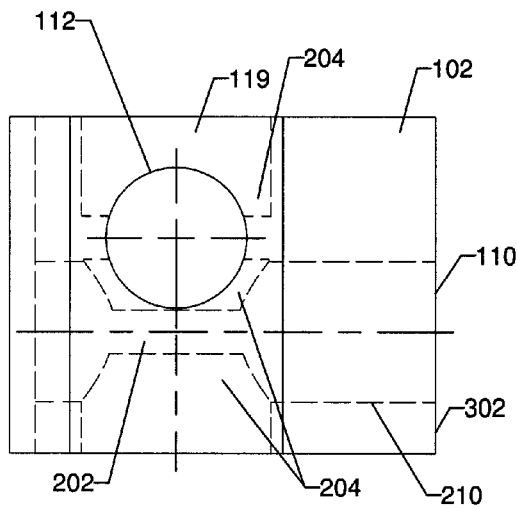
FIG. 12 illustrates a top plan view of the block in the embodiment shown in FIG. 9.
Figure 13:
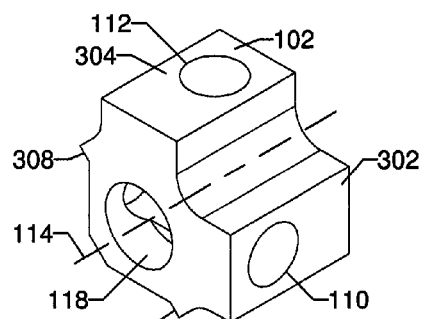
FIG. 13 illustrates a perspective view of the block shown in FIG. 12.

The embodiment illustrated by FIGS. 9-11 provides a drive-member 104 that functions similarly to the first linkage 5802 and a planetary crankshaft 116 that functions similarly to the second linkage 5804. The embodiment of FIGS. 9-11 also incorporates first and second pistons 106 and 108 coupled to the crankshaft 116 at locations similar to the opposing ends 5812 and 5810 of the second linkage 5804.

The block 102 houses the crankshaft and bearing apparatus configured for hypocycloid based motion. As noted, the embodiment of FIG. 9 includes first and second pistons, 106 and 108, respectively, coupled to the drive-member 104. In the configuration shown, the block 102 defines first and second piston-cylinders 110 and 112, respectively, that slidably receive the respective first and second pistons, 106 and 108 and constrain the pistons 106 and 108 to substantially linear motion. As shown by FIG. 10, the first and second pistons 106 and 108 engage a crankshaft 116 that engages the drive-member 104.

The first and second pistons 106 and 108 are substantially similar to each other. Each includes a respective, substantially cylindrically shaped head 142 and 143, elongate body 144 and 145, crankshaft-bearing-region 121 and 124, and bearing cap 120 and 120A.

The first and second piston-cylinders 110 and 112 are also similar to each other and slidably receive the respective first and second pistons 106 and 108. The first and second piston-cylinders 110 and 112 each define respective, substantially cylindrical top-portions 210 and 212 (see, e.g., FIGS. 11-15, 21, 21A, 22A and 22B) and respective narrow central-portions 202 and 207.

In the illustrated embodiment, the proximal end 422 (FIG. 16) of the elongate body 144 of the first piston 106 forms a concave crankshaft bearing region 121 corresponding to the first piston journal 126 of the crankshaft 116. A bearing cap 120 that attaches to the elongate body 144 also forms a concave region 122 corresponding to the first piston journal 126. The elongate body 144 in combination with the bearing cap 120 pivotally engages the piston journal 126 through journaling surfaces, or alternatively, through a bearing race or bearing inserts (not shown). Such arrangements allow the first piston 106 to drive the piston journal 126 such as occurs during a power stroke in an engine, or allows the piston journal 126 to drive the first piston 106, such as occurs during a compression stroke in an engine, pump or compressor. Notably, the embodiment of FIG. 9 provides these features without using conventional connecting rods or wrist pins common in conventional slider-crank mechanisms. The second piston 108 engages the second piston journal 128 in a similar fashion as shown in, for example, FIG. 10.

Embodiments similar to that of FIG. 9 include independent drive-members 104 and 105, although some embodiments include only a single drive-member.

The crankshaft 116 defines crankshaft-drives 140 and 141 at each end. The illustrated crankshaft-drives 140 and 141 pivotally engage the drive-members 104 and 105, although in some embodiments, the crankshaft-drives 140 and 141 can rotatably engage the drive-members 104 and 105.

As used herein, "pivotally engaging" means that one body can pivot relative to another body such that contacting surfaces of the two bodies are able to effectively slip or slide relative to each other during a pivoting movement.

As used herein, "rotatably engaging" means that two coupled bodies are able to rotate relative to each other. Accordingly, as used herein, all pivotally engaging bodies are also rotatably engaging, but not all rotatably engaging bodies are pivotally engaging.

For example, a simple pin connection, such as, for example, a pair of journaling surfaces, a journal surface and bearing race, among other configurations, provides both rotating and pivoting movement between two connected bodies. In contrast, a pinion engaging an internal gear does not provide a pivoting movement but does provide a rotating movement. Accordingly, both the pin connection and the pinion/internal gear are examples of rotatably engaging bodies. The pin connection is also pivotally engaging, but the pinion/internal gear connection is not.

In the illustrated embodiment of FIG. 9, each drive-member 104 and 105 is pivotally disposed in a corresponding drive-member receiving region 118 and 119 (see FIG. 11) defined by the block 102. Although the drive members 104 and 105 are pivotally disposed in the drive-member receiving regions 118 and 119, a housing, for example the housing 700, pivotally engages the driveshaft 136 through a bearing portion, such as, for example, the journal surface 702 illustrated in FIG. 11. The drive-member 104 is substantially supported by the housing 700, which is fixedly attached to the block 102 using a plurality of bolts 704. In many instances, the block 102 defines a recessed region for partially receiving the housing 700 and supporting the circumference of the housing 700, thereby reducing excessive and non-uniform shear loads on the bolts 704.

In alternative configurations, the drive-members 104 and 105 pivotally engage the drive-member receiving regions 118 and 119. Journaling surfaces can provide engagement between either or both drive members 104 and 105 and the corresponding drive-member receiving regions 118 and 119. Alternatively, a bearing race can provide the pivotal engagement between one or both drive-members 104 and 105 and the corresponding drive-member receiving regions 118 and 119. (Some alternative embodiments provide rotatable engagement between the block 102 and the drive members 104 and 105.)

When assembled as just described, reciprocation of the first piston 106 causes the longitudinal axis 502 of the first piston journal 126 to reciprocate. Accordingly, a force applied to the first piston journal 126 urging reciprocation will impart a moment to the planetary crankshaft 116. In other words, because the first piston journal 126 and the crankshaft-drive 140 are spaced, a force applied to the first piston journal 126 can result in a moment applied to the crankshaft 116.

A moment so applied will urge the crankshaft 116 to rotate. Because the respective first and second crankshaft-drives 140 and 141 rotatably engage the respective first and second drive-members 104 and 105 the moment applied to the crankshaft 116 will urge the crankshaft-drives 140 and 141 against the drive members 104 and 105. Because the point of engagement between the drive members 104 and 105 and the crankshaft 116 is spaced from the central-axis-of-rotation 114, urging the crankshaft-drives 140 and 141 against the drive members 104 and 105 will urge the drive members 104 and 105 to rotate, thereby urging the respective first and second crankshaft-drives, 140 and 141, to orbit the central-axis-of-rotation 114. Alternatively, a moment applied to the drive-members 104 and 105 will urge the pistons 106 and 108 along a reciprocating path.

Notably, configurations similar to the embodiment of FIG. 9 eliminate conventional main bearings that support the crankshaft.

In the embodiment of FIG. 9, the block 102 orients the longitudinal axes 150 and 152 of the respective piston cylinders 110 and 112 at 90-degrees relative to each other and longitudinally spaces the piston cylinders 110 and 112 along the central-axis-of-rotation 114. With reference to FIGS. 19, 19A-19C, which illustrate the crankshaft 116 shown by FIG. 10, the radially extending first and second piston journals 126 and 128 oppose each other relative to the longitudinal axis of the crankshaft-drive 504. The longitudinal axes 502 and 506 of the respective first and second piston journals 126 and 128 are spaced by a crankpin separation distance, X.

In general, a crankshaft and bearing apparatus including a pair of pistons disposed at 90-degrees relative to each other and coupled together through a crankshaft with radially opposing piston-journals will provide a piston stroke twice the distance between the longitudinal axes of the opposing piston-journals. Accordingly, the embodiment of FIG. 9 will provide a stroke for each piston 106 and 108 of twice the crankpin separation distance, X.

In embodiments that dispose the longitudinal axes of the piston journals 502 and 506 opposite each other relative to the longitudinal axis 504 of the crankshaft-drives 140 and 141, similar to the embodiment of FIG. 9, the longitudinal axis 504 will undergo a circular orbit about the central-axis-of-rotation 114, where the radius of the orbit is approximately half the crankpin separation distance, X.

The planetary crankshaft 116 functions similarly to a class 2 lever with a fulcrum located alternately along longitudinal axis 502 or 506 (FIGS. 19A-19C) of the crankshaft, and the effort applied alternately along axis 502 and 506, and the load applied along axis 504 similar to the second linkage 5804 of FIGS. 4(A)-4(I).

Accordingly, if a force is applied to the first piston 106 (e.g., a gas expanding against the piston head 142 (see FIG. 10), the force will urge the piston 106 to slide in the cylinder 110, which in turn urges the crankshaft 116 to undergo motion similar to that of the second linkage 5804 illustrated in FIGS. 4(A)-4(I). In other words, motion of the piston 106 will follow a path similar to that of the end 5812 of the second linkage 5804. The piston 108 will reciprocate similarly to the other end 5810 of the second linkage. The longitudinal axis of the crankshaft drive 140, which is substantially coaxial with the longitudinal axis of the crankshaft drive receiving region 138, will orbit the central axis of rotation 114 similarly to the distal end 5808 of the first linkage 5802.

Friction losses resulting from eccentrically applied forces between the pistons 106 and 108 and the cylinder walls of the block 102 are lower than those of conventional slider-crank based reciprocating piston machines. The embodiment of FIGS. 9-11, when in a position analogous to that of FIG. 4C, places the longitudinal axis 502 (See FIGS. 19, 19A-19C) as a slidable fulcrum of a class two lever formed by the crankshaft 116. Accordingly, a force applied to the longitudinal axis 506 of the first piston journal 126 is doubled in magnitude at the crankshaft longitudinal axis 504 and is transmitted along a unit vector tangent to the circular orbit of the crankshaft longitudinal axis 504. Accordingly, a force urging a piston head to reciprocate results in low corresponding frictional losses.

Thus it may also be understood that embodiments described herein provide mechanical arrangements for converting reciprocation to rotation and efficient transmission of linear forces to moments, and vice-versa. In addition, the principles just described can be applied to various other embodiments, several of which are described below.

Block

With reference to FIGS. 11-15, the block 102 of FIG. 9 defines first and second piston cylinders 110 and 112 disposed at 90-degrees relative to each other and a crankcase 204, which defines a longitudinal axis substantially coincident with the central-axis-of-rotation 114 and transects the cylinders 110 and 112.

Each piston cylinder 110 and 112 defines a substantially cylindrical top portion, e.g., the cylindrical top portions 210 and 212 of the first and second piston cylinders 110 and 112, respectively. The top portions slidably receive the piston heads 142 and 143. Each piston cylinder 110 and 112 also defines a narrow central portion 202 and 207 that slidably receives the elongate bodies 144 and 145.

In the illustrated embodiment, the narrow central portions 202 and 207 are defined by concave walls with a radius of curvature corresponding to that of the arcuate walls 416 of the elongate bodies 144 and 145. As described above, in some embodiments the radius of curvature of the arcuate walls 416 is the same as the radius of the piston heads 142 and 143. In such an embodiment, the narrow central-portions 202 and 207 have a first width corresponding to the diameter of the piston heads 142 and 143 and a second width, transverse to the first width (e.g., along the central-axis-of-rotation), substantially less than the diameter of the piston heads 142 and 143. When installed in a piston cylinder so formed, the elongate bodies 144 and 145 of the corresponding pistons are oriented substantially perpendicular to the central-axis-of-rotation 114. The walls of the narrow central portions 202 and 207 provide guide surfaces for the corresponding elongate bodies 144 and 145. Notably, the guide surfaces distribute eccentric loads and reduce wear of the rings and cylinder walls near the piston head.

Additionally, each piston cylinder 110 and 112 further defines a cylinder access disposed below the narrow central portion 202 and 207, i.e., opposite the cylindrical top-portion. For example, in FIG. 11 only the cylinder access 208 of the second piston cylinder 112 is illustrated, but each cylinder provides a similar cylinder access. The cylinder access 208 provides an opening that can be used to access the lower end of the cylinder, for example, for assembling the bearing caps 120 and 120A to the corresponding elongate bodies 144 and 145 of the pistons 106 and 108.

In some embodiments, the block 102 can be formed of a unitary body, such as results from a casting process. Casting processes can be particularly desirable in view of the ability to form internal passageways and other cavities or through-holes without secondary machining operations. For example, the cylinders and crankcase can be cast with dimensions that approximate their final desired dimensions. In addition, features such as flanges 306 and 308 (FIG. 13) for attaching an oil sump can be cast into the block 102. The cylinders, each with a cylindrical top portion, narrow central portion and cylinder access, can be rough-cast in the unitary body. Following casting, surfaces that require a high degree of dimensional accuracy can be machined, for example using a milling, a boring, a honing or a similar process. For example, crankcase walls can be used as-cast, or they can be cast and bored. Cylindrical top portions, narrow central portions and cylinder access regions can be bored and honed to a desired dimension. In addition, the block deck surface 302 and 304 can be machined to a desired flatness, for example, to provide a surface against which a cylinder head (not shown) can seal.

Further, an oil galley (not shown) can provide pressurized, filtered oil from a pump and filter (not shown) to the piston-cylinders 110 and 112. The piston-cylinders 110 and 112 so provided with pressurized oil can deliver oil to various oil pathways e.g., 402, 403, 403A, 404, 404A, and 428 (oil squirts for piston head cooling) (See FIGS. 16-18F, 21A and 21B), provided in the pistons 106 and 108. In addition, an oil galley can provide oil to the drive-members 104 and 105, the crankshaft 116 and other intermediate shafts. Oil can be provided using any conventional oil delivery method, such as, for example, wet or dry sump pressure oiling. For a more detailed description, refer to the Lubrication section below.

Exemplary Pistons

Figure 16:
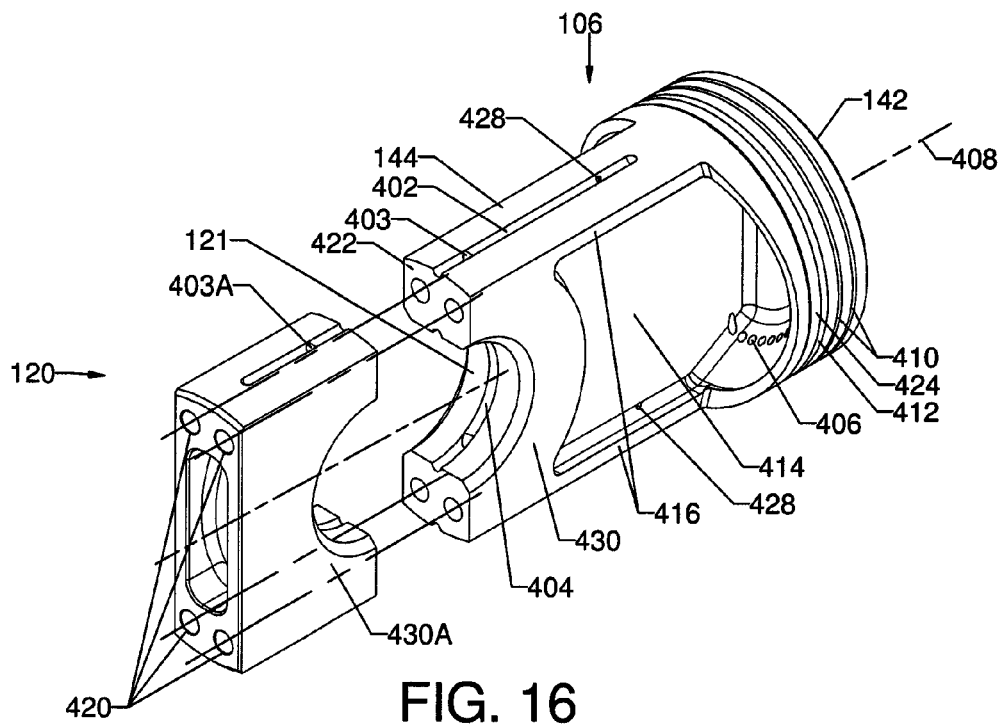
FIG. 16 illustrates an exploded view of a piston configured to engage a planetary crankshaft according to the embodiment of FIG. 9.
Figure 17:
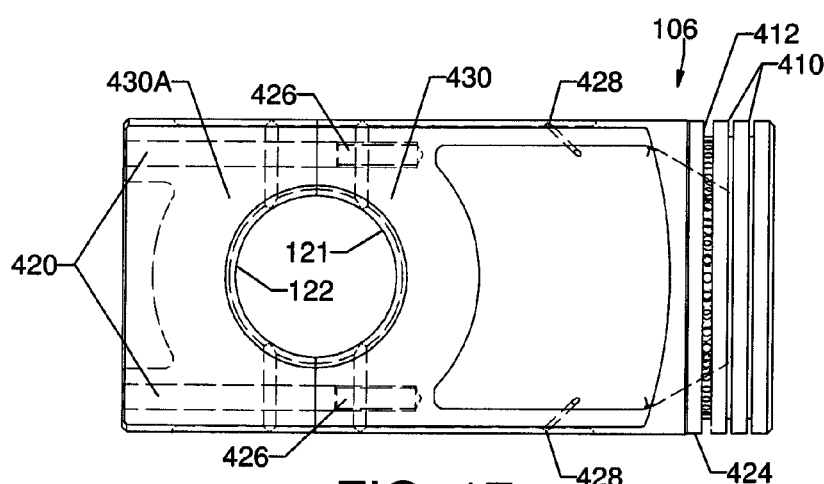
FIG. 17 illustrates a side elevation of the piston of FIG. 16 assembled to the bearing cap, also shown in FIG. 16, with internal features shown in relief.
Figure 18A:
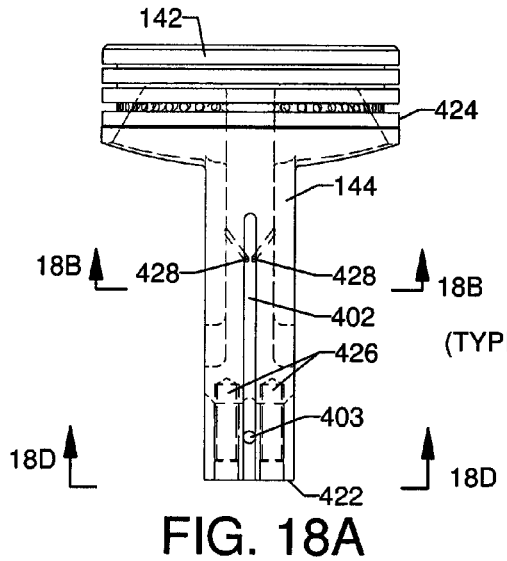
FIG. 18A illustrates another side elevation of the piston of FIG. 16, with internal features shown in relief.
Figure 18B:
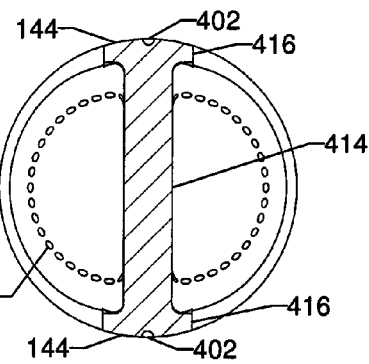
FIG. 18B illustrates a cross-sectional view of the piston of FIG. 16 taken along line 18B-18B of FIG. 18A.
Figure 18C:
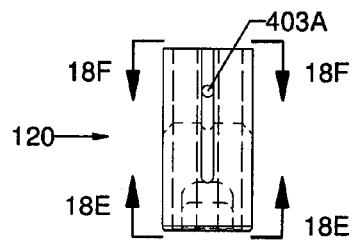
FIG. 18C illustrates a side elevation of the bearing cap of FIG. 16, with internal features shown in relief.
Figure 18D:
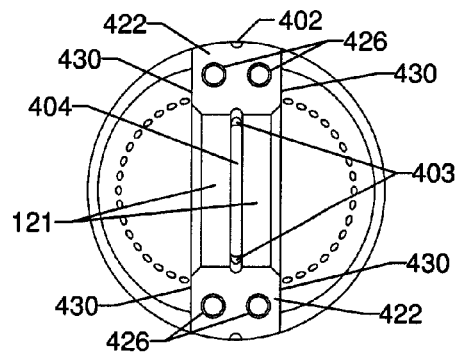
FIG. 18D illustrates an end view of the piston of FIG. 16 along line 18D-18D of FIG. 18A.
Figure 18E:
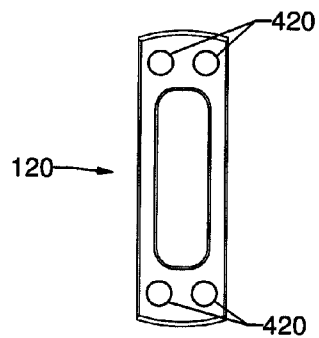
FIG. 18E illustrates an end view of the bearing cap of FIG. 16 along line 18E-18E of FIG. 18C.
Figure 18F:
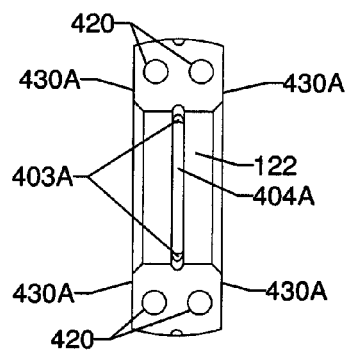
FIG. 18F illustrates a top plan view of the bearing cap of FIG. 16 along line 18F-18F of FIG. 18C.

FIG. 16 illustrates an exploded view of a piston and bearing cap configured to engage a planetary crankshaft according to the embodiment of FIG. 9. FIG. 17 illustrates a side elevation of the piston of FIG. 16 assembled to the bearing cap. Internal features are shown in relief. Although the present description proceeds with regard to the first piston 106, the description applies equally to the second piston 108.

With regard to FIGS. 16 and 17, an elongate body 144 defining a proximal end 422 and a distal end joins a substantially cylindrical piston head 142 at the distal end. A bearing cap 120 can fixably attach to the proximal end 422. The substantially cylindrical piston head 142 has an axis-of-symmetry substantially aligned with the longitudinal axis 408 of the piston 106.

Notably, the piston 106 can include any of a variety of piston head and piston ring configurations. For example, the illustrated piston head 142 includes a piston ring-carrier structure 424, extending longitudinally from the distal end of the piston head 142 to form a substantially cylindrically shaped wall circumferentially extending around a distal portion of the elongate body 144. In this embodiment, the conventional piston skirt (not shown) is replaced by the arcuate walls 416 of the elongate body 144. Other embodiments can also include a more conventional piston skirt. The piston ring-carrier structure 424 of FIGS. 16 and 17 (or a piston skirt) defines a plurality of circumferentially extending grooves 410 and 412 for engaging compression rings and oil scraper rings, respectively. The illustrated piston head also defines a substantially flat distal surface. In alternative configurations, the piston head 142 defines a convex distal surface, while other configurations of the piston head 142 define a concave distal surface. In addition, some embodiments of the piston head 142 will provide more or fewer circumferentially extending grooves than the embodiment of FIG. 16. Also, the piston head 142 and/or the piston ring-carrier structure 424 can provide oil pathways in fluid connection to an oil reservoir (not shown) to enhance cooling of the piston head 142, the piston ring-carrier structure 424, and the piston rings during operation. Oil squirt features 428 can also be provided to supply pressurized squirts of oil to the underside of the piston head for cooling of the piston head. Oil return holes 406 can be provided under the groove 412 to return oil from an oil scraper ring. Refer to the detailed description of additional lubrication features below.

The elongate body 144 longitudinally extends from the piston head 142, and piston ring-carrier structure 424 having a width that extends substantially across the diameter of the head 142 and a thickness substantially less than the diameter. In some embodiments, the width of the elongate body 144 is substantially the same as the diameter for between about 25% and about 50% of the length of the body 144. In other instances, the width of the elongate body 144 is substantially constant over its length, as illustrated. In other embodiments, the width of the elongate body 144 is slightly less than or greater than the diameter of the head 142, e.g., from about 0.000 inches to about 0.010 inches, such as about 0.001 inches to about 0.004 inches.

Notably the piston rings (not shown) fitted to piston ring grooves 410 and 412 may usefully be configured with reduced ring tension bearing against piston-cylinder walls 110 and 112 for reduced operational friction. See the detailed description of bearing and journaling features below.

The elongate body 144 defines arcuate walls 416 longitudinally extending from the circumference of the piston ring-carrier structure 424 and disposed on each transverse side of the elongate body 144. Accordingly, the arcuate walls 416 have a radius of curvature substantially similar to the radius of the piston head 142 and the piston ring-carrier structure 424. In addition, the arcuate walls 416 can be slidably received in a corresponding region of a piston-cylinder, e.g., first and second piston cylinders 110 and 112. See e.g., FIG. 11. Also FIG. 23B shows a cylinder wall 2504 that partially defines a narrowed central region of the piston cylinder 2312 corresponding to the elongate body of the piston 2308.

Each arcuate wall 416 can also define an oil pathway 402 for providing lubricant to surfaces that slide relative to each other in a slidable engagement, such as, for example, between a piston-cylinder and the elongate body 144.

The elongate body 144 can define a recessed region extending between the arcuate walls 416, forming an I-beam-like web member 414 having a reduced thickness relative to a chord between opposing sides of the arcuate walls 416. The reduced thickness provides a lower piston mass, resulting in lower inertial forces during reciprocation of the piston 106. In addition, a narrowed profile relative to the piston head 142 provides operational clearance between adjacent piston-cylinders, as well as between the elongate body 144 and walls of the crankshaft 116 that flank the piston journal 126. The web member 414 can also define one or more lightening holes. Alternatively, the web member 414 can be substantially eliminated for further mass reduction. The faces 430 and 430A of the piston 116 and the bearing cap 120, respectively, can also define a thrust bearing face, or can receive an insert bearing defining a thrust bearing face.

Referring to FIGS. 16-18F, the proximal end 422 forms a plurality of recesses that define attachment features 426 with longitudinal axes of symmetry aligned parallel to the longitudinal axis 408 of the piston 106. The attachment features 426 can define internal threads for engaging corresponding external threads of bolts extending through corresponding apertures 420 formed in the bearing cap 120. Still another alternative configuration of the attachment features 426 provides studs (not shown) that extend from the proximal end 422. The studs can be configured to engage corresponding features formed in the bearing cap 120. For example, the studs can define external threads to engage a corresponding nut. Alternatively, dowels or "Fractured Cap" technology (not shown) can provide alignment between the bearing cap 120 and the proximal end 422.

The illustrated proximal end 422 also forms a recess defining a crankshaft bearing region 121 for pivotally engaging the corresponding first piston journal 126. See, e.g., FIG. 10. The crankshaft bearing region 121 can define one or more oil pathways 404 for providing lubricant to the pivotal engagement between the piston 106 and the crankshaft 116. In addition, the bearing cap 120 can form a concave region 122 that defines crankshaft engagement features corresponding to the crankshaft bearing region 121 formed by the proximal end 422. Also, the bearing cap 120 can define one or more oil pathways 403A, corresponding to the oil pathway 403 disposed in the arcuate wall 416 of the elongate body 144. Alternatively, the crankshaft bearing regions 121 and 122 can receive insert shell bearings or bearing races.

In some instances, pistons can be of substantially unitary construction (not shown). In such embodiments, no removable bearing cap is employed, and a "built-up" (e.g., "pressed together") crankshaft can be used to facilitate assembly of pivotal couplings between the pistons and the crankshaft.

Some pistons are formed using composite construction, e.g., different features are formed of different materials. For example, the ring-carrier structure 424 and/or the piston head 142 can be formed of an alloy of steel or iron to provide heat and wear resistance, and the elongate body can be formed of an alloy of aluminum. Such a composite piston provides for a long wearing, heat resistant, and light weight piston. A composite MTM piston can, for example, join the piston head and elongate body with a pin, as is commonly practiced in joining a connecting rod and piston in a conventional slider crank piston mechanism assembly FIGS. 30-30C illustrate one embodiment of an MTM piston 870. As shown in FIG. 30, is the piston 870 comprises a piston head 892 located distally from a proximal end defining a crankpin-bearing bore 872 in a central region of the elongate body. Extending outwardly from the central region toward opposing sides of the elongate body are two respective piston-cylinder bearing regions 894 for slidably engaging a piston-cylinder defined by a block. A narrowed region 895 is located between the proximal end and the piston head 892. In the illustrated embodiment, an oilway 899 circumscribes a portion of the crankpin bearing bore 872 and an oilway 898 extends outwardly therefrom toward each opposing bearing region 894 to an opening 896 for placing the oilway in fluid communication with a film of lubrication (not shown) in the region of sliding engagement between the bearing region 894 and a corresponding cylinder wall.

As shown in FIGS. 30A and 30B, a piston ring region 897 and the piston-cylinder bearing region 894 are approximately the same diameter. Narrowing of the elongate piston body in region 895 reduces the swept piston to cylinder surface area reduces friction losses arising from sliding contact between the bearing region 894 and a corresponding cylinder wall.

Crankshaft

A crankshaft generally engages one or more pistons along the crankshaft's longitudinally extending length and engages or provides an externally accessible driveshaft. For example, the crankshaft 116 shown in FIG. 10 includes first and second crankshaft-drives 140 and 141 disposed on each end of the crankshaft. Corresponding crankshaft-drive receiving regions 138 and 139 are formed in the drive-members 104 and 105 for coupling the driveshaft 136 to the crankshaft 116. The illustrated embodiment provides pivotal engagement between the journaling surfaces of the crankshaft-drives 140 and 141 and the corresponding crankshaft-drive receiving regions 138 and 139.

Figures 19, 19A, 19B, 19C:
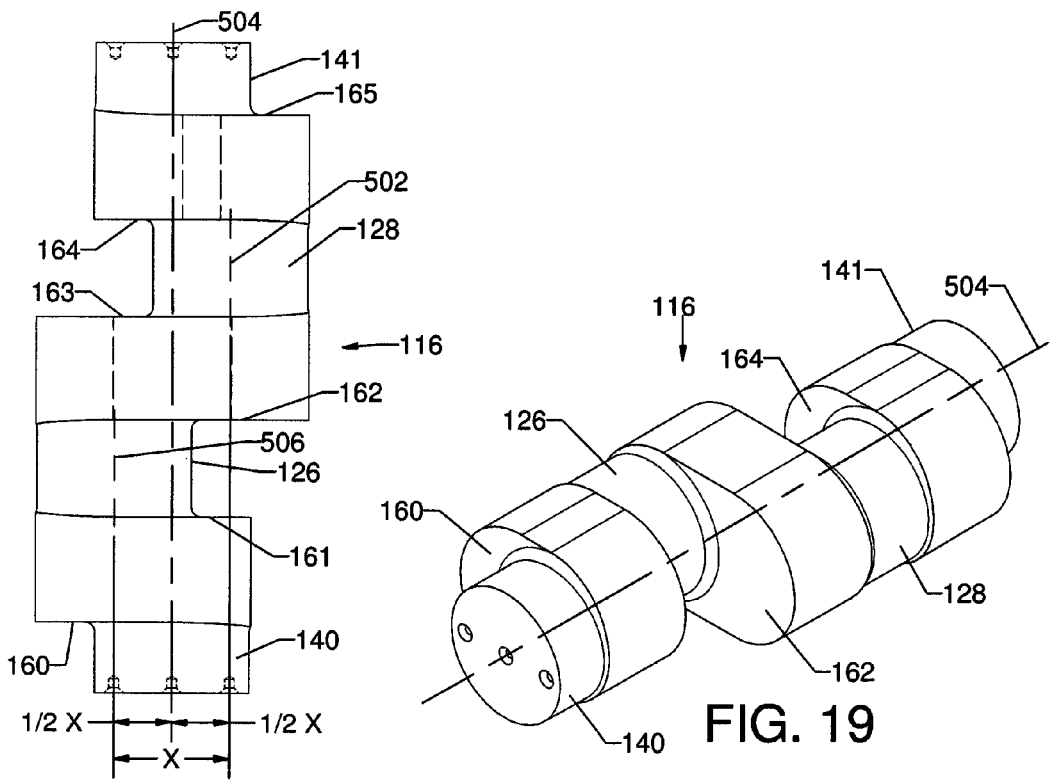
FIG. 19 illustrates a perspective view of a planetary crankshaft configured according to the embodiment of FIG. 9.
FIG. 19A illustrates a plan view of the crankshaft of FIG. 19 from above.
FIG. 19B illustrates an end elevation view of the crankshaft of FIG. 19 showing hidden features in relief.
FIG. 19C illustrates a side elevation view of the crankshaft of FIG. 19 showing hidden features in relief.
Figures 21A, 21B:
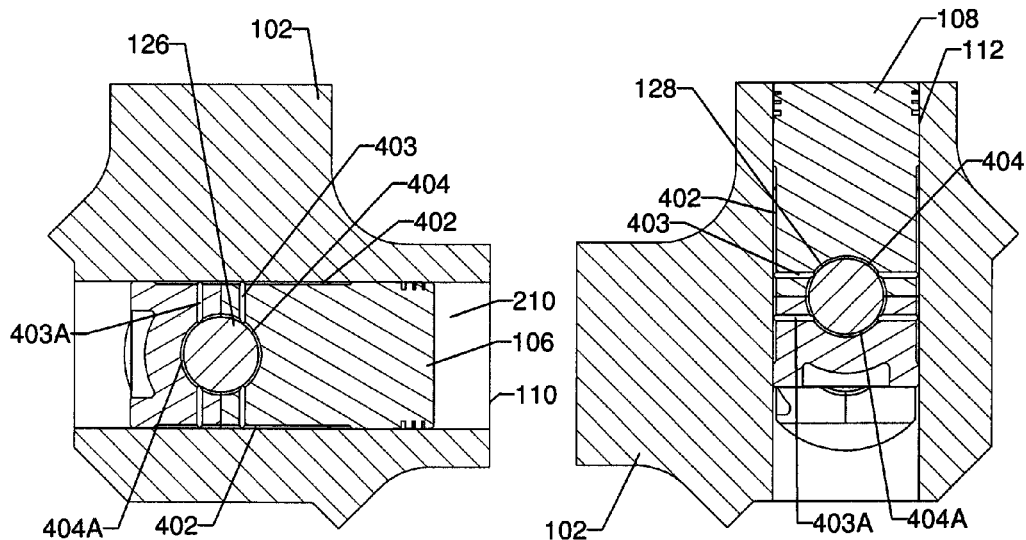
FIG. 21A illustrates a cross-sectional view taken along line 21A-21A in FIG. 21.
FIG. 21B illustrates a cross-sectional view taken along line 21B-21B in FIG. 21.
Figure 21:
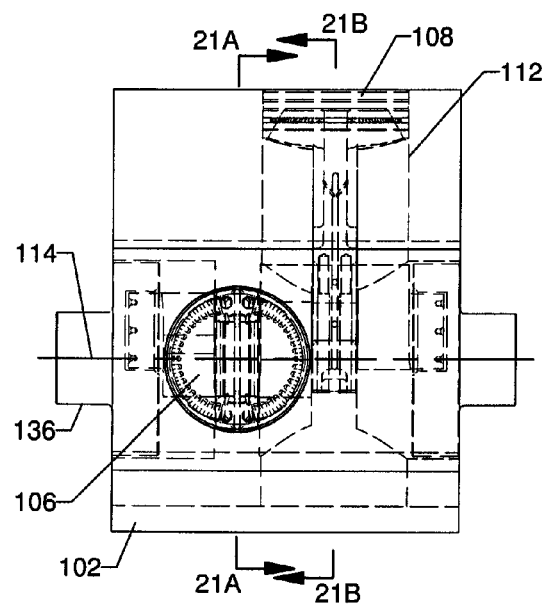
FIG. 21 illustrates a top plan view of the assembly of FIG. 9 showing internal features in relief.
Figure 22A:
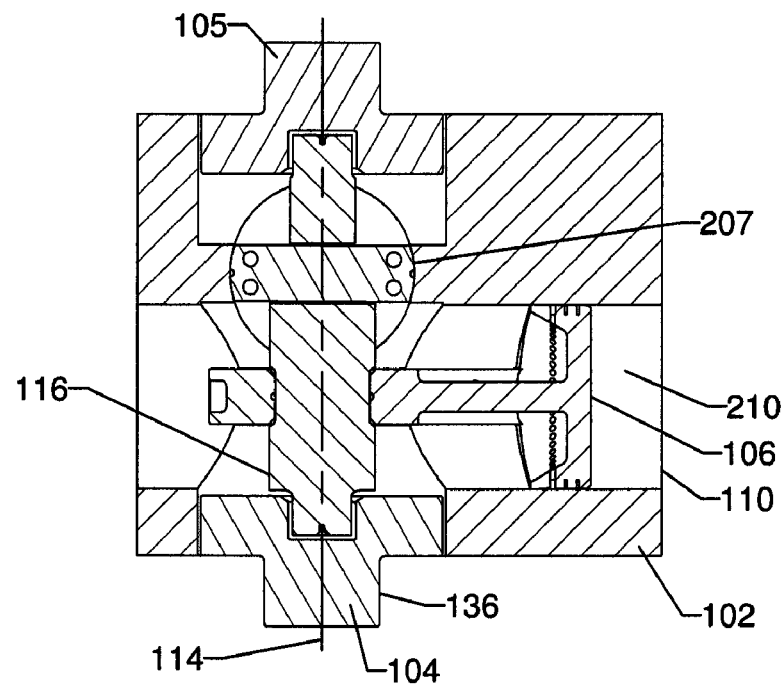
FIG. 22A illustrates a cross-sectional view of the embodiment of FIG. 9 taken along line 22A-22A in FIG. 22.
Figure 22:
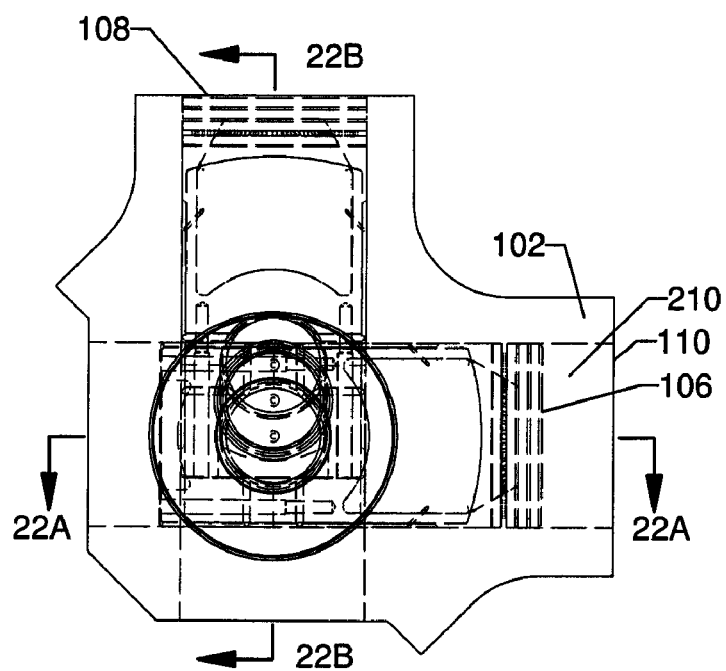
FIG. 22 illustrates a front elevation view of the embodiment of FIG. 9 showing internal features in relief.
Figure 22B:
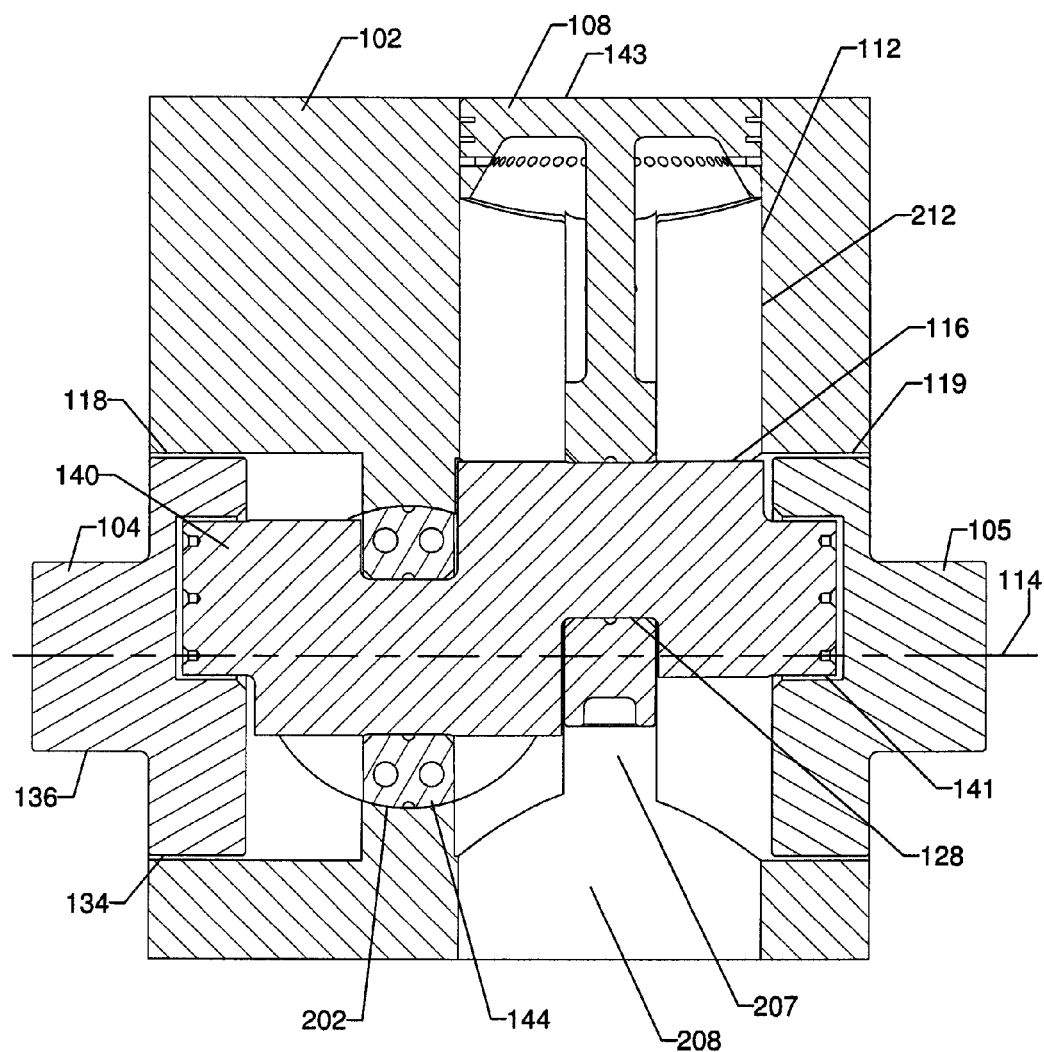
FIG. 22B illustrates a cross-sectional view of the embodiment of FIG. 9 taken along line 22B-22B in FIG. 22.

Referring now to FIGS. 10 and 19-19C, the illustrated crankshaft 116 also includes radially extending piston journals 126 and 128 disposed 180-degrees from each other relative to, for example, the longitudinal axis 504 of the crankshaft-drive. In the illustrated embodiment, the piston journals 126 and 128 are physically joined with the crankshaft drives 140 and 141 by flanking walls formed by the crankshaft. The piston journals 126 and 128 define respective longitudinal axes 502 and 506 that extend parallel to and spaced apart from the longitudinal axis 504 of the crankshaft drives 140 and 141. Each piston journal 126 and 128 forms a crankpin for pivotally engaging a corresponding crankshaft-bearing-region of a piston, such as, for example, the first and second pistons 106 and 108. Some embodiments of the crankshaft 116 include thrust faces 161, 162, 163, and 164 corresponding to the piston and bearing cap faces 430 and 430A shown in FIGS. 16-18F. Some crankshafts include thrust faces 160 and 165 corresponding to the drive-member ends 132 and 133 (see FIG. 10).

Figure 23C:
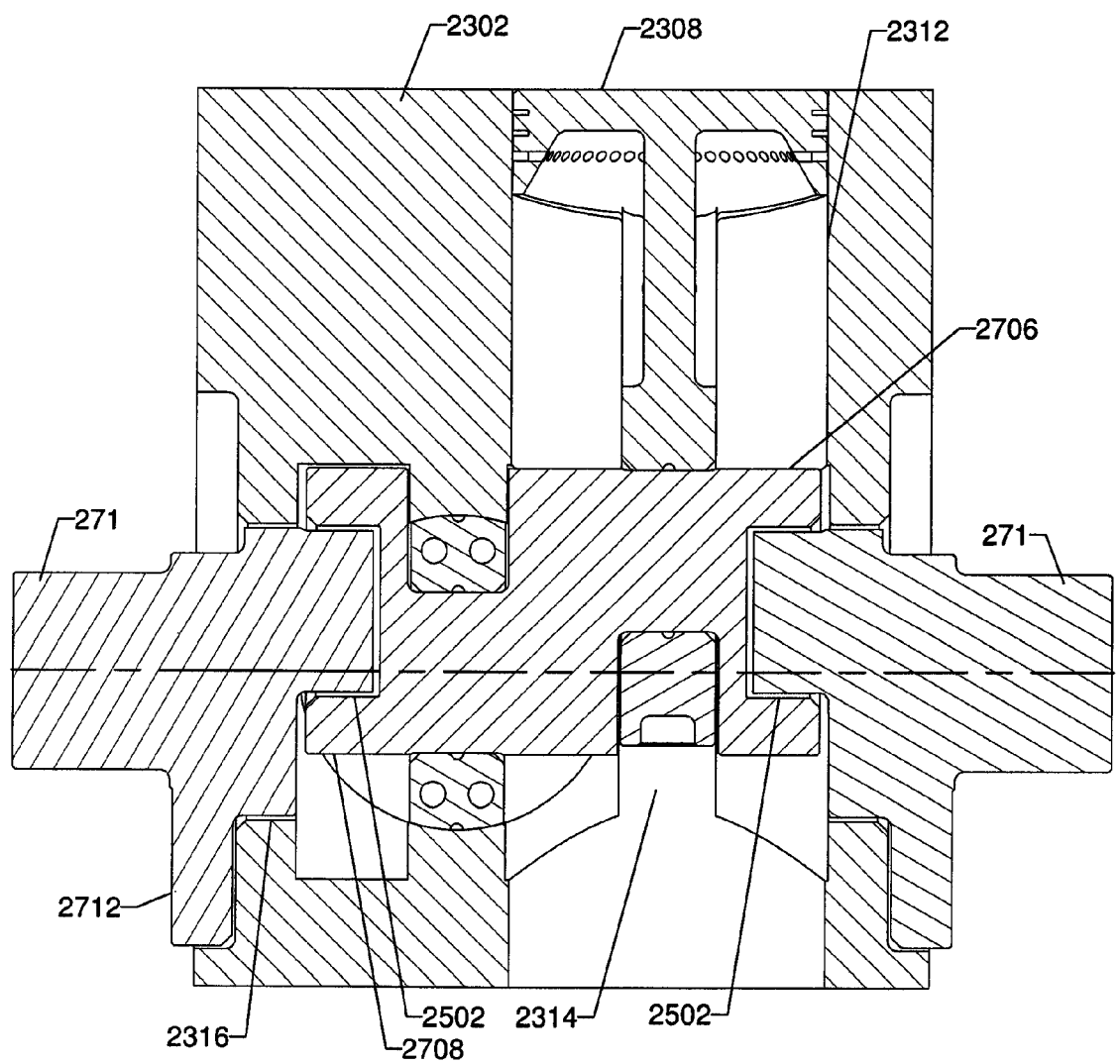
FIG. 23C illustrates a cross-sectional view taken along line 23C-23C of FIG. 23A.
Figure 31:
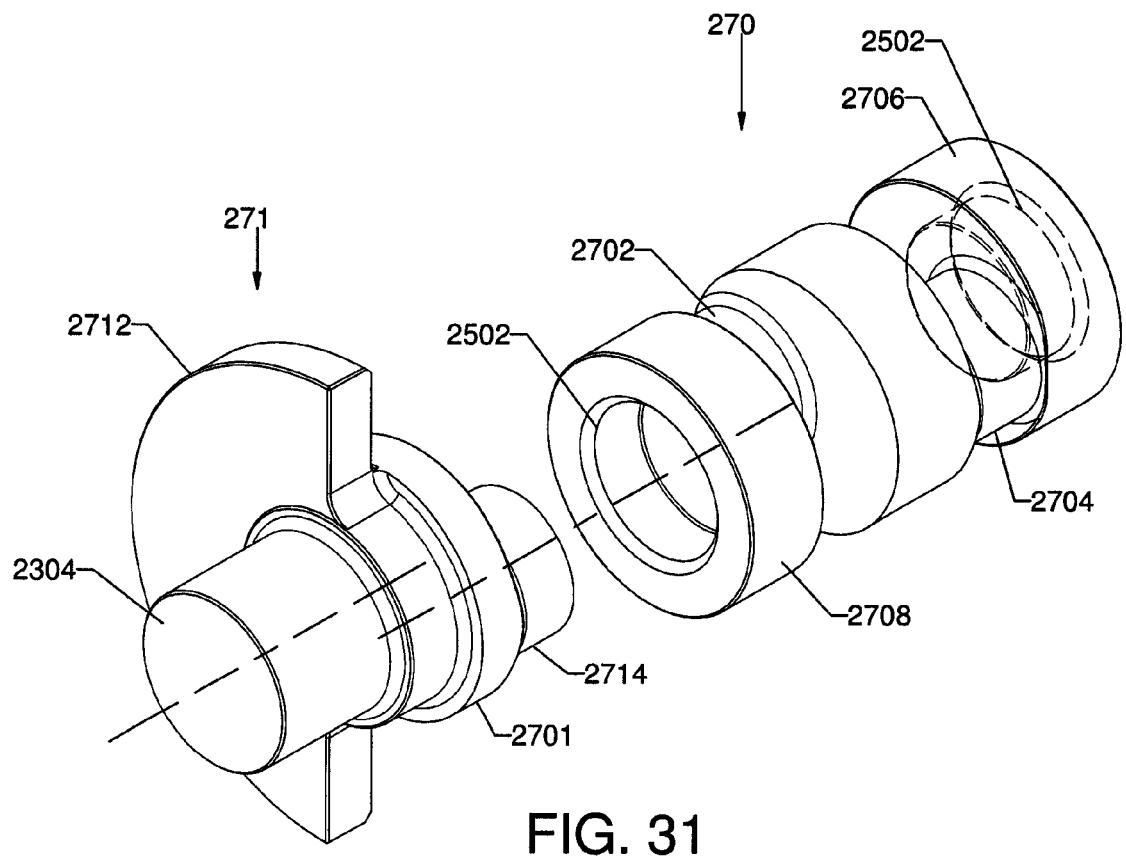
FIG. 31 illustrates an exploded perspective view of a drive-member and crankshaft assembly configured according to the alternative embodiment of FIG. 23.

An alternative configuration for a crankshaft 270 and a drive-member 271 is shown in FIGS. 23-23C and 31. Similar to the crankshaft described above, the crankshaft 270 includes first and second crankshaft drives 2706 and 2708 disposed at each end, and radially extending piston journals 2702 and 2704 disposed 180-degrees from each other.

Unlike the crankshaft 116 shown in FIGS. 10, 11, 19-19C, and 21-22B, the crankshaft drives 2706 and 2708 each form a recessed region 2502 for pivotally engaging a corresponding drive-member, e.g., the shaft 2714 extending from the drive-member 271. The recessed regions 2502 define an axis of symmetry radially offset from the piston journals 2702 and 2704.

Although not illustrated, other configurations for a crankshaft-drive define a pinion configured to engage a corresponding gear defined by the drive-member's crankshaft-drive receiving region. In some embodiments, the crankshaft-drive receiving region forms an internal gear ring around the center of which the pinion can orbit.

Figure 32:
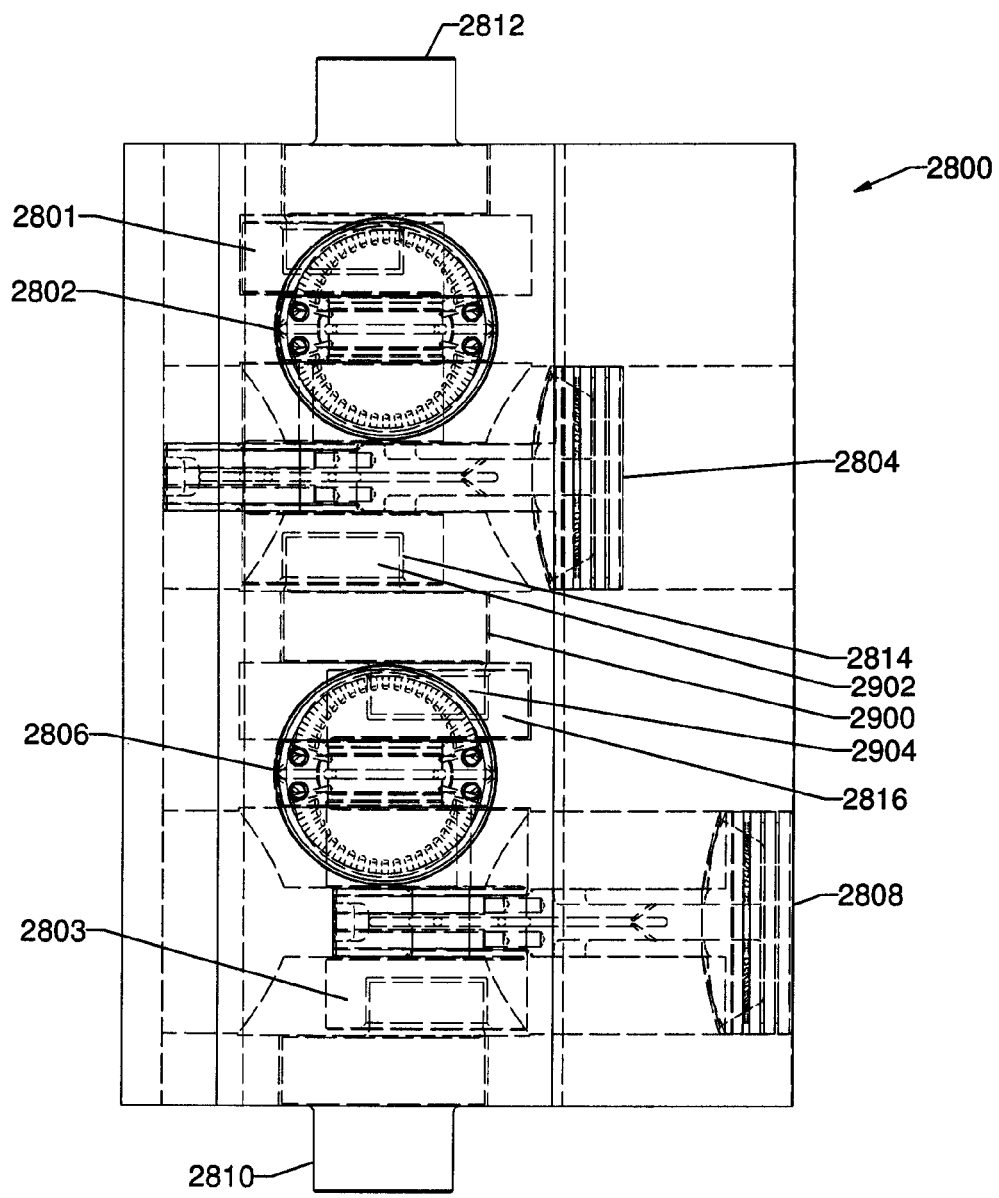
FIG. 32 illustrates a plan view from above of another alternative embodiment of a machine for converting motion from rotation to reciprocation, and vice-versa, using a four piston-cylinder configuration, with internal features shown in relief.

In addition, some crankshaft configurations dispose the piston journals at angles other than 180-degrees from each other relative to a longitudinal axis of the crankshaft-drive. For example, the above described embodiments of crankshafts are substantially one-piece bodies. However, FIGS. 32-33B illustrate one embodiment 2800 of many that incorporates an intermediate shaft 2900 disposed between adjacent crankshaft portions 2801 and 2803 to provide alternative angles between adjacent piston journals relative to a longitudinal axis. The intermediate shaft 2900 defines male drives 2902 and 2904 that pivotally engage corresponding female crankshaft portions 2814 and 2816 adjacent to the intermediate shaft 2900.

Alternative angles between pairs of piston journals can drive the corresponding pistons to alternative relative positions in corresponding piston cylinders. In other words, as the crankshaft or crankshaft assembly rotates, respective pistons 2808 and 2804 reciprocate out of phase. Pistons 2802 and 2806 also reciprocate out of phase. Providing pistons that reciprocate out of phase provides several advantages, including improved balance and, for internal combustion engines, sequential ignition among the several cylinders of the engine. Sequential ignition among several cylinders can provide smoother and more continuous generation of power as compared to ignition that simply alternates between two piston groups, which in turn provides more uniform torque output from the driveshafts 2818 and 2812.

Drive-Member

As discussed above, a drive-member couples a crankshaft to the driveshaft. An exemplary drive-member 104, shown in detail by FIGS. 20-20B, is formed of a substantially cylindrical body defining a first end 130, a second end 132 and a sidewall 134 that extends between the ends 130 and 132. The sidewall 134 is usually configured to pivot within a block in a manner similar to that shown in FIGS. 10 and 11. In some instances, the first and/or second ends 130 and 132, respectively, each define a thrust bearing face or a feature configured to receive a bearing featuring a thrust face.

When the drive-member 104 is installed in embodiments similar to that of FIGS. 9-11, the longitudinal axis 1502 of the drive-member 104 substantially coincides with the central-axis-of-rotation 114. In most embodiments, the crankshaft-drive receiving region 138 defines a longitudinal-axis-of-symmetry 144 parallel to and spaced from the longitudinal axis 1502.

The embodiment of FIG. 9 provides for pivoting between the drive-member 104 and the block 102 by journaling or otherwise pivotally supporting a portion or portions of the driveshaft 136. In many instances, a housing member, similar to the housing 700, provides bearing support to the drive-member 104 by journaling a portion or portions of the drive shaft 136 in a bearing arrangement. In some instances the housing can provide attachment for a driven or driving device, or may include part of such device. The housing 700 can be fixedly attached to the cylinder block and can provide a bearing region 702 that supports the driveshaft substantially coaxially with the central axis of rotation 114. Such housings can also provide oil to the bearings and journals located at the driveshaft 136 through passages in fluid connection with an oiling system.

In some instances, the sidewall 134 can pivotally engage the block 102 using a journaling engagement between the drive-member 104 and the drive-member receiving region 118. In other instances, the sidewall 134 can define the exterior body containing a female ring gear, (not shown) where the drive member 104 would pivot between the sidewall 134 and the drive-member receiving region 118. In such embodiments, the longitudinal axis 1502 of the drive-member 104 will generally orbit the central-axis-of-rotation 114 and the longitudinal-axis-of-symmetry 144 of the crankshaft-drive receiving region 138 will follow a circular orbit about the longitudinal axis 1502.

The drive-member 104 also forms a driveshaft 136 and a crankshaft-drive receiving region 138 configured to receive a crankshaft-drive, such as, for example, the crankshaft-drive 140. The driveshaft 136 of the drive-member 104 can form a pinion to engage cogs of another gear, such as in a transmission (not shown), a pulley for belt-drive systems, a sprocket for chain driven machines and another shaft for direct-drive systems. For example, the driveshaft 136 can define splines or a keyway for engaging a driven or driving apparatus. Alternatively, the driveshaft 136 can be spaced from the central-axis-of-rotation 114, such that the driveshaft 136 will orbit the central axis-of-rotation 114. In these alternative configurations, the driveshaft 136 can be a shaft that extends from the drive-member and is configured to pivotally engage another member or the driveshaft 136 can be a recessed bore formed in the body of the drive-member 104 and configured to receive a shaft.

In some embodiments, the drive-member 104 can form a crankshaft-drive receiving region 138 configured as a bore to pivotally receive a crankshaft, such as the journaling engagements shown by, for example, FIGS. 10, 11, 20-20B, and 22B. In other embodiments, the crankshaft-drive receiving region 138 can include an internal gear (not shown) to receive a pinion gear, for example, on the crankshaft or crankshaft-drive. Alternatively, the crankshaft-drive receiving region can form a shaft, such as the exemplary shaft 2714 in FIG. 31 that extends from the drive-member 271 to pivotally engage a corresponding recessed region formed by a crankshaft drive, e.g., the recessed region 2502 formed by the crankshaft 270. For example, the embodiment of FIG. 23C provides such an arrangement and journals the drive-member 271 such that the sidewall 2701 (FIG. 31) pivotally engages the drive-member receiving region 2316 of the block 2302 providing robust support and low friction. Such journaling can be in addition to journaling of the drive shaft in a drive-member housing as described above. Alternatively, the drive shaft can be supported by a corresponding component, such as, for example, a motor-generator or a transmission.

In addition, weighted drive members can be incorporated to enhance balance of the rotating machine. For example, FIGS. 23-31 illustrate assemblies that include a weighted drive-member, e.g., a block 2302 housing first and second pistons 2306 and 2308 in respective first and second cylinders 2310 and 2312. The pistons 2306 and 2308 are coupled to a pair of weighted drive-members 271 through female crankshaft-drives 2502.

Figure 37B:
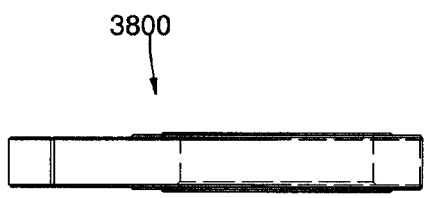
FIG. 37B illustrates a plan view of the shaft-mountable balance weight of FIG. 37 from above, showing hidden features in relief.
Figure 37:
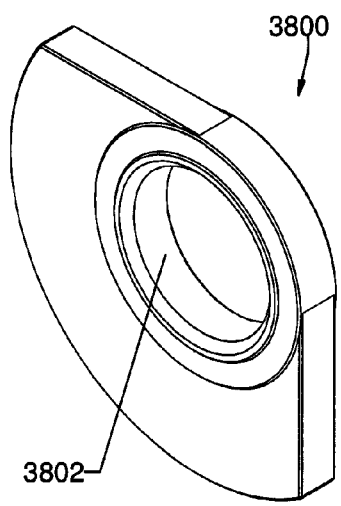
FIG. 37 illustrates a perspective view of an embodiment of a shaft-mountable balance weight for a drive-member.
Figure 37A:
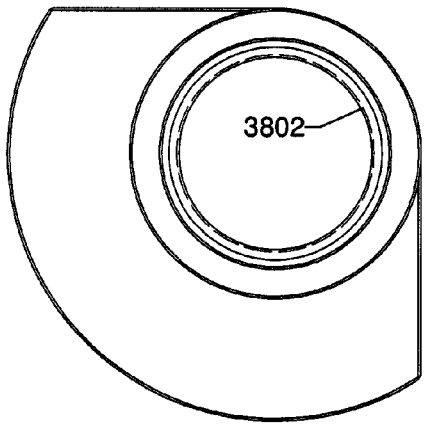
FIG. 37A illustrates a front elevation view of the shaft mounted balance weight of FIG. 48.

FIG. 31 shows one example of a weighted drive-member 271 including a prismatic sector 2712 that spans approximately 180-degrees about the longitudinal axis of the drive-shaft 2304. The longitudinal axis of the drive-shaft 2304 substantially coincides with the central-axis-of-rotation for the drive-member 271. The balance weight 2712 provides balance to the drive-member 271 and crankshaft 270 assembly during rotation. The exemplary balance weight 2712 is formed as a partial disc or flange partially disposed around the drive shaft 2304. In the embodiment of FIG. 31, the balance weight 2712 and the body are of unitary construction with the sidewall 2701. However, other embodiments of balance weights, for example the balance weight 3800 in FIGS. 37-37B, define a drive shaft receiving region 3802 for engaging a driveshaft, such as the driveshaft 136 shown in FIGS. 20-20B.

FIGS. 35-35B illustrate another embodiment of a weighted drive-member 3500. The weighted drive-member 3500 includes a driveshaft 3536 extending from the first side 3530 and an eccentrically located crankshaft-drive receiving region 3538 formed in the second side 3502. To provide eccentrically located balancing, the body 3532 also defines one or more recesses 3504 in the second side 3502 of the drive-member 3500. The recesses 3504 are symmetrically disposed about a plane that includes the central-axis-of-rotation of the drive-member 3500. The longitudinal axis of the drive-shaft 3536 substantially coincides with the central-axis-of-rotation for the drive-member 3500. In addition, the drive-member 3500 forms a sidewall 3534 that extends between the first side 3530 and the second side 3502. As with other drive-members, the sidewall 3534 is configured to pivot relative to a drive-member receiving region defined by a block or a housing. The body that defines the sidewall is one example of a prismatic sector that spans 360-degrees about the central-axis-of-rotation of the drive-member 3500. The sidewall 3534 could alternatively be configured to pivotally engage the block or the housing.

FIGS. 36-36C illustrate another embodiment of a weighted drive-member 4400. The weighted drive-member 4400 includes a drive shaft 4402 extending from a first side 4412, a crankshaft receiving region 4410 and one or more recessed regions 4408 defined by the body in the second side 4414. A gear 4416 extends from the sidewall 4406 to engage a corresponding gear 4604 on the balance shafts 40 and 41 (see FIGS. 26-26D). The drive-member 4400 also defines a member that extends longitudinally from the sidewall 4406 to form a partial annular body 4404 centered about the longitudinal axis of symmetry of the driveshaft 4402. In the embodiment of FIGS. 36-36C, the annular body 4404 circumferentially extends about 150-degrees and is disposed opposite the recessed regions 4408. The recesses are symmetrically disposed about a plane that includes the longitudinal axis of the driveshaft 4402. The annular body 4404 is similarly symmetrically disposed about the plane that includes the longitudinal axis of the driveshaft 4402. The longitudinal axis of the driveshaft 4402 substantially coincides with the central-axis-of-rotation for the drive-member 4400. Other embodiments of the annular body can circumferentially extend more or less than about 150-degrees. When assembled to a block and/or housing, the annular body 4404 partially fills a volume defined by the crankcase and left unoccupied by an eccentrically located and orbiting crankshaft portion, e.g., the volume 204A of FIG. 11.

In some instances, the drive-members employ a spur gear attached to or formed by the drive member sidewall. Spur gears of this sort can drive or be driven by one or more secondary geared shafts for synchronizing the drive-members and/or intermediate shafts. In addition, ancillary components, such as balance shafts, camshafts, pumps, or other power take-off devices can be similarly driven.

Assembly

With reference to FIG. 10, an exemplary assembly method will now be described. Methods similar to that described below can also be used to assemble other embodiments of shaft and bearing assemblies, including the embodiments described above.

To begin assembly, insert the crankshaft 116 into the crankcase 204 through the drive-member receiving region 118. Insert the first and second pistons 106 and 108 in respective first and second piston cylinders 110 and 112, making sure that the elongate body 144 and 145 of each piston 106 and 108 is slidably received in the respective narrow central-portion 202 and 207 of each piston cylinder 110 and 112.

The crankshaft bearing regions 121 and 124 engage the respective first and second piston journals 126 and 128 of the crankshaft 116. Accordingly, the crankshaft 116 should be positioned such that a crankshaft bearing region 121 or 124 of one piston 106 or 108 engages a respective piston journal 126 or 128. Attach a corresponding bearing cap 120 or 120A to the respective piston 106 or 108, gaining access to the bearing cap 120 or 120A through the cylinder access, e.g., the cylinder access 208, provided by each piston cylinder 110 and 112. Repeat this procedure for each additional piston. The drive-member 104 can be disposed in the drive-member receiving region 118 while inserting the crankshaft-drive 140 in the crankshaft-drive receiving region 138 of the drive-member 104. The drive-member 104 can be supported according to a selected drive-shaft support configuration, such as described above.

The just described assembly method can be used to assemble configurations with any number of cylinders by repeating the piston engagement and bearing cap attachment procedure for each cylinder of the configuration.

Comparison of Hypocycloid Kinematics to Conventional Slider-Crank Kinematics

The graph of FIG. 24 illustrates a comparison of piston travel for a reciprocating piston machine employing a hypocycloid configuration that provides a 3 inch piston stroke to piston travel of a production Ford 302 engine with a 3 inch piston stroke. The Ford 302 provides an excellent example of favorable slider-crank based piston kinetics. The solid line (MTM piston location) illustrates positions of a piston journal axis (e.g., journal axis 126 in FIG. 10) throughout one complete revolution of the crankshaft. The dashed line (Ford 302 piston location) illustrates the Ford 302 V-8 piston position throughout one complete revolution of its crankshaft. A vertical line at 90-degrees of rotation intersects the piston position curves and illustrates a difference in piston travel of approximately 0.231 inches (e.g., at 90-degrees rotation from TDC, the Ford 302 piston travels approximately 0.231 inches further than the piston in the hypocycloid configuration). The difference in piston displacements is plotted as the dotted line (improvement delta (I)) in FIG. 24. Thus the pistons and planetary crankshaft of the exemplary embodiment accelerate at lower rates than the conventional slider-crank based Ford 302 engine. This is because the hypocycloid based reciprocating piston machine provides a configuration that functions substantially equivalent to a conventional slider-crank mechanism with a connecting rod of infinite length. Accordingly, hypocycloid based reciprocating piston machines provide a more compact package than conventional connecting rod arrangements. Lower acceleration and deceleration rates of the reciprocating mass in the exemplary embodiment are further complemented by low reciprocating component mass to further reduce stress during operation.

Bearings and Journaling

Referring to FIGS. 10, 11, 15, and 22B, a very beneficial mechanism is provided in the narrowed central-section of cylinder region 202 and 207 for supporting, guiding and bearing of the reciprocating slider (e.g. a piston) received therein. Referring to FIG. 11, for example, a force can be applied to the piston head 143 (such as by an expanding gas). The force is substantially borne through the piston 108 and transmitted to the planetary crankshaft 116 by the journal 128. Accordingly, a substantially tangential force is transmitted through the crankshaft drives 140 and 141 (see e.g., FIGS. 3-4) to the rotatable drive-members 104 and 105 as discussed in some detail in the Applied Geometry Operational Overview and the Applied Kinematics sections.

Lateral forces are substantially borne by the slidable coupling between the elongate body and the corresponding narrowed central region of the piston-cylinder as shown by FIG. 11. Accordingly, the narrowed arcuate wall 416 functions as a sliding journal received in a narrowed central region of the piston-cylinder. Thus, the piston as received in the cylinder acts as a dynamic crankshaft journaling device which reciprocates to provide a beneficially tangent position for the crankshaft to optimally translate reciprocation to rotation, and vice-versa.

Such configurations eliminate conventional main bearings. Several benefits accrue from these configurations. For example the elongated bearing surfaces provided by the arcuate walls substantially bear eccentric forces acting on the piston rings. Also, spacing the crankshaft bearing region 121 (FIGS. 16-18F) from the piston ring carrier region 424 reduces eccentric forces that are detrimental to the piston rings. Thus, the piston rings can be configured with less tension against the cylinder wall sealing surfaces, thereby further reducing friction.

With regard to FIGS. 11-15 narrowing of the piston and cylinder provides for a compact and lightweight block (e.g., the block 102) that rigidly supports transverse loads applied to the cylinder structure are rigidly supported.

Figure 14:
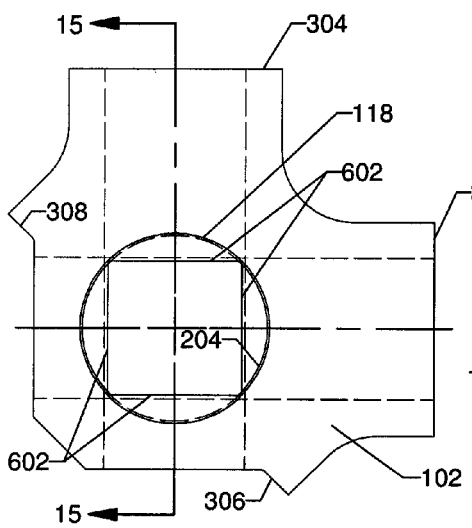
FIG. 14 illustrates a front elevation view of the block shown in FIG. 12.
Figure 15:
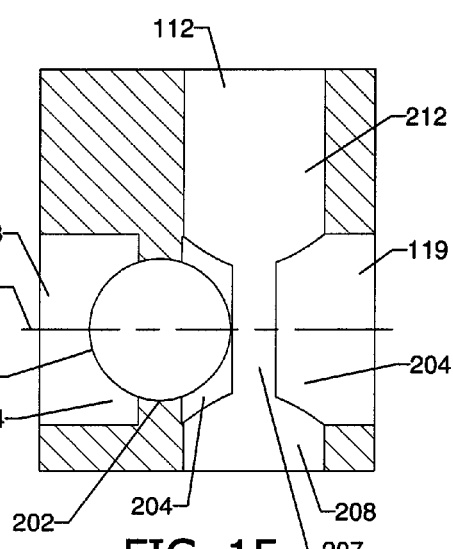
FIG. 15 illustrates a cross-sectional view of the block shown in FIG. 12 taken along line 15-15 of FIG. 14.

In addition, as FIG. 14 illustrates, the transverse cylinders create a longitudinal "window" 602 that enables installation of the crankshaft while still providing a substantially unitary cylinder block structure. Also, cylinder and piston narrowing provides for a shorter more rigid, robust, less massive crankshaft, further reducing stress and friction. A light, robust piston is also provided optimized, which reduces friction and provides a long and efficient service life.

In general it should be understood that embodiments of bearings and journaling described herein are but a few examples. Ball bearings, insert bearings, bushings, needle bearings, full floating turbine bearings, are several other examples of bearings that can be usefully employed.

Lubrication

Embodiments described herein can use conventional lubrication systems. For example lubrication can be provided by a dry or wet sump, an oil pump and filtration system to provide a clean pressurized oil supply to an oil galley, and oil passages in fluid connection with bearings and journals. Oil galleys can provide oil to the drive-members 104 and 105, the crankshaft 116 and other intermediate shafts.

Although several illustrated drive-members do not include a drive-member housing due to wide variations in form that are possible, such housings can provide oil passages in fluid connection with an oil galley and thus provide pressurized filtered oil to bearings that journal or portions (e.g., the driveshaft) thereof. Drive-members can define an oil passage in fluid connection with the journaling region(s) of the driveshaft to provide oil lubrication to the drive-member crankshaft receiving regions, such as the regions 138 and 139.

In addition, oil passages in the crankshaft 116 can fluidly connect the crankshaft drives 140 and 141 and the first and second piston journals 126 and 128 for distribution of pressurized oil therebetween.

Those skilled in the art should also understand that oil provided to a central passage in a driveshaft (e.g., the driveshaft 136) will benefit from increased pressure at the crankshaft receiving region due to the centrifugal forces imparted by rotation of the drive-member. Similar benefit is imparted to oil similarly conveyed to the oil passages in the crankshaft drive. Rotation of the crankshaft also imparts increased pressure to the oil conveyed to the crankshaft piston journals.

Further, one or more oil galleys (not shown) can provide pressurized, filtered oil from a pump and filter (not shown) to oil ports in the piston-cylinders 110 and 112. Piston-cylinders 110 and 112 so provided with pressurized oil can deliver oil to the oil pathways 402, 403, 403A, 404, 404A, and oil squirts 428 (for piston head cooling). See FIGS. 16-18F, 21A and 21B. Reciprocating motion of the pistons relative to the piston-cylinders 110 and 112 can provide pumping action for oil.

For example, oil provided to an oil pathway, such as the oil pathway 402 (FIG. 16), can be pumped into passages of the piston, such as the oil pathways 403, 403A, 404, 404A, and between the arcuate sidewall 416 and the corresponding piston cylinder wall. Such comprehensive hydrodynamic lubrication ensures sufficient oil is distributed, thereby reducing operational friction.

Oil squirt features 428 provide pressurized squirts of oil to the underside of the piston head to provide cooling of the piston head. Oil return holes 406 are provided under the groove 412 to return oil from an oil scraper ring. Also, the piston head 142 and piston ring-carrier structure 424 can provide oil pathways (406 are oil scraper ring return holes) in fluid connection to an oil reservoir (not shown) to enhance cooling of the piston head 142, the piston ring-carrier structure 424, and the piston rings during operation.

The oil galley can provide oil to intermediate shafts, and balance shaft bearings and journals using conventional means.

In addition, the oil galley can provide oil to the drive-members 104 and 105, the crankshaft 116 and other intermediate shafts. As will be understood, oil can be provided using any conventional oil delivery method, such as, for example, wet or dry sump pressure oiling.

Balancing

Figure 25:
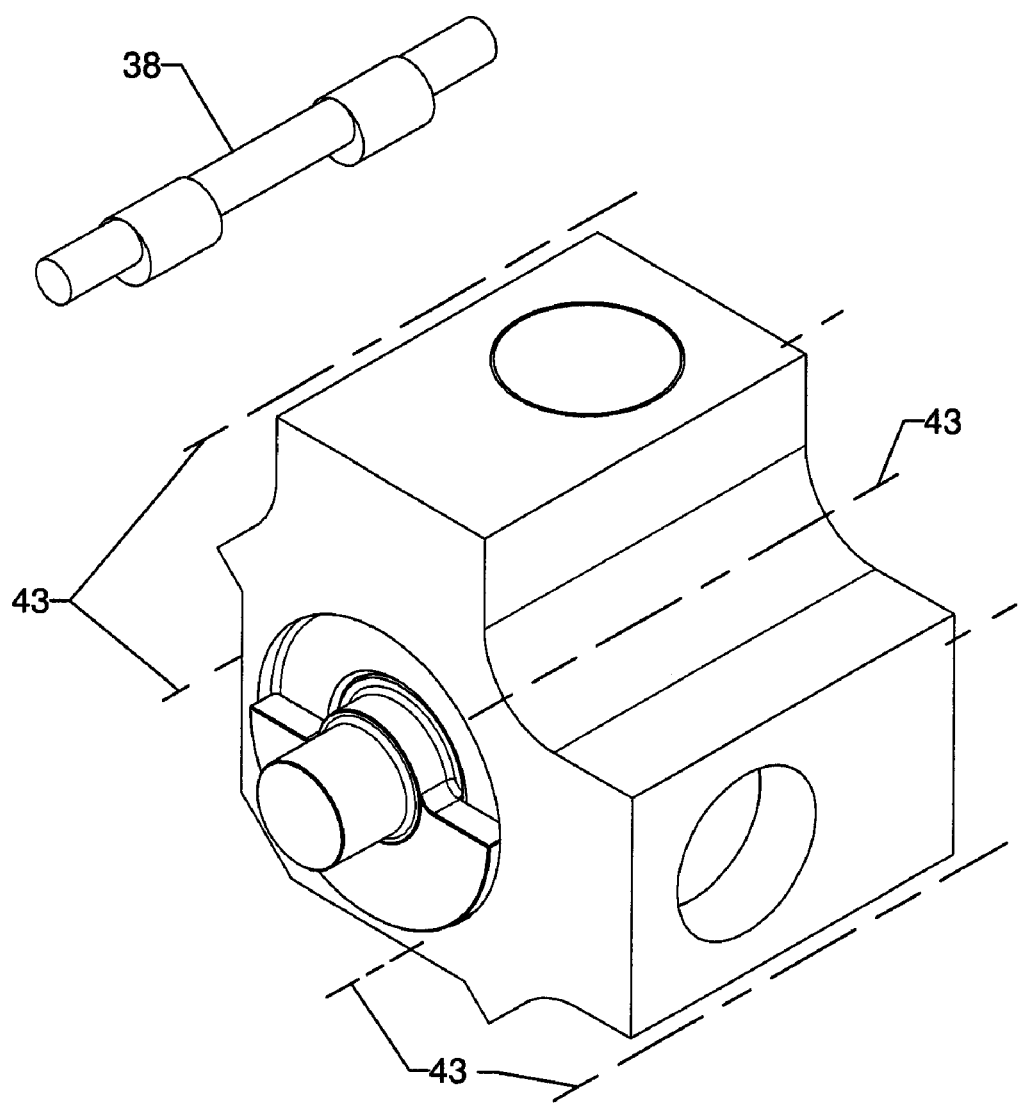
FIG. 25 illustrates an exploded perspective view of an embodiment similar to that of FIG. 23 incorporating a balance shaft.
Figure 26D:
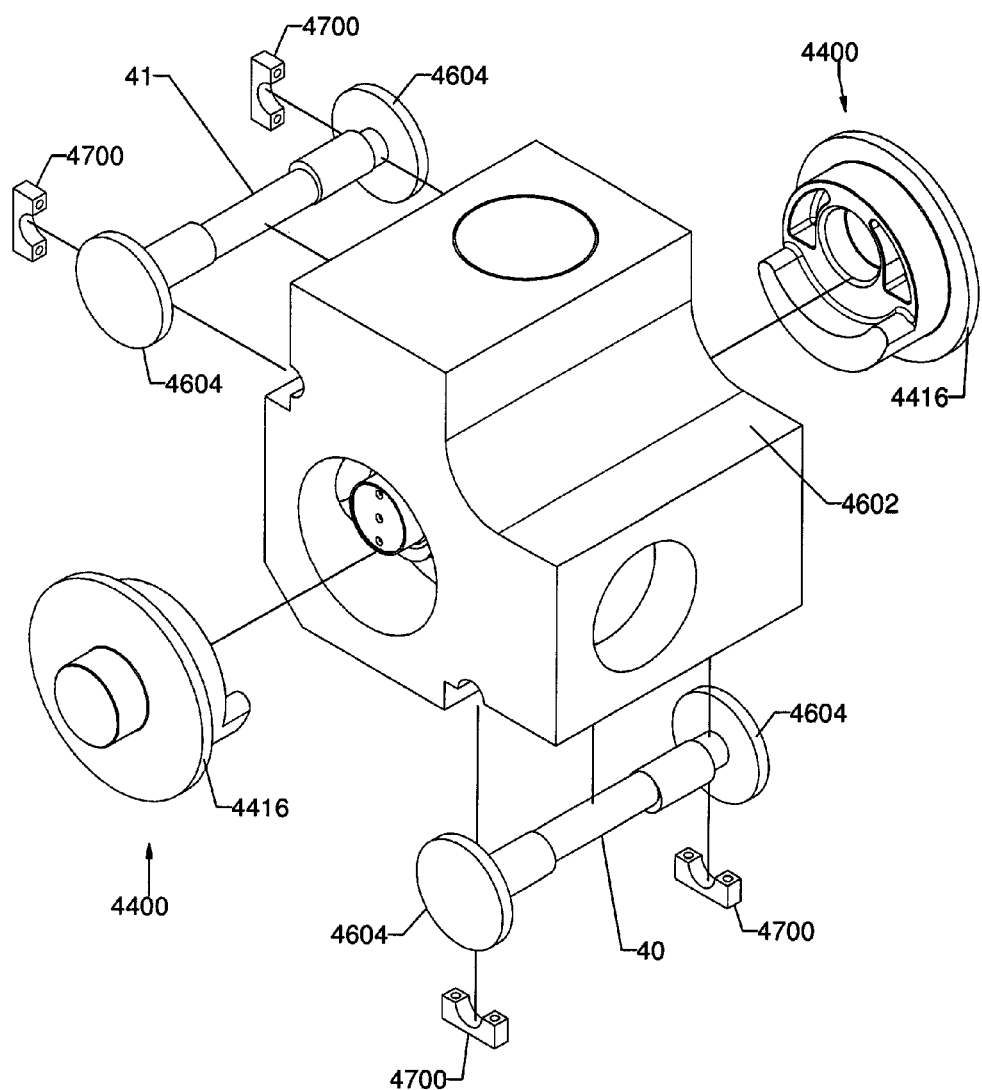
FIG. 26D illustrates an exploded perspective view of the embodiment of FIG. 26.

FIGS. 25-26D-illustrate embodiments of reciprocating piston machines with balance shafts 38, 40 and/or 41 that can be located parallel to the central axis of rotation. With regard to FIG. 25, one or more balance shafts 38 can be positioned at one or more locations 43, such as the lower sides of the cylinder block, between the "V" formed by the cylinders, or in the sump area below the oil sump attachment flange. The balance shaft 38 can be used in conjunction with a weighted drive-member, or without. A balance shaft can be configured with mass appropriate for primary balance purposes, or to balance secondary imbalance if needed. A balance shaft drive can be coupled to the driveshaft(s), and or intermediate shaft(s), using a chain and sprockets, a belt and pulleys, or a gear train to synchronize balance shaft 38 rotational speed with crankshaft rotational speed. Depending on configuration, the balance shaft 38 can rotate at the same rate as the driveshaft or some faster or slower speed relative to the driveshaft, such as, for example, twice the driveshaft rotational speed.

Some balance shafts are driven by a gear train or a chain engaging a pair of corresponding sprockets coupled to a drive-member and/or an intermediate shaft. Such configurations are particularly useful for driving balance shafts at rotational speeds different from the driveshaft rotation speed, for synchronizing the drive members and intermediate shafts, and for providing one or more additional load paths for power transmission and reduced friction. Balance shafts so configured can also be used to drive of ancillary devices, and for power take-off, e.g., reduction drive for propeller drive.

FIGS. 26-26D illustrate another example that incorporates balance shafts 40 and 41 that provide secondary balance to the reciprocating piston machine 4600 and synchronization of the drive-members 4400. The assembly 4600 incorporates drive-members 4400 defining gears 4416 that engage corresponding gears 4604 defined by the balance shafts 40 and 41. In the illustrated embodiment, the gears 4604 are driven at twice the rotational speed of drive-members 4400, although other embodiments provide different gear ratios that will drive the gears 4604 at different speeds relative to the drive-members 4400. The balance shafts 40 and 41 are retained to the block 4602 with caps 4700 and are received in corresponding journals defined by the caps 4700 and the block 4602. The balance shafts 40 and 41 can incorporate eccentrically mounted weights sized and be located to balance secondary vibrations.

Exemplary Single-Cylinder Embodiments

With further reference to the geometric relationships illustrated in, for example, FIG. 1, a single point on the circumference of the inner circle 6703, such as the point 6702, reciprocates along a corresponding axis. As more fully described below with reference to FIGS. 27 and 28, a selected single point on the circumference of the inner circle 6703, such as the point 6702, can represent a longitudinal axis of a crank-pin for a single-cylinder reciprocating piston machine.

Figure 27:
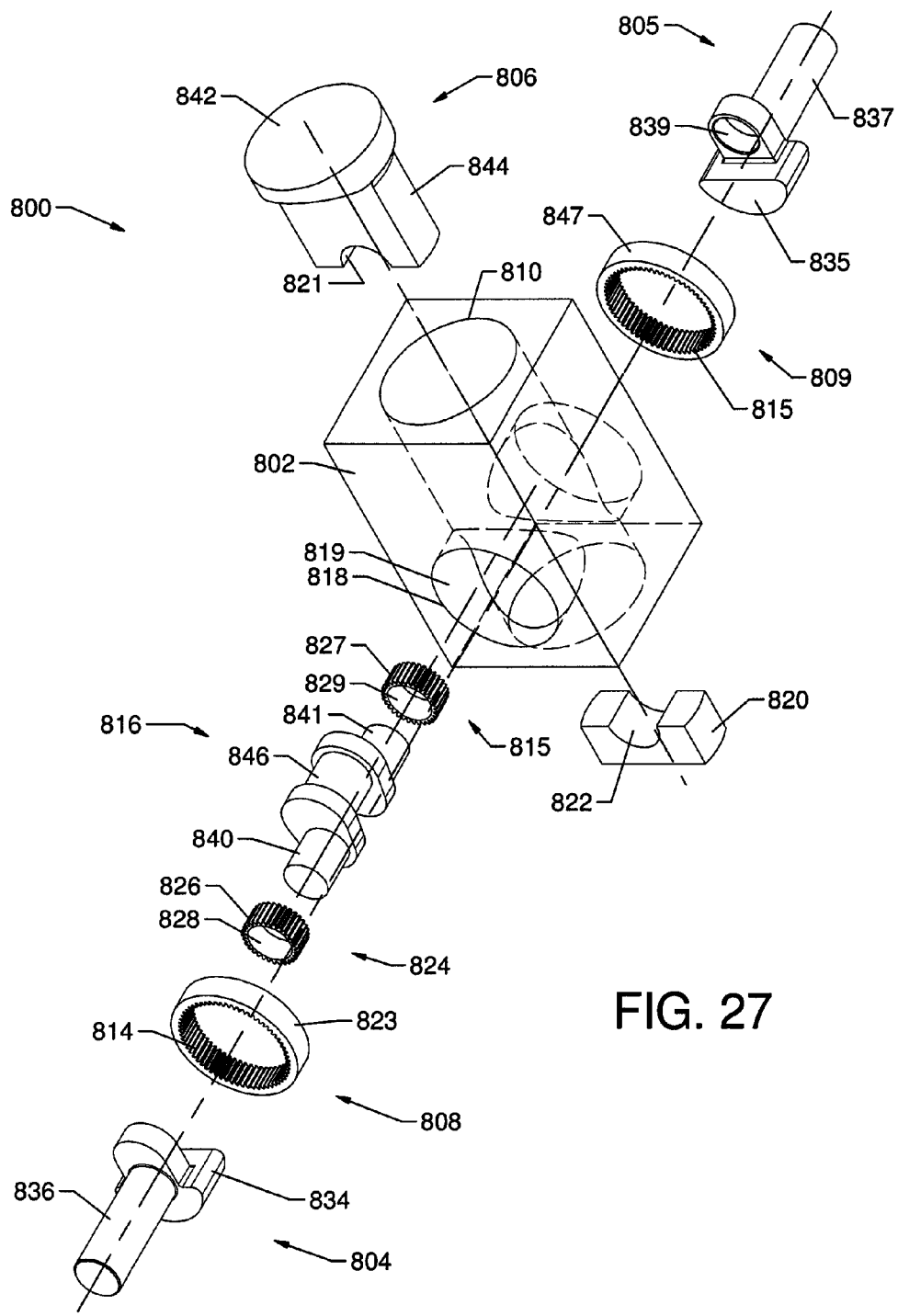
FIG. 27 illustrates an exploded view of a single-cylinder embodiment of a machine configured to convert reciprocation to rotation, and vice-versa. Selected features are shown in relief.

FIG. 27 illustrates an exploded view of a single-cylinder embodiment of a reciprocating piston machine incorporating MTM architecture. A planetary crankshaft 816 can have pinions 815, 824 in fixed relationship relative to the crankshaft. In the illustrated embodiment, pinion bores 828, 829 coaxially engage respective crankshaft drives 840, 841.

The block 802 receives the planetary crankshaft 816 through the crankcase aperture 818. The block 802 defines a single piston cylinder 810 and slidably receives a corresponding single piston 806. In the example illustrated in FIG. 27, the piston head 842 slidably mates with the walls of the cylinder 810. As shown, the elongate body 844 is narrowed relative to the piston head 842 and, in this example, is not in sliding contact with the walls of the piston cylinder. As discussed above with regard to the piston shown in FIG. 30, the narrowed region of the piston 806 is spaced from the walls of the piston cylinder for reducing friction between the walls of the cylinder and the piston. A piston bearing recess 821 can receive the piston crankpin 846 and a piston bearing cap 820 can be affixed to the proximal end of the elongate body 844, capturing the piston crankpin 846 between the recesses 821, 822 in a bearing relationship.

The crankcase bore 819 receives ring gears 808, 809 on corresponding crankcase-bearing regions 823, 847. The respective internal ring-gear cogs 814, 815 matingly engage respective crankshaft-drive-pinion cogs 826, 827.

The drive-member 805 has a crankshaft-drive receiving region 839 that pivotably receives the crankshaft-drive 841, and the crankshaft-drive receiving region (not visible as illustrated) of the drive-member 804 pivotably receives the crankshaft-drive 841 located at an opposing end of the crankshaft from the crankshaft-drive 841. Driveshafts 836 and 837 can be journaled in a bearing relationship with housings (not shown) being positioned coaxially relative to the crankcase and the central-axis-of-rotation.

As with the piston shown in FIG. 27 and discussed above, piston to piston-cylinder swept surface area can be reduced by having a narrowed body. In addition, it is believed that the illustrated ring-gear/pinion configuration reduces piston-to-cylinder eccentric forces, reducing overall piston-slider mechanism friction and improving overall efficiency.

Figure 28:
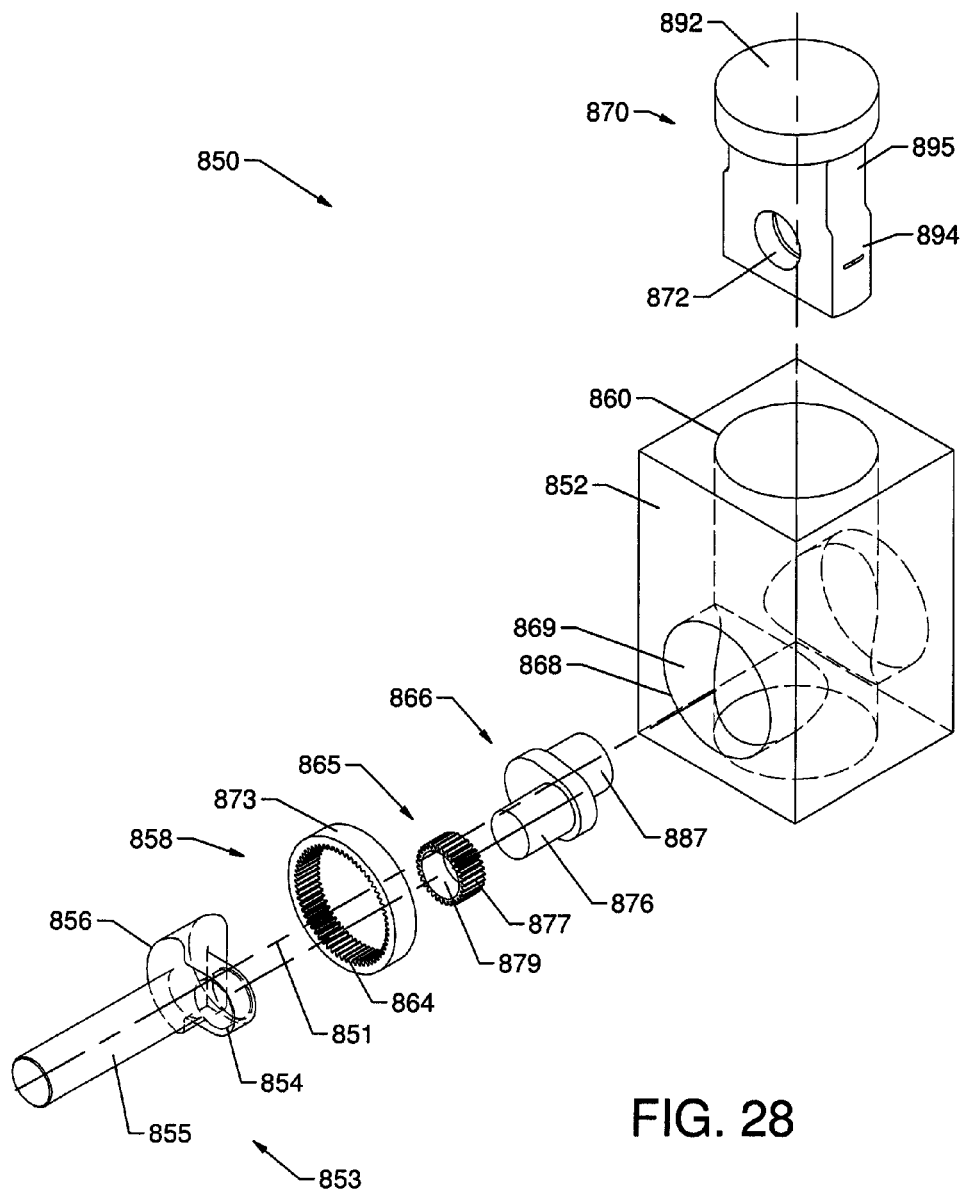
FIG. 28 illustrates an exploded view of another single-cylinder embodiment of a machine configured to convert reciprocation to rotation, and vice-versa. Selected features are shown in relief.

FIG. 28 shows an exploded view of another single cylinder embodiment incorporating MTM architecture. The illustrated reciprocating piston machine incorporates the piston 870 shown in FIG. 30. The piston 870 is received by the piston-cylinder bore 860 defined by the block 852. The crankshaft drive 876 of the crankshaft 866 fixedly receives a pinion 865 in coaxial relationship with the pinion-gear bore 879. The crankshaft 866 is received through the crankcase aperture 868 and the piston crankpin 887 is pivotably received in the piston crankpin bearing bore 872. The internal ring gear 858 can be fixedly received in the corresponding crankcase bore 869 and positioned coaxially therewith relative to the internal ring gear outer diameter 873. The crankshaft drive pinion cogs 877 can matingly engage internal ring gear cogs 864. A drive-member 853 can be received by the crankcase aperture 868 and can receive the crankshaft-drive 876 in the corresponding crankshaft drive-member receiving region 854.

The illustrated drive member 853 can provide dynamic balance by incorporating a balance weight 856. The driveshaft 855 can be supported by a housing having, for example, roller bearings (not shown) coaxially aligned relative to the crankcase 868 and the central axis of rotation 851. The driveshaft 855 can, in some embodiments, comprise an electrical armature (e.g., such as the armature 637 of FIG. 7). Such an electrical armature can be used to drive the drive-member 853 through rotation, which in turn can drive the piston 870 through reciprocation (as for use as a positive displacement pump, such as a compressor used in vapor-cycle refrigeration).

Embodiments with More than Two Cylinders

Although this description has focused to this point largely on one- and two-cylinder configurations, those skilled in the art will recognize that any number of cylinders can be configured according to the concepts disclosed herein.

By way of example, FIG. 29 illustrates an exploded and cut away view of one exemplary four-cylinder embodiment 900 incorporating MTM architecture. FIG. 29A shows detail within the circled region 29A of FIG. 29. The crankshaft 916 is received in the crankcase 913. Elongate pistons 906, 908, 910 and 912 are received in respective piston-cylinders (e.g., cylinders 907, 909). Piston cylinders 907 and 909 are shown as being cut-away at each respective central bore axis (not shown). The pistons 910 and 912 are shown as being exposed and free from piston-cylinders for clarity of illustration.

The illustrated internal ring gear 962 comprises a cylindrically shaped external bearing surface being coaxially received in a crankcase bore (not shown), and internal gear cogs 968 in mating engagement with the illustrated crankshaft-drive pinion cogs 906. As with pinions described above, the pinion 906 is fixedly attached and coaxially aligned relative to the crankshaft drive 940. The drive-member 904 pivotably receives crankshaft drive 940 in the crankshaft-drive receiving region 905. A balance weight 934 is offset relative to the drive-member receiving region 904, being located opposite the drive-member receiving region relative to a central axis of the driveshaft 936.

The piston-cylinder bearing region 994 of each inner piston (e.g., the piston 908) is in a sliding, linear-bearing contact with a cylinder wall 996 of each respective piston-cylinder (e.g., the cylinder 909). The corresponding narrowed region 995 of the piston 908 can be, as shown, spaced from the cylinder wall 996, providing a piston-cylinder clearance. The narrowed region 944 of an adjacent (e.g., outer) piston 906 can also be spaced from the wall of the cylinder bore 907, as shown. Each outer piston-cylinder (e.g., cylinder 907) opens to and ends at the crankcase 913. In contrast, each of the inner piston cylinders (e.g., cylinder 909) extends across (or transects) the crankcase 913. The sliding bearing engagement between the bearing region 994 and the corresponding cylinder walls can support lateral forces arising in various portions of the orbit of the crankshaft 916 about the central-axis-of-rotation. The inner pistons 908, 910 can be configured relative to each respective cylinder in a manner similar to that illustrated in, for example, FIG. 22B.

Each of the illustrated outer pistons 906, 912 are shown in FIG. 29 as having a narrowed region 911, 944 extending from the respective proximal end near the crankshaft engaging region to a region adjacent the respective piston head (e.g., the head 942) adjacent the distal end of the piston. The narrowed regions 911, 944 are spaced from the cylinder walls. Lateral forces for these pistons can be supported by the ring-gear and pinion.

Another embodiment that provides four cylinders is illustrated in FIG. 32. The four-cylinder machine 2800 provides two pairs of pistons, each pair composed of two pistons oriented at 90-degrees relative to each other, with each pair having a similar orientation. The illustrated embodiment thus provides two horizontal pistons 2804 and 2808 and two vertical pistons 2802 and 2806. Although the two pairs of pistons are aligned with each other, some embodiments will provide pairs of pistons at various angles relative to each other, and some will provide pairs of pistons that oppose each other.

Notably, the configuration shown in FIG. 32 provides an out of phase configuration for the pistons 2802, 2804, 2806 and 2808. In other words, the horizontal pistons 2804 and 2808 are out of phase by about 180-degrees. As shown out of phase operation places one piston 2804 near bottom dead-center and another piston 2808 near top dead-center. Similarly, the vertical pistons 2802 and 2806 are also out of phase by about 180-degrees relative to each other. As noted above, arrangements that provide out of phase piston configurations offer improved balance, which in turn provides an increase in rotational speed that can be safely achieved. When used for an internal combustion engine, sequential ignition can be used with out-of-phase pistons, which provides smoother and more continuous power than with pairs of pistons that are in phase.

The pistons can be configured to operate out of phase using a crankshaft with an intermediate shaft that provides piston journals disposed at various circumferential locations relative to the crankshaft longitudinal axis. As described above, the crankshaft of FIG. 32, incorporates an intermediate shaft 2900 disposed between adjacent crankshaft portions 2801 and 2803 to provide out of phase piston reciprocation for pistons 2804 and 2808, and for pistons 2802 and 2806. Similar to the embodiment of FIG. 9, the embodiment of FIG. 32 includes drive-members 2810 and 2812 for communicating rotational motion to or from the crankshaft.

Although the pistons 2802, 2804, 2806 and 2808 are configured to operate out of phase in the embodiment of FIG. 32, some four cylinder embodiments will provide pairs of pistons that operate in phase. These embodiments simply provide an additional pair of opposing piston journals longitudinally along the crankshaft.

Figure 34A:
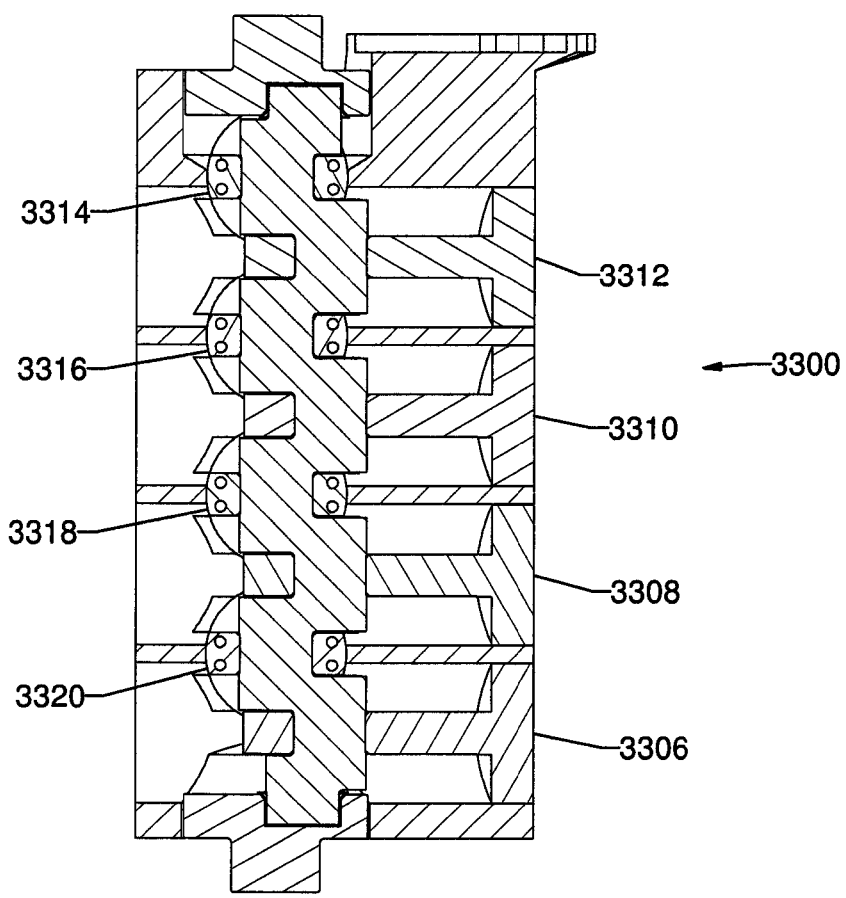
FIG. 34A illustrates a cross-sectional view along line 34A-34A of FIG. 34.
Figure 34:
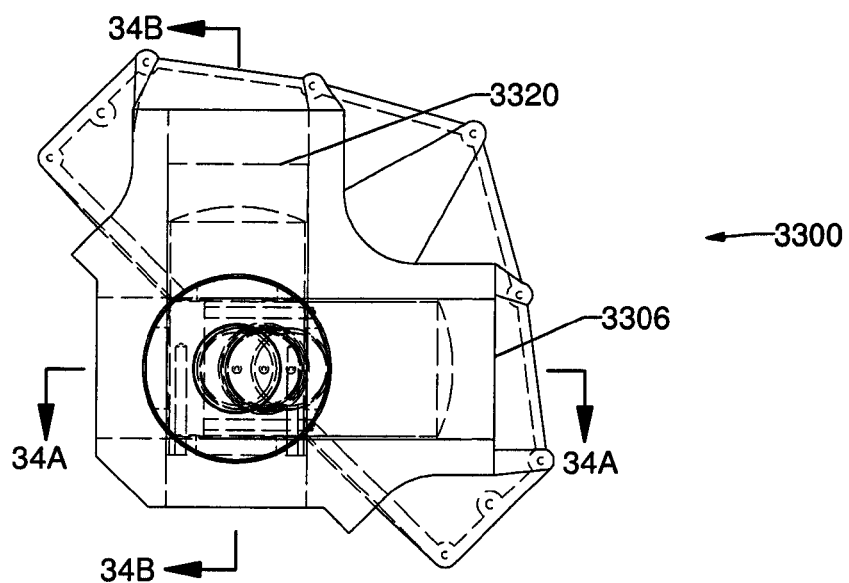
FIG. 34 illustrates a front elevation view of a third alternative embodiment, which uses an eight cylinder configuration to convert motion from rotation to reciprocation, and vice-versa, with internal features shown in relief.
Figure 34B:
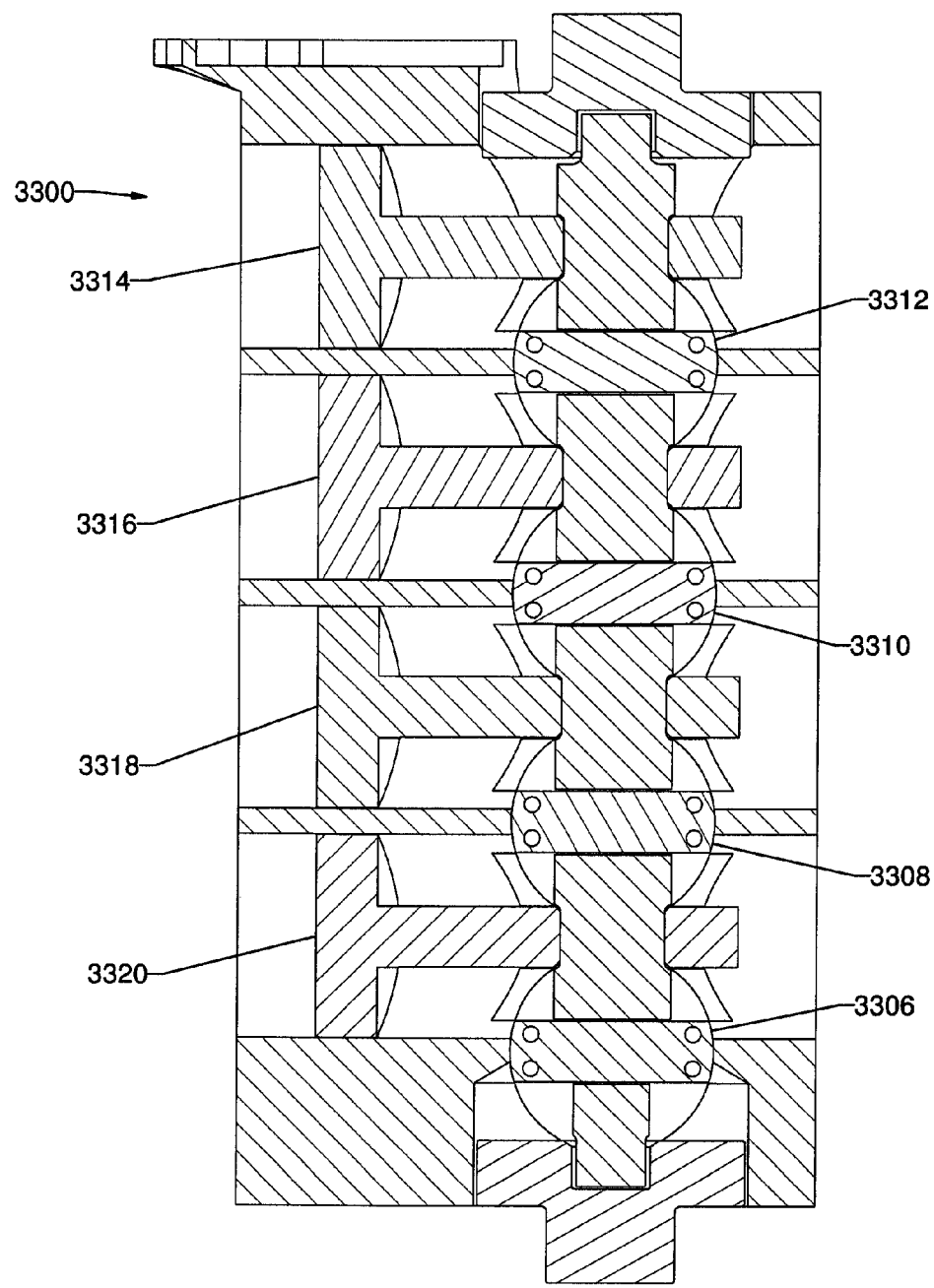
FIG. 34B illustrates a cross-sectional view along line 34B-34B of FIG. 34.

The embodiment shown in FIGS. 34-34B provides an exemplary eight cylinder configuration 3300, which provides four pairs of pistons, each pair composed of two pistons oriented at 90-degrees relative to each other. Each pair of pistons has nearly the same orientation. Thus, the embodiment of FIG. 34 provides four horizontal pistons 3306, 3308, 3310 and 3312 and four vertical pistons 3314, 3316, 3318 and 3320. Although the four pairs of pistons are substantially aligned with each other, some embodiments will provide pairs of pistons at various angles relative to each other, and some will provide pairs of pistons that oppose each other.

Unlike the four cylinder configuration of FIG. 32, the eight cylinder configuration 3300 provides in-phase motion among the horizontal pistons and in-phase motion among the vertical pistons, although the horizontal pistons are out of phase from the vertical pistons. Thus, the four horizontal pistons 3306, 3308, 3310 and 3312 will be near top dead center simultaneously and near bottom dead center simultaneously. Similarly, the four vertical pistons 3314, 3316, 3318 and 3320 will be near top dead center simultaneously and near bottom dead center simultaneously. Those of ordinary skill will recognize that although the embodiments of FIGS. 34-34B provides in-phase motion among the horizontal pistons and among the vertical pistons, some eight cylinder configurations will provide out of phase motion among horizontal pistons and among vertical pistons.

In addition to the above described "V-twin," "V4," and "V8" configurations, other possible cylinder configurations include three-cylinder, five-cylinder and six-cylinder configurations, both in a "V" configuration and in an in-line configuration, cruciform configurations, elongate cruciform configurations, opposed orientations, single cylinder configurations, in-line twin configurations, in addition to modular configurations.

Additional Embodiments and Features

Configurations similar to those described above can convert motion from reciprocation to rotation, and vice-versa. Such configurations include pistons capable of performing mechanical work on a fluid, e.g., by compressing the fluid. Alternatively, a fluid, e.g., products of combustion, can perform mechanical work on the pistons.

Some of the described configurations, as well as others evident to those of ordinary skill in view of this disclosure can be used for internal combustion engines, e.g., two-cycle and four-cycle engines that rely on spark or compression ignition. Other embodiments similar to those described herein can be used as a compressor, such as, for example, a super-charger, or a positive displacement pump for pumping liquids.

In addition, "the substantially square to oversquare" bore diameter to stroke length ratios, made possible by the disclosure above, provide lower accelerations for the movable components, resulting in lower forces and corresponding stresses. As a result, embodiments that adopt the above described features can operate at higher cylinder pressures, and at higher rotational speeds, e.g., RPM, yielding power and efficiency improvements compared to conventional reciprocating piston devices. With respect to FIG. 24, the improvement in piston "dwell" in the exemplary embodiment provides substantially more time for an expanding gas to act upon a piston head to perform work.

In some embodiments, such as several described above concerning crankshafts having a pinion, "substantially undersquare" bore-to-stroke ratios, i.e., embodiments with a piston stroke in excess of a corresponding bore diameter, are desirable. These embodiments can have larger diameter pinions for facilitating improved piston reciprocation.

Embodiments according to the present disclosure can be comparatively simple to assemble and well suited to machining, such as CNC-machining. Embodiments similar to those described also provide improved piston locations as compared to conventional reciprocating piston machines that rely on a slider-crank configuration. See, e.g., FIG. 24.

Embodiments of hypocycloid motion translation mechanisms as described above innovatively addresses the need for a robust, compact, lightweight, highly efficient mechanism which may be practically produced, and cost effectively implemented, and which will provide high efficiency in operation, and long reliable service life with little loss of efficiency.

In view of the many possible embodiments to which the above disclosed principles may be applied, the illustrated embodiments are only exemplary in nature and should not be taken as limiting. Rather, the scope of protection sought is defined by the following claims. I therefore claim all that comes within the scope and spirit of the following claims.

We claim:

1. A crankshaft and bearing apparatus comprising:
a crankshaft defining at least one crankshaft-drive having a crankshaft-drive axis-of-rotation, and at least one piston-journal defining a longitudinal axis radially spaced from the at least one crankshaft-drive axis-of-rotation;
a corresponding at least one piston engaging the at least one piston-journal;
a drive member defining a central axis-of-rotation and a crankshaft drive receiving region for receiving the at least one crankshaft-drive;
a pinion coupled to and movable with the crankshaft; and
an internal ring gear matingly engageable with the pinion, wherein the longitudinal axis of each at least one piston-journal reciprocates along a respective substantially linear hypocycloidal path as the crankshaft orbits about the central-axis-of-rotation, and wherein:
the at least one piston comprises at least a first piston and a second piston;
the at least one piston-journal comprises at least a first piston-journal pivotably engageable with the first piston and defining a corresponding longitudinal axis, and a second piston-journal pivotably engageable with the second piston and defining a corresponding longitudinal axis;
the respective longitudinal axes of the first piston-journal and the second-piston-journal are angularly separated from each other by a first angle relative to the crankshaft-drive axis-of-rotation;
the first angle measures between 0-degrees and less than 180-degrees;
the longitudinal axis of the first piston-journal is structured to reciprocate in a first linear hypocycloidal path as the crankshaft orbits about the central-axis of rotation;
the longitudinal axis of the second piston-journal is structured to reciprocate in a second linear hypocycloidal path arranged at a second angle, relative to the first linear hypocycloidal path, that is one half the angular degrees of the first angle;
a stroke length of the first piston is defined by a length of the first linear hypocycloidal path;
the first piston is structured to slide along a first axis of a first piston cylinder;
the first axis of the first piston cylinder is parallel to and aligned with the first linear hypocycloidal path;
a stroke length of the second piston is defined by a length of the second linear hypocycloidal path;
the second piston is structured to slide along a second axis of a second piston cylinder;
the second axis of the second piston cylinder is parallel to and aligned with the second linear hypocycloidal path;
the first axis of the first piston cylinder is arranged at a third angle, relative to the second axis of the second piston cylinder; and
the third angle is equal in terms of angular degrees to that of the second angle that is one half the angular degrees of the first angle.

2. The crankshaft and bearing apparatus of claim 1, wherein the longitudinal axis of the first piston-journal and the longitudinal axis of the second piston-journal reciprocate in respective first and second planes as the crankshaft orbits about the central-axis-of-rotation, and wherein the first plane and the second plane are angularly separated by the second angle measuring one-half of the first angle.

3. The crankshaft and bearing apparatus of claim 1, wherein:

the at least one piston comprises at least the first piston, the second piston, a third piston and a fourth piston; and the at least one piston-journal comprises at least the first piston-journal pivotably engageable with the first piston and defining the corresponding longitudinal axis, the second piston-journal pivotably engageable with the second piston and defining the corresponding longitudinal axis, a third piston-journal pivotably engageable with the third piston and defining a corresponding longitudinal axis, and a fourth piston-journal pivotably engageable with the fourth piston and defining a corresponding longitudinal axis.

4. The crankshaft and bearing apparatus of claim 1, wherein:

the first piston includes a first piston head and the second piston includes a second piston head;

the first piston further includes a first elongate body having first and second arcuate walls, the first elongate body has a narrowed region, and the first elongate body extends between the first piston head and the first piston-journal; and the second piston further includes a second elongate body having first and second arcuate walls, the second elongate body has a narrowed region, and the second elongate body extends between the second piston head and the second piston-journal;

the crankshaft and bearing apparatus further comprising a block, wherein the internal ring gear is fixed relative to the block, the block defining:

the first piston cylinder having a corresponding first cylinder axis and being configured to slidably receive at least a portion of the first piston and the first elongate body such that at least a portion of the first arcuate wall is in sliding contact with the first piston cylinder, at least a portion of the second arcuate wall is in sliding contact with the first piston cylinder, and the narrowed region is not in contact with the first piston cylinder, and the second piston cylinder having a corresponding second cylinder axis and being configured to slidably receive at least a portion of the second piston and the second elongate body such that at least a portion of the first arcuate wall is in sliding contact with the second piston cylinder, at least a portion of the second arcuate wall is in sliding contact with the second piston cylinder, and the narrowed region is not in contact with the second piston cylinder, wherein an angle between the first cylinder axis and the second cylinder axis corresponds to the first angle.

5. The crankshaft and bearing apparatus of claim 4, wherein the at least a portion of the first piston comprises the first piston head.

6. The crankshaft and bearing apparatus of claim 5, wherein the at least a portion of the first piston further comprises at least a portion of the first elongate body extending between the first piston head and the respective piston-journal.

7. The crankshaft and bearing apparatus of claim 1, wherein the first angle measures between about 60-degrees and about 150-degrees.

8. The crankshaft and bearing apparatus of claim 1, wherein the first angle measures between about 75-degrees and about 135-degrees.

9. The crankshaft and bearing apparatus of claim 1, wherein the first angle measures between about 85-degrees and about 100-degrees.

10. The crankshaft and bearing apparatus of claim 3, wherein:

the respective longitudinal axes of the third piston-journal and the fourth-piston-journal are angularly separated from each other by a fourth angle relative to the crankshaft-drive axis-of-rotation;

the fourth angle is equal in terms of angular degrees to that of the first angle;

the longitudinal axis of the third piston-journal is structured to reciprocate in a third linear hypocycloidal path as the crankshaft orbits about the central-axis of rotation; and the longitudinal axis of the fourth piston-journal is structured to reciprocate in a fourth linear hypocycloidal path arranged at a fifth angle, relative to the third linear hypocycloidal path, that is one half the angular degrees of the fourth angle.

11. The crankshaft and bearing apparatus of claim 3, wherein:

the respective longitudinal axes of the third piston-journal and the fourth-piston-journal are angularly separated from each other by a fourth angle relative to the crankshaft-drive axis-of-rotation;

the first angle measures between about 60-degrees and about 150-degrees;

the fourth angle is equal in terms of angular degrees to that of the first angle;

the longitudinal axis of the third piston-journal is structured to reciprocate in a third linear hypocycloidal path as the crankshaft orbits about the central-axis of rotation; and the longitudinal axis of the fourth piston-journal is structured to reciprocate in a fourth linear hypocycloidal path arranged at a fifth angle, relative to the third linear hypocycloidal path, that is one half the angular degrees of the fourth angle.

12. The crankshaft and bearing apparatus of claim 2, wherein:

the second angle measures between 0-degrees and less than 180-degrees;

the stroke length of the first piston is defined by the length of the first linear hypocycloidal path within the first plane;

the first piston is structured to slide along the first axis of the first piston cylinder within the first plane;

the stroke length of the second piston is defined by the length of the second linear hypocycloidal path within the second plane; and the second piston is structured to slide along the second axis of the second piston cylinder within the second plane.

13. The crankshaft and bearing apparatus of claim 2, wherein:

the second angle measures between about 20-degrees and about 150-degrees;

the stroke length of the first piston is defined by the length of the first linear hypocycloidal path within the first plane;

the first piston is structured to slide along the first axis of the first piston cylinder within the first plane;

the stroke length of the second piston is defined by the length of the second linear hypocycloidal path within the second plane; and the second piston is structured to slide along the second axis of the second piston cylinder within the second plane.

14. The crankshaft and bearing apparatus of claim 2, wherein:

the second angle measures between about 40-degrees and about 80-degrees;
the stroke length of the first piston is defined by the length of the first linear hypocycloidal path within the first plane;
the first piston is structured to slide along the first axis of the first piston cylinder within the first plane;
the stroke length of the second piston is defined by the length of the second linear hypocycloidal path within the second plane; and
the second piston is structured to slide along the second axis of the second piston cylinder within the second plane.

15. The crankshaft and bearing apparatus of claim 2, wherein:
the second angle measures 45-degrees;
the stroke length of the first piston is defined by the length of the first linear hypocycloidal path within the first plane;
the first piston is structured to slide along the first axis of the first piston cylinder within the first plane;
the stroke length of the second piston is defined by the length of the second linear hypocycloidal path within the second plane; and
the second piston is structured to slide along the second axis of the second piston cylinder within the second plane.

16. The crankshaft and bearing apparatus of claim 1, wherein the at least one piston comprises a single piston, and further comprising a block defining a piston cylinder being configured to slidably receive the single piston.

17. The crankshaft and bearing apparatus of claim 16, wherein the internal ring gear is a first internal ring gear and the pinion is a first pinion, the apparatus further comprising a second internal ring gear and a second pinion, and wherein the second pinion is matingly engageable with the second ring gear.

18. The crankshaft and bearing apparatus of claim 1, wherein the at least one piston comprises an elongate body having first and second arcuate walls and having a length extending from a proximal region to a distal region and defining a bearing surface extending over more than about 25% of the length of the elongate body.

19. The crankshaft and bearing apparatus of claim 18, wherein the bearing surface extends over more than about 33% of the length of the elongate body.

20. The crankshaft and bearing apparatus of claim 18, wherein the bearing surface extends over more than about 50% of the length of the elongate body.

21. The crankshaft and bearing apparatus of claim 1, wherein the drive member comprises an armature.

22. The crankshaft and bearing apparatus of claim 1, wherein the piston reciprocates along a stroke length measuring four times the distance extending between the longitudinal axis of the at least one piston-journal and the at least one crankshaft drive axis-of-rotation.

23. The crankshaft and bearing apparatus of claim 1, wherein a ratio between a circular pitch diameter of the ring gear and a circular pitch diameter of the pinion is about 2:1.

24. The crankshaft and bearing apparatus of claim 1, wherein the ring gear is stationary.

25. The crankshaft and bearing apparatus of claim 1, wherein the piston is reciprocable along a stroke length, wherein the ring gear defines a circular pitch diameter, and wherein the stroke length and the circular pitch diameter are about the same length.

26. The crankshaft and bearing apparatus of claim 25, wherein the pinion gear defines a circular pitch diameter measuring about one-half of the circular pitch diameter of the ring gear.

27. The crankshaft and bearing apparatus of claim 10, wherein:
a stroke length of the third piston is defined by a length of the third linear hypocycloidal path;
the third piston is structured to slide along a third axis of a third piston cylinder;
the third axis of the third piston cylinder is parallel to and aligned with the third linear hypocycloidal path;
a stroke length of the fourth piston is defined by a length of the fourth linear hypocycloidal path;
the fourth piston is structured to slide along a fourth axis of a fourth piston cylinder;
the fourth axis of the fourth piston cylinder is parallel to and aligned with the fourth linear hypocycloidal path;
the fourth axis of the fourth piston cylinder is arranged at a sixth angle, relative to the third axis of the third piston cylinder; and
the sixth angle is equal in terms of angular degrees to that of the fifth angle that is one half the angular degrees of the fourth angle.

28. The crankshaft and bearing apparatus of claim 27, wherein the sixth angle is aligned with the third angle.

29. The crankshaft and bearing apparatus of claim 27, wherein the fourth angle is aligned with the first angle.

30. The crankshaft and bearing apparatus of claim 2, wherein:
the second angle measures 72-degrees;
the stroke length of the first piston is defined by the length of the first linear hypocycloidal path within the first plane;
the first piston is structured to slide along the first axis of the first piston cylinder within the first plane;
the stroke length of the second piston is defined by the length of the second linear hypocycloidal path within the second plane; and
the second piston is structured to slide along the second axis of the second piston cylinder within the second plane.

31. The crankshaft and bearing apparatus of claim 1, wherein:
the at least one piston includes a crankshaft-bearing-region at a proximal end, a piston head at a distal end and an elongate body connecting the crankshaft-bearing-region and the piston head, the crankshaft-bearing-region being pivotally engageable with the at least one piston-journal of the crankshaft, the piston head having a substantially cylindrical shape and defining a piston head diameter, the elongate body having a width substantially equal to the head diameter along at least 33% of a length of the elongate body between the piston head and the crankshaft-bearing-region, the elongate body having a thickness less than the width, the at least one piston thereby being configured to be slidably received in a corresponding piston-cylinder; and
the elongate body further comprises one or more oil pathways configured to deliver oil to the crankshaft-bearing-region and the corresponding piston-cylinder, at least partially in response to reciprocation of the at least one piston within the corresponding piston-cylinder.

32. The crankshaft and bearing apparatus of claim 31, wherein:

the one or more oil pathways includes a first oil pathway disposed length-wise along at least a portion of the elongate body;

the first oil pathway is structured to provide oil to lubricate surfaces between the elongate body and the corresponding piston-cylinder;

the one or more oil pathways further includes at least a second oil pathway disposed perpendicular to the first oil pathway in an arcuate wall of the elongate body; and the second oil pathway is structured to provide oil to lubricate surfaces between the crankshaft-bearing-region and the at least one piston-journal.

33. The crankshaft and bearing apparatus of claim 4, wherein at least one of the first or second piston cylinders further comprises a substantially cylindrical top-portion defining a diameter, and a narrow central-portion with a first width perpendicular to the central-axis-of-rotation, being substantially the same as the diameter, and a second width along the central-axis-of-rotation being substantially less than the diameter.

* * * * *